US011509817B2

(12) United States Patent
Gove

(10) Patent No.: US 11,509,817 B2
(45) Date of Patent: Nov. 22, 2022

(54) AUTONOMOUS MEDIA CAPTURING

(71) Applicant: Robert John Gove, Los Gatos, CA (US)

(72) Inventor: Robert John Gove, Los Gatos, CA (US)

( * ) Notice: Subject to any disclaimer, the term of this patent is extended or adjusted under 35 U.S.C. 154(b) by 0 days.

(21) Appl. No.: 16/448,804

(22) Filed: Jun. 21, 2019

(65) Prior Publication Data
US 2020/0014848 A1 Jan. 9, 2020

Related U.S. Application Data

(63) Continuation of application No. 14/931,755, filed on Nov. 3, 2015, now Pat. No. 10,334,158.
(Continued)

(51) Int. Cl.
*G06K 9/00* (2022.01)
*H04N 5/228* (2006.01)
(Continued)

(52) U.S. Cl.
CPC ......... *H04N 5/23222* (2013.01); *G01B 11/00* (2013.01); *G03B 15/006* (2013.01); *G06F 3/01* (2013.01); *G06F 3/04883* (2013.01); *G06T 1/00* (2013.01); *G06T 1/0007* (2013.01); *H04N 5/23206* (2013.01); *H04N 5/23216* (2013.01); *H04N 5/23218* (2018.08); *H04N 5/23219* (2013.01); *H04N 5/23238* (2013.01);
(Continued)

(58) Field of Classification Search
None
See application file for complete search history.

(56) References Cited

U.S. PATENT DOCUMENTS 5,311,240 A * 5/1994 Wheeler ............... G03B 7/097
396/311
9,164,506 B1 * 10/2015 Zang .................... G05D 1/0094
(Continued)

FOREIGN PATENT DOCUMENTS

KR 20140030610 A * 3/2014
WO WO-2007004207 A2 * 1/2007 ........... H04N 1/0035

OTHER PUBLICATIONS

Salaskar et al. "Quadcopter—Obstacle Detection and Collision Avoidance", International Journal of Engineering Trends and Technology (IJETT)—vol. 17 No. 2—Nov. 2014 (Year: 2014).*
(Continued)

*Primary Examiner* — Randolph I Chu
(74) *Attorney, Agent, or Firm* — Van Court & Aldridge LLP

(57) ABSTRACT

A media capture device (MCD) that provides a multi-sensor, free flight camera platform with advanced learning technology to replicate the desires and skills of the purchaser/owner is provided. Advanced algorithms may uniquely enable many functions for autonomous and revolutionary photography. The device may learn about the user, the environment, and/or how to optimize a photographic experience so that compelling events may be captured and composed into efficient and emotional sharing. The device may capture better photos and videos as perceived by one's social circle of friends, and/or may greatly simplify the process of using a camera to the ultimate convenience of full autonomous operation.

17 Claims, 14 Drawing Sheets

Related U.S. Application Data

(60) Provisional application No. 62/074,442, filed on Nov. 3, 2014.

(51) Int. Cl.

| | | |
|---|---|---|
| *H04N 17/00* | (2006.01) | |
| *H04N 17/02* | (2006.01) | |
| *H04N 5/232* | (2006.01) | |
| *G03B 15/00* | (2021.01) | |
| *G06T 1/00* | (2006.01) | |
| *G01B 11/00* | (2006.01) | |
| *G06F 3/01* | (2006.01) | |
| *G06F 3/04883* | (2022.01) | |
| *G03B 37/00* | (2021.01) | |
| *G01S 17/89* | (2020.01) | |
| *G06V 40/16* | (2022.01) | |

(52) U.S. Cl.
CPC ........ *H04N 5/232411* (2018.08); *G01S 17/89* (2013.01); *G03B 37/00* (2013.01); *G03B 2215/00* (2013.01); *G06V 40/174* (2022.01)

(56) References Cited

U.S. PATENT DOCUMENTS

| | | | | |
|---|---|---|---|---|
| 9,253,460 | B1* | 2/2016 | Wang | H04N 9/73 |
| 9,380,275 | B2* | 6/2016 | Davidson, Jr. | G05D 1/0038 |
| 10,469,757 | B2* | 11/2019 | Sabe | G05D 1/0016 |
| 2008/0165195 | A1* | 7/2008 | Rosenberg | G06T 13/40 |
| | | | | 345/473 |
| 2008/0298795 | A1* | 12/2008 | Kuberka | H04N 5/23222 |
| | | | | 396/263 |
| 2010/0017046 | A1* | 1/2010 | Cheung | G05D 1/0094 |
| | | | | 701/2 |
| 2010/0115060 | A1* | 5/2010 | Julia | G06F 16/9535 |
| | | | | 709/219 |
| 2010/0245596 | A1* | 9/2010 | Tirpak | H04N 1/2112 |
| | | | | 348/222.1 |
| 2010/0305782 | A1* | 12/2010 | Linden | H04N 5/772 |
| | | | | 396/419 |
| 2013/0021491 | A1* | 1/2013 | Lee | G06T 5/50 |
| | | | | 348/222.1 |
| 2013/0027554 | A1* | 1/2013 | Meadow | 348/E7.085 |
| 2014/0148219 | A1* | 5/2014 | Bai | H04M 1/0264 |
| | | | | 455/556.1 |
| 2014/0197280 | A1* | 7/2014 | Smith | B64C 39/028 |
| | | | | 244/35 R |
| 2014/0197922 | A1 | 7/2014 | Stanwood et al. | |
| 2014/0316616 | A1* | 10/2014 | Kugelmass | G05D 1/104 |
| | | | | 701/8 |
| 2015/0054975 | A1* | 2/2015 | Emmett | G06V 30/40 |
| | | | | 348/220.1 |
| 2015/0122947 | A1* | 5/2015 | Bruce | B32B 3/26 |
| | | | | 244/134 C |
| 2015/0160658 | A1* | 6/2015 | Reedman | G05D 1/0088 |
| | | | | 701/3 |
| 2015/0205301 | A1* | 7/2015 | Gilmore | G01S 19/13 |
| | | | | 701/11 |
| 2015/0227022 | A1* | 8/2015 | Fluckiger | H04N 5/232123 |
| | | | | 348/349 |
| 2016/0004795 | A1* | 1/2016 | Novak | B64C 39/024 |
| | | | | 703/1 |
| 2016/0055883 | A1* | 2/2016 | Soil | H04N 5/77 |
| | | | | 386/285 |
| 2016/0101856 | A1* | 4/2016 | Kohstall | B64C 39/028 |
| | | | | 244/17.23 |
| 2016/0105649 | A1* | 4/2016 | Pettegrew | G06T 3/4038 |
| | | | | 348/37 |
| 2016/0189101 | A1* | 6/2016 | Kantor | G08G 5/0013 |
| | | | | 705/338 |
| 2016/0234551 | A1* | 8/2016 | Allegretti | H04N 21/854 |
| 2016/0292886 | A1* | 10/2016 | Erad | H04N 5/23218 |
| 2016/0317074 | A1* | 11/2016 | Kawai | A61B 5/16 |
| 2016/0327950 | A1* | 11/2016 | Bachrach | G05D 1/0094 |
| 2017/0109603 | A1* | 4/2017 | Wang | G06K 9/6267 |
| 2017/0171614 | A1* | 6/2017 | el Kaliouby | G16H 50/70 |
| 2017/0213378 | A1* | 7/2017 | Mandel | G06T 13/80 |
| 2017/0238860 | A1* | 8/2017 | el Kaliouby | A61B 5/7267 |

OTHER PUBLICATIONS

Bernhardt, Detecting emotions from everyday body movements, http://www.cl.cam.ac.uk/~pr10/publications/presenccia07.pdf, Jul. 12, 2012, 8 pages.

Canon PowerShot ELPH 340 HS product page https://www.amazon.com/Canon-PowerShot-ELPH-Digital-Camera/dp/B00HLDIDVM; Jan. 4, 2014; 12 pages.

* cited by examiner

100

200

250

300

700

800

900

1000a

1000b

1000c

1000d

1100a

1100b

1400

AUTONOMOUS MEDIA CAPTURING

CROSS-REFERENCE TO RELATED APPLICATION(S)

This application is a continuation of U.S. patent application Ser. No. 14/931,755, filed Nov. 3, 2015 (now U.S. Pat. No. 10,334,158), which claims the benefit of prior filed U.S. Provisional Patent Application No. 62/074,442, filed Nov. 3, 2014, each of which is hereby incorporated by reference herein in its entirety.

TECHNICAL FIELD

This disclosure relates to autonomous media capturing systems and methods for operating and using the same.

BACKGROUND

Cameras and video-cameras have been used to capture content on film or digital media. Advances in semiconductor manufacturing and circuit design technologies have enabled the development and production of integrated circuits (ICs) with increasingly higher operational capacity. As a result, electronic products and systems, particularly camera systems, incorporating such integrated circuits are able to provide much greater functionality than previous generations of products.

BRIEF SUMMARY

This disclosure describes systems, methods, and computer-readable media for autonomously capturing media.

A media capture device (MCD) that may provide a multi-sensor, free flight camera platform with advanced learning technology to replicate the desires and skills of the purchaser/owner is provided. Learned photographic intelligence may be unique to each individual and may be continually adapted to an owner's preferences, and, thereby, may be referred to herein as Personalized Social Photographic Intelligence (PSPI). Advanced algorithms may uniquely enable many functions for autonomous and revolutionary photography. The device may learn about the user, the environment, and/or how to optimize the photographic experience so that compelling events may be captured and composed into efficient and emotional sharing. The device may capture better photos and videos as perceived by one's social circle of friends, and may greatly simplify the process of using a camera to the ultimate convenience of full autonomous operation. Such personalized photographic intelligence may be retained in either digital memory of an MCD or the cloud, and may be uniquely available to drive and likewise create autonomous photography with any controllable camera (e.g., a WiFi-coupled camera), from smartphones, to home surveillance cameras, to sports video cameras, to wearable cameras. Smartphones and/or any other suitable user devices with or communicatively coupled to a camera, such as a Wearable Media Camera (WMC) device, may be utilized. A WMC may include multiple sensors and may be worn (e.g., by an operator's wrist or finger), and may be used either as a convenient gesture capture device to control the MCD, as a full media capture device (MCD) when augmented (e.g., with cloud-based processing), and/or simply as a wearable camera for media capture for use with one's smartphone.

MCD technology, methods, and algorithms may apply to all photography and videography applications and devices. Different MCD embodiments may have varying levels of complexity as performance, power, and costs. Any data controllable camera may be utilized with one or more algorithms (e.g., PSPI algorithms) for providing a platform for autonomously capturing media according to the disclosure. Such functionality may define a new class of photographic camera or any other suitable type of media capturing device.

For example, a system may include at least one situation sensor operative to capture situation data with respect to a subject situation, and at least one processor operative to determine an emotion associated with the subject situation by analyzing the captured situation data, and, based on the determined emotion, at least one of generate an output operative to instruct a system user to adjust a characteristic of the subject situation and share at least a portion of the captured situation data with at least a subset of a social network.

As another example, a method may include capturing situation data with respect to a subject situation using at least one sensor component of an electronic device, determining with the electronic device an emotion associated with the subject situation by analyzing the captured situation data, and, based on the determined emotion, at least one of generating with the electronic device an output operative to instruct a user of the electronic device to adjust a characteristic of the subject situation and sharing, using the electronic device, at least a portion of the captured situation data with at least a subset of a social network.

As yet another example, a non-transitory computer-readable medium may include computer-readable instructions recorded thereon for capturing situation data with respect to a subject situation using at least one sensor component of an electronic device, determining with the electronic device an emotion associated with the subject situation by analyzing the captured situation data, and, based on the determined emotion, at least one of generating with the electronic device an output operative to instruct a user of the electronic device to adjust a characteristic of the subject situation and sharing, using the electronic device, at least a portion of the captured situation data with at least a subset of a social network.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, which are not necessarily drawn to scale, in which like reference characters may refer to like parts throughout, and in which.

DETAILED DESCRIPTION

Figure 1:
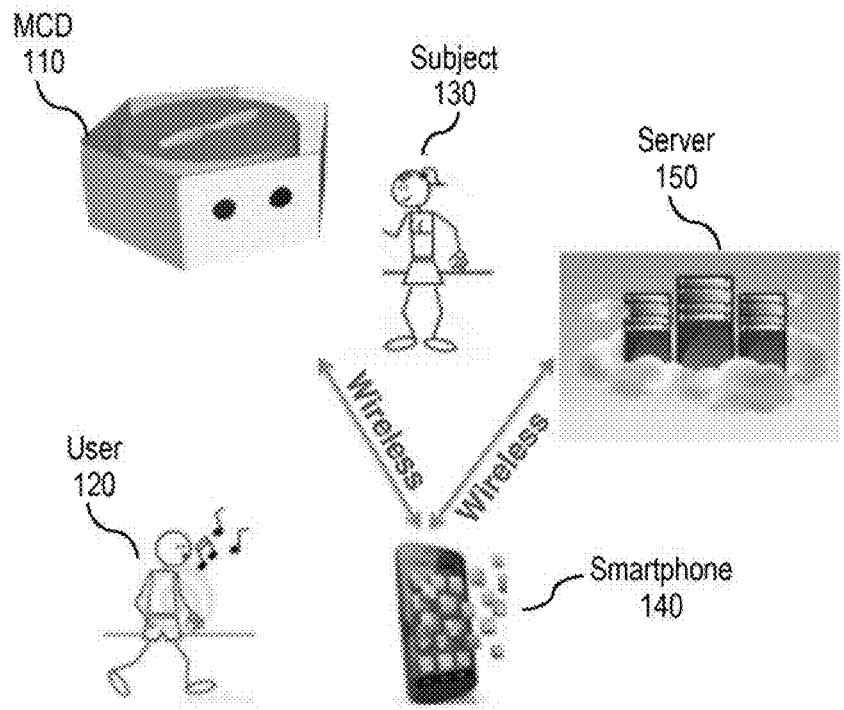
FIG. 1 shows an illustrative scenario in which an MCD can be used, according to at least one embodiment.

Illustrative embodiments are now described more fully hereinafter with reference to the accompanying drawings, in which representative examples are shown. The disclosed systems and methods may be embodied in many different forms and should not be construed as limited to the embodiments set forth herein.

In the following detailed description, for purposes of explanation, numerous specific details are set forth to provide a thorough understanding of the various embodiments. Those of ordinary skill in the art may realize that these various embodiments are illustrative only and are not intended to be limiting in any way. Other embodiments may readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives may vary from one embodiment to another and from one developer to another. Moreover, it may be appreciated that such a development effort might be complex and time-consuming but would nevertheless be a routine engineering undertaking for those of ordinary skill in the art having the benefit of this disclosure.

Various embodiments discussed herein improve on existing photography, videography, and information gathering abilities of media capturing devices. These devices can use perceptual technology that may automatically imitate the behavior and characteristics of professional photographers and videographers, and can enhance or exceed what is possible with conventional cameras. These devices can capture photos and videos that are more pertinent to a user's social circle of friends. In addition, full autonomous operation can greatly simplify the process of using a camera or other media capturing device.

For example, rather than requiring a user to pick up and point or position a camera (e.g., on a tripod), a media capture device (MCD) can position itself and capture the best possible picture at any time and place. The MCD may sometimes be referred to herein and in the drawings as a flutter camera and/or fluttercam (FC) and/or free-flight camera (FFC) and/or autonomous camera. In some embodiments, the MCD may be capable of autonomous (e.g., free) hovering flight, and as such, may have the ability quickly "find" the best pose of the subject(s) or terrain. Use of perceptual technology with rules of photographic practice that may be encoded into the MCD may enable the device to properly capture the photo without: (1) the burden of holding and positioning the MCD, (2) with the ability to eliminate the disruption of the pose by the user (e.g., no upheld arms stretching to the MCD in the field-of-view), (3) the ability to precisely repeat the pose, and (4) the ability to precisely sample at a variety of space and time may open and/or otherwise enable new capture solutions. The MCD may maneuver itself around by flying or hovering to an appropriate location and capture media based on an autonomous understanding of the user's intent to capture the media. In one example, the MCD may function as an ideal selfie camera, personal surveillance camera, and/or social photography device. In addition, many conventional applications of cameras may be improved with the use of MCD solutions.

FIG. 1 shows an illustrative diagram of a scenario 100 in which an MCD 110 may be controlled by a user 120 to take a picture/video, or may be permitted to autonomously and automatically capture photos or videos of a scene or subject 130. FIG. 1 may include elements such as the user 120, the object 130 to be photographed, a personal electronic device or smartphone 140, the MCD 110, and at least one server 150 (e.g., in the cloud), where software and/or algorithms in one or more devices (e.g., MCD 110, smartphone 140, and/or server 150) may be leveraged for conversion of signals to information (e.g., such as the "depth of one's hand" of subject 130), and photographic data/knowledge may be stored and/or processed at MCD 110, at smartphone 140, and/or at server 150. User 120 may be holding or otherwise interacting with smartphone 140, which may be operative to communicate (e.g., wirelessly) with MCD 110, which may be operative to capture and process images/video/audio (e.g., media) associated with subject 130 from a location that may be remote from smartphone 140 and/or remote from user 120 and/or remote from subject 130 and/or remote from server 150. Smartphone 140 may also be operative to communicate with MCD 110 and may be operative to use data and/or software of MCD 110 to understand user gestures, emotion, select subjects, control MCD navigation, MCD media capture, MCD media sharing, and the like. Smartphone 140 may also be operative to communicate (e.g., wirelessly) with at least one server 150 for sharing any captured media from MCD 110 and/or other suitable data (e.g., knowledge) with server 150, such that media may be shared with other smartphones (e.g., via social networks that may be managed by server 150). User 120 may be enabled to do anything it desires (e.g., be in a "hands-free selfie" mode (e.g., as at least a portion of subject 130) or do anything unrelated to the media capture of MCD 110).

Figure 2A:
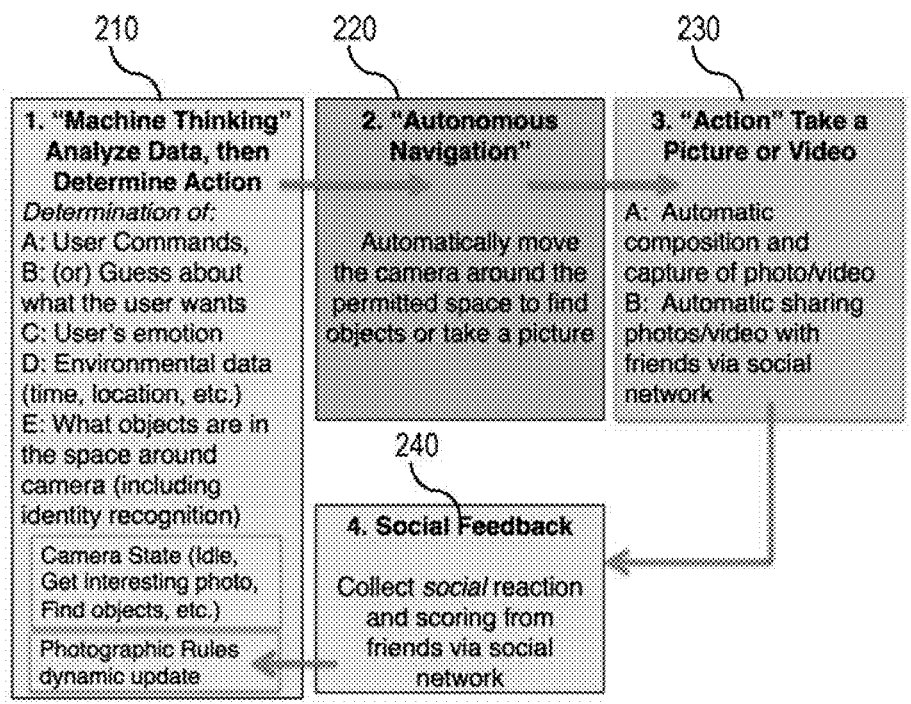
FIG. 2A shows a block diagram of a method for capturing media with an MCD, according to at least one embodiment.

FIG. 2A shows illustrative operations that may be performed by an MCD Social Camera Platform 200. As shown in FIG. 2A, such a platform 200 may include any suitable functions, including, but not limited to, a "Machine Thinking" function 210, "Autonomous Navigation" function 220, "Action" function 230, "Social Feedback" function 240, and/or the like. For example, as shown, "Machine Thinking" function 210 may be operative to include any suitable analysis of any suitable data and then determination of any suitable action(s) based on such analysis, including, but not limited to, determination of user commands, inferences or guesses about desires of a user, user's emotions, environmental data (e.g., time, location, weather, light, sound, etc.), what objects are in the space surrounding a camera (e.g., including identity recognition of human subjects, animals, inanimate objects, etc.), and/or the like. Next, "Autonomous Navigation" function 220 may be operative to include any suitable movement of a camera (e.g., fully autonomous movement, movement with any suitable "user-assisted navigation" where the MCD may instruct the user to place a camera device at a particular location, etc.) within a permitted space to any suitable position(s) to find any suitable entity or entities (e.g., any desired person(s), scene(s), object(s), etc.) and/or to capture any suitable media (e.g., to take a picture, record audio, record a video with or without audio, etc.). Next, "Action" function 230 may be operative to actually capture any suitable media in any suitable manner and/or to process such media for enhancement and/or to share such media with any suitable entity (e.g., automatic composition and/or capture of media (e.g., photograph(s)/video(s)), enhancement of such media, and/or automatic sharing of such media with a social network that may be associated with a user). Next, "Social Feedback" function 240 may be operative to collect any suitable social reaction to and/or scoring of the shared media (e.g., as may be made by participants/friends in a particular social network) and/or to update (e.g., dynamically) any suitable media capture rules (e.g., photographic rules) of the MCD (e.g., camera state (e.g., rules for entering an idle state, a capture interesting media state, a find subject state, etc.)) that may be leveraged at "Machine Thinking" function 210 based on such social reaction/scoring (e.g., continually update a photographic rule base by scoring and ranking actual consumer feedback of captured media and/or the resultant images).

A simple analogy can be found in the area of robotics, like autonomous driving, where rules of behavior or knowledge may be applied to signals that may represent the surroundings and environment of the vehicle. This model may be applied here to the area of "media capture" or "photography" and its many forms (e.g., video, still, etc.) for the purpose of creating "improved photographic experiences to capture great pictures" for common consumers (e.g., rather than only photographic experts, as with a Digital SLR camera). This photographic knowledge or rule base of what it takes to make "great pictures" may evolve with a global-scale, social feedback paradigm.

A smart social media capture device of a smart social camera may be provided. One of the advantages of the MCD platform may center on the use of social networks to provide global, regional, and/or local feedback from viewers of media (e.g., photos, videos, audio, etc.). Billions of views happen every day as users "like and comment on" certain shared social media. With this feedback and other information (e.g., like the image capture conditions and parameters), assessments can be made on autonomous MCD's "success" at capturing great photos and videos. At a cloud-based server, this information can be used to update centralized and personalized databases of photographic knowledge. In operation, real-time information can be collected from personal and neighboring MCDs of the candidate subjects and scenes to "understand" key aspects of the subjects, situations, surroundings, and/or environmental conditions, and then may be augmented with the knowledge databases which may be updated from the server in real-time. This, and similar information from neighboring MCDs, may provide key information to improve the ability of one's MCD to capture an exceptional picture or video (e.g., by changing the zoom or pose). In addition, this information about these conditions can be made available to a central database for future analysis and/or knowledge updates. Additionally or alternatively, (1) distribution of the photos/videos to a social network platform and/or (2) direct feedback from friends on those social networks and/or feedback from professional reviews for public photos can provide key information back to any central algorithms for photography/videography in a centralized photography knowledge database. As a result, the MCD can use knowledge that evolves over time with social experiences to result in better or preferred pictures/video.

A free-flight MCD with autonomous navigation may be provided. Artificial intelligence algorithms can be implemented within an MCD to create an autonomous camera with embedded smart control. The MCD may contain the knowledge of photography and automatically perform the process of image/video capture, processes for image, audio, and video enhancement, and sharing tasks. One advantage of an autonomous MCD may be that the user need not operate the MCD and thereby may be freed from that burden. As a result, the user can be photographed or videotaped without touching the camera, or rather can be free to enjoy the scene while the camera is simultaneously recording an event. For example, the user can be free to watch fireworks in the sky as the camera positions itself to take photos and videos simultaneously.

For autonomous navigation, the MCD may be operative to freely move about a predetermined space and/or dynamically construct 3D models of scenes with a variety of techniques. Methods may include access of public mapping databases on the Internet, use of Apps (e.g., MagicPlan) to interactively construct a map of the user's house, and/or collecting information from neighboring MCDs, or MCDs that have been in that space before. Its free-flight operation can enable new forms of photography and video, including new capture methods vs. conventional photography where the camera is stationary. The MCD may be operative to position itself precisely and return to that position at any time in the future. This may enable time lapse photography without requiring the camera to remain permanently fixed at a particular location.

In one embodiment, using significant integration, the MCD may be functionally equivalent to a cell phone's camera, yet the user may be enabled with the ability to toss it in the air when the user wishes to take a Selfie, followed by automatic retrieval of the device when finished. Other MCD devices may automatically follow the user as he/she goes about daily life, constantly looking for interesting photographic situations and capturing those automatically. The MCD may decide to use the user for transportation when possible (e.g., to conserve power or when the MCD decides that there are no interesting picture opportunities). The MCD may periodically launch itself to view potential objects within a virtual zone around the user when the user stops or photo opportunities present themselves. In some embodiments, the MCD may fold onto itself for "pocket or purse" portability (e.g., like a cell phone). Other MCDs may be small and light enough to be attached to one's shoulder (e.g., with a Velcro-like material) for use while carrying and rapid launching of the device.

The MCD may function as an automatic personal recording device or camera for any situation. For example, an MCD may be used at an interview or live conversation while a user is walking, running, swimming, or performing any other suitable activity. The user's phone may be in his/her pocket or purse, yet the MCD may be in the air and transmitting images and audio continuously to the phone or landing pad.

The MCD may capture Google PhotoSphere images. A PhotoSphere user may sequentially capture photos on a smartphone by sweeping around 360 degrees horizontally and vertically, to capture a sphere of data. Processing may stitch the images together, such as with any suitable panoramic stitching algorithms. The MCD may be operative to autonomously create the PhotoSpheres, or equivalent spherical data streams, for a variety of applications.

An information device may be provided. The MCD device can be used to capture pictures, video, audio, or any other suitable information with a variety of sensors. For pictures, the MCD can acquire images from any direction with positioning of the device in 3-dimensions. As well, with motion and a time sequence, virtually limitless resolution photographs can be synthesized. For video, the MCD may offer the benefit of panoramic and multi-spectral imaging. Video can be captured in any direction and in some models, simultaneously in all directions. The user can then compose a fly through after the video is captured from any position. Surveillance applications may benefit. As well, advanced video flow sequences or threads, and Hyperlapse sequences can be created.

For information, the MCD can measure depth information, useful for focus and positioning of the device. The MCD can employ additional multispectral image sensors (e.g., with various spectral filter) that may be useful for unique situations like gesture detection, surveillance, or automotive applications where infrared signals may be helpful for detection. Depth and object detection and recognition can be used for device navigation and decision-making.

Identity protection can be provided in MCDs. For public use, certain faces can be removed or blurred. For example, in security and surveillance applications, one or more specified person can be removed from the photos/video with image processing algorithms.

In other embodiments, the application domain and the user's intent and preferences can be embedded into the device to improve the experience or more frequently create better pictures/video than conventional camera devices.

The MCD may dynamically (e.g., in real time) map the device's environment in 3D. In operation, a 3D map of the environment can be constructed progressively or dynamically as the environment changes (e.g., items may move over time within the environment). This may include object finding and/or tracking to position objects and zones on a 3D map of the environment around the camera. Coupled with collision avoidance algorithms and stabilization technology, successful free-flight may be performed. Various technologies can be incorporated into the MCD. These technologies can include, but are not limited to, local perceptual image processing in camera, multi-spectral, burst-mode photography/videography to capture extensive "information" that later may be used to create spectacular images, low power techniques (e.g., including controlling multiple sensors and processors), micro-sized flight devices, coupled with an ultra-quiet flight platform, flight technologies with advanced stabilization solutions, 3D capture and mapping technologies, advanced navigation methods optimized for low-power and safe operation, knowledge and rules of photography and videography, human gesture and emotion detection, and/or the like.

One version of an MCD can be defined by the requirements of an autonomous social camera. These requirements can include, but are not limited to, emotion understanding (e.g., both of the MCD robot and the user), new autonomous modes of information capture, perceptual processing of the data to create and share exceptionally captivating visual information, and/or the like.

Non-autonomous media capture components or devices may be provided. Many of the techniques and algorithms used by an MCD can also apply to next generation conventional, stationary, or-semi-autonomous cameras or other media capture components. For example, the social interaction and proper pose and exposure settings can be enabled for relatively stationary cameras, where either the camera may instruct the user to move it to another location, or arrays of neighboring cameras also may provide different perspectives of the same scene (e.g., for "selection" by the smart processing). Cameras with this intelligence can also reposition themselves within small domains, like moving around a surface (e.g., a table, floor, or wall), rather than being in free flight. Some of the advanced capture technologies may have more limited use, but, likewise, many of the fundamental concepts of autonomous photography (e.g., with embedded "machine thinking" to automatically capture media) described herein may still apply, with substantial benefit in terms of likability of captured photographs and video.

Other MCD embodiments may be composed of a multi-sensor, free-flight camera platform with advanced learning technology to replicate the desires and skills of the purchaser/owner. The MCD may allow the consumer to purchase a "pre-enrolled" expert system that may have been captured from the best photographers in the world. Capturing the user's personal rules of photography may start with an on-line interview session, and may later follow with an adaptive rating system in which the user rates or scores the "autonomously-taken" photos. Over time, the MCD may become a personalized camera system, taking the best shots possible at the right time (e.g., based on the user's rules and feedback over time).

Today's enormously popular "Selfie shots" represent a potential application of the MCD to create widespread use and perfection of the machine learning technology employed within the device. As an MCD may be fully aware of the surroundings and may be an autonomous camera product with an imaging compute platform, it can free-up the user to take pictures from any pose in any situation, either under direct remote control, or by autonomous image capture.

A key aspect of making a proper picture with the MCD may include the capture of visual information within a scene. The MCD may integrate multiple sensors (e.g., imagery, depth, and/or 3D sensors, temperature sensors, audio sensors, and/or any other suitable sensors) and perceptual computation to fuse the sensory information. Video and other forms of information may be captured as well. The MCD platform can contain "core" perceptual processing or computation technology. Additional discussion of the core algorithm technology may be discussed below.

An "Air Tripod" mode and/or a "User-Assisted Navigation for Manual Re-Positioning and Stationary Operation of a Scanning Mirror MCD" mode may be provided. With flight capability, the MCD can function in an "Air Tripod mode." In this mode, the MCD may fly around to find the best picture taking position. However, when the MCD is asked to function in the "User-Assisted Navigation for Manual Re-Positioning and Stationary Operation of a Scanning Mirror MCD" mode, the MCD may use many of the same perceptual processing methods discussed previously, but may interactively instruct the user to re-position the camera in specific ways to allow the camera to autonomously capture the proper photo. Using one or more of camera mounts, an optional integrated scanning mirror, and/or the perceptual processing algorithms, coupled with interactive instructions to the user to manually position the camera to the proper position, the device can create exceptional photographs, rivaling those when using the a flying camera and the "Air Tripod" mode. Another embodiment of the User-Assisted Navigation MCD mode may replace a scanning mirror with one or more rotational elements about one or more axes of freedom, such as with a small robotic arm. For example, the movement of the device may be enabled by a robotic arm that rotates about the vertical and horizontal axes (e.g., similar to the rotational base and dome of a conventional security camera), yet with the addition of an arm and wrist motion/rotation so that the camera can point at the same object from two different perspectives. In effect, this may position the camera autonomously, similar to the actions of a photographer today when using a pole or stick to manually pose an action camera (e.g., like a GoPro). These two or more positions, such as viewing from the left then the right of the subject, may enable a conventional smartphone to achieve depth measurement capability by computing depth from two stereo images.

A "Manual Re-Positioning" mode of an MCD using "Perceptual Guidance" may be provided. In a manual positioning or re-positioning mode, the MCD may be placed in a specific stationary position by the user. However, the position may be determined by the MCD and the user may be then directed to place the MCD to that position, either via graphical or verbal directions directly from the MCD. Essentially, the MCD may be using perceptual processing to guide the user. Certainly the user can choose to ignore that advice and place the camera anywhere as well. The camera may be held in place by placing it on a surface or using attachment peripherals (e.g., arms, clamps, tripods, or others). However, in comparison to a conventional camera, the MCD may use the previously described perceptual processing techniques for understanding the content of the scene, and manual repositioning of the MCD to ultimately resolve where to position the camera. In this case, the user can be guided to a specific location by audio directions (e.g., via speech synthesis) from the MCD either in the form of LEDs which may flash or change color to direct the user to bore-sight the camera position, or the use of audio pulses (e.g., like sonar signals of increasing frequency as bore-sight is reached), or by using the smartphone screen with graphics of arrows to show the user how to position the device. Position and exposure may be augmented with machine guidance. As one example, a user device (e.g., a user's smartphone or wearable device or other camera-equipped device may be operative to utilize one or more algorithms in combination with any suitable sensor data from any suitable input components for guiding a user to position a camera in a particular manner. For example, at a first step, the device may be operative to guide the user to position the device at a particular geographic position (e.g., a GPS-enabled device may provide a map or an array of arrows (e.g., North, South, East, West) that may be independently lit up (e.g., on a user interface screen of the device) or using appropriate LEDs to flash to guide the user to move the device to an appropriate geographic location). Once that location has been achieved, the device may be operative to guide the user to rotate the device to a particular orientation (e.g., a compass-enabled device may provide any suitable guidance to encourage a user to rotate the camera device to a particular orientation, such as by vibrating at different magnitudes (e.g., using haptic feedback of the device) until the user has properly rotate the device, at which point the vibrations may slow or stop). Once that rotation has been achieved, the device may be operative to guide the user to adjust the vertical angle of the device to a particular vertical pitch or yaw (e.g., a gyroscope or accelerometer or the like of the device may be operative to detect the current vertical angle of the device and may provide any suitable guidance to encourage a user to adjust the vertical angle to a particular pitch or yaw, such as by varying the frequency of an acoustic signal (e.g., using an audio output of the device) until the user has properly adjusted the device, at which point the sound frequency may slow or stop). Once a particular location, rotation, and vertical angle combination has been achieved through any suitable guidance, the device may be operative to automatically capture media (e.g., autonomous photography may occur). Therefore, in some embodiments, sonar-guided user experience for use with cameras and smartphones to help users place the device at a proper position may be enabled. Additionally or alternatively, a case for such a smartphone or camera may be provided with processing and/or communication and/or sensing and/or interfacing capabilities for enabling at least a portion of such guidance and autonomous media capture.

Figure 2B:
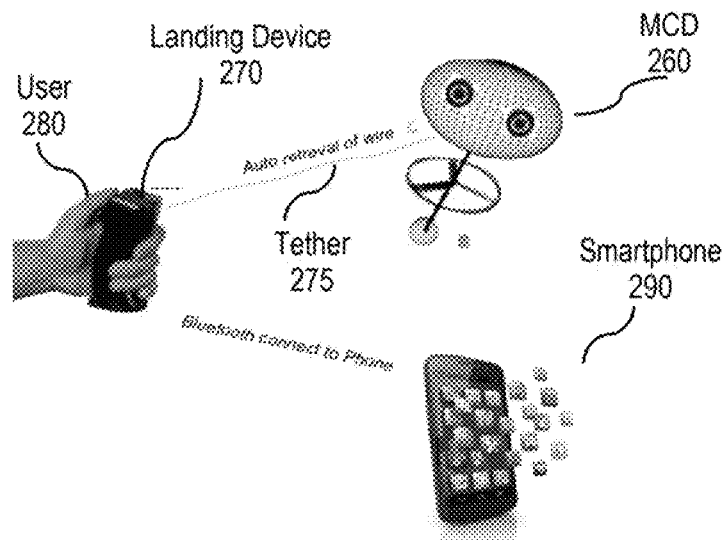
FIG. 2B shows a block diagram of a system for taking three dimensional selfie photograms, according to at least one embodiment.

A "Smart Tripod" mode and/or an "Autonomous Tripod" mode may be provided. In concept, with the manual positioning and perceptual guidance mode, the MCD may operate as a "Smart Tripod" for autonomous photo/videography. The MCD may still autonomously capture the pictures or video, but the repositioning may be an interactive process with the user, rather than fully autonomous as with a free-flight version of the MCD. In other embodiments, an "Autonomous Tripod" may be formed by constraining a flying device to a specific location, like the top of a coffee table, and perhaps with the use of wired control of the device (e.g., either as an attachment to a smartphone or as a fully integrated new device). For example, as shown in FIG. 2B, an illustrative system 250 may include an MCD 260 coupled via a wired tether 275 to a hand trigger launching device 270 of a user 280 for constraining the flight domain of the MCD 260. Launching device 270 may include any suitable processing electronics and/or batteries and may be operative to communicate (e.g., via Bluetooth or any other suitable wireless or wired protocol) with a smartphone 290 (e.g., for controlling MCD 260 or launching device 270 with smartphone 290). Launching device 270 may communicate any suitable data (e.g., captured media data) with MCD 260 using any suitable communication technique(s) (e.g., via tether 275 or wirelessly) for sharing captured media or other MCD data with smartphone 290, or MCD 260 may be operative to communicate directly with smartphone 290. MCD 260 may be tossed from a cradle of launching device 270 to position and/or activate a positioning motor of MCD 260 (e.g., a small (e.g., 1" sized) fan motor, as may be shown). One, two, four, or any other suitable number of media capturing components (e.g., cameras) may be provided by MCD 260 and may be operative to capture a terrain view and/or a selfie view for use by a user on smartphone 290. Media capture with MCD 260 may be operative to begin when the extent of tether 275 has been extended between MCD 260 and launching device 270. MCD 260 may include a gimbal and/or an ability to position itself with respect to a distance arc.

An example use case of a "Groupie Photo" may now be described. In use of the "Smart Tripod", an application may enable a user to select a specific mode of operation. In the case when the user wishes to take a "Groupie" photo, the user may instruct the MCD to take a Groupie by any suitable user instruction, such as voice command or menu selection on the smartphone. The MCD may first instruct the user to scan the room (e.g., by holding up the MCD and panning about the room—with multiple image sensors in use, either within a smartphone or the use of multiple cameras) and may construct a 3D model of the room and persons in the room, then perceptual processing algorithms may determine the best location for the Groupie to be taken, followed by a process to inform the user about how and when to capture the photo. These instructions may involve the use of room modeling and positional information to then instruct the user to move the people or subjects in the Groupie to a specific location (e.g., such as ensuring they may be illuminated by the light from the camera's perspective) and to move the MCD to a sufficient location to scan a high-quality image (e.g., such as on the other side of light so as to create a properly illuminated image). The MCD then may invoke a scanning mirror and/or a manipulator such as a robotic arm, which may extend the camera's field-of-view to find the proper pose at that ideal illumination position. Such a scanning mirror can compensate for the lack of free autonomous flight in a stationary mode, such as by changing the pointing of pose for the main camera. In the case that some object (e.g., a lacy flower in a vase) obstructs the view from the MCD, the MCD may utilize its 3D depth processing to understand that an obstruction may negatively impact the Groupie photograph. As a result, the MCD may inform the user to reposition the camera or the plant/flower to create a better photographic experience. The final picture may then be captured when the perceptual processing informs the MCD camera that the position and/or emotion of the subjects is ideal. For example, when the subjects are laughing or smiling or socially engaged in some activity that may be detectable by the system, then a media capture may be automatically triggered. At that point, the picture may be taken and displayed on a smartphone display. If the owner approves (e.g., with a thumbs up gesture or any other suitable instruction), the picture may be automatically distributed on one or more social networking accounts of one or more of the subjects in the Groupie (e.g., using person identification algorithms and/or specific instructions).

Figure 3A:
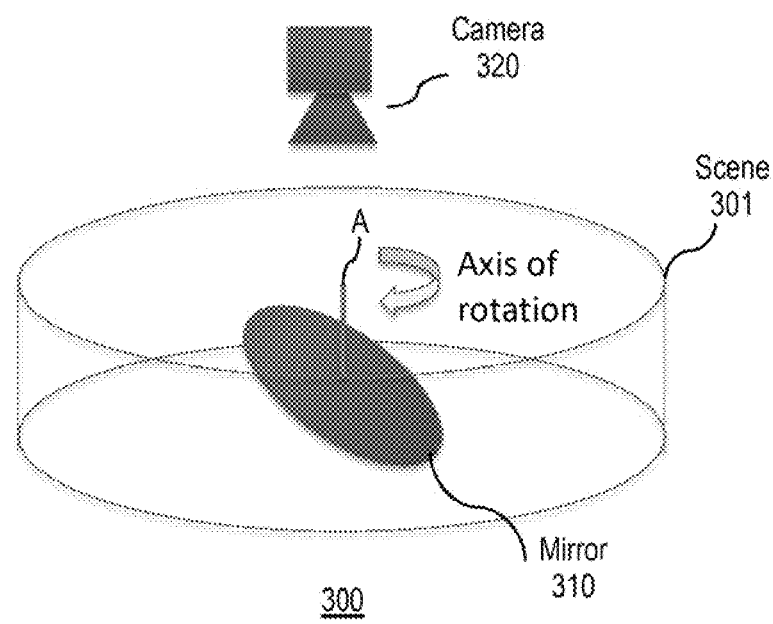
FIGS. 3A and 3B show different approaches for capturing media, according to various embodiments.

An example use case of "Autonomous Image Capture by Scanning in a Stationary Mode by using Rotational Mirror Optics" may now be described. For the case where an MCD's position may be locked to a stationary position by mounts, clamps, or suction devices, a field of view sweep may be obtained from the MCD to provide a functional scan so that the MCD can autonomously capture scenes from the proper position, even in the case where the MCD is not in the proper position. The optics may automatically rotate mirrors to affect an MCD rotational movement (e.g., as shown in FIG. 3A). Rather than flying to create an MCD motion, one or more internal optical components may provide such rotation. FIG. 3A may show how at least a portion of a wide field-of-view scene 301 can be captured by moving a mirror 310 of a system 300. Essentially a circular rotation of mirror 310 (e.g., about an axis A) can create a 360-degree view over time as a scene 301 may be scanned by a camera 320 (e.g., a camera of an MCD or smartphone or the like) that may be capturing light reflected by mirror 310. Smaller versions may have limited rotation (e.g., 180 degrees). Multiple sensors can each use the same approach, thereby enabling depth measurement with stereopsis imaging and processing.

Figure 3B:
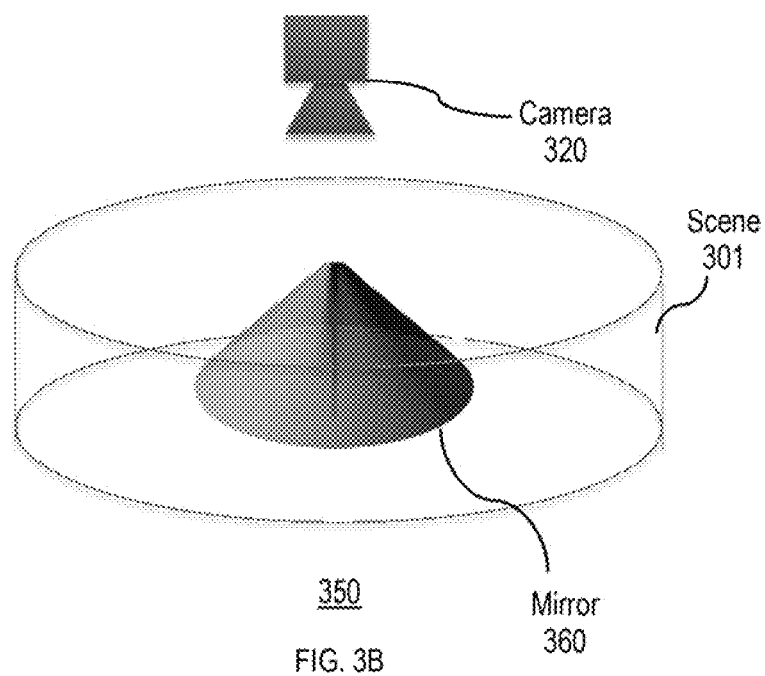

An alternative system 350, as shown in FIG. 3B, may forego a rotatable mirror for a stationary mirror 360 (e.g., a cone-shaped mirror) that may be operative to bend scene 301 to cover a wider field-of-view that may be scanned by camera 320, which may be enabled by any suitable de-warping processing function that may be operative to reposition and correct any distortion of the mirror 360. An advantage of system 350 over system 300 may be no moving parts but may require higher computational demand, latency, and/or power consumption.

An example use case of a "concert photo" may now be described. Another usage model for a Manual Re-Positioning mode of an MCD may relate to usage of a smartphone at a concert or other public event. In most cases, the user must hold up the phone high above their head and somehow snap a picture watching their phone's viewfinder over their head, with arms stretched high in the air. Using the MCD, the user may merely hold up the smartphone with the installed mirror attachment, and generally point towards the stage. Smart perceptual processing may automatically reposition the MCD image sensor's field-of-view with the rotating mirror(s) or with a cone mirror and may control the exposure to capture great photographs and video, with no deliberate pointing and snapping on the screen required.

Some MCDs can be utilized in any other suitable embodiments, including, but not limited to, an integrated flying smartphone via quad-copter, use of an off-the-shelf smartphone (e.g., the smartphone manufacturer would anticipate this entire assembly as an add-on or accessory product), use of an off-the-shelf quad-copter, a custom enclosure for mounting the smartphone onto the quad-copter, several custom optical components enabling use of the smartphone's main camera as a front-facing Selfie camera (e.g., two 90 degree turning mirrors and an optional wider-angle or anamorphic lens), several custom optical components enabling use of the smartphone's front-facing camera as a stereopsis sensor (e.g., primarily a splitting mirror) or as a wide-field of view to augment the sides of a main front-facing camera, a wall mounted landing pad assembly for autonomous charging of the MCD devices, extending the operational freedom to multiple charging cycles, an optional smart watch or band (e.g., part of or the entirety of a user device) to control or provide bio-information to the MCD, application software and algorithm suite in the smartphone and/or cloud, and/or the like.

The MCD can incorporate a new flexible application programming interface (API) that may incorporate a drone API (e.g., Parrot's A.R. drone iPad SDK). An API can provide access to a layer of functionality to allow programs access to any suitable sensors, processors, and/or flight controls. This approach may provide many of the basic MCD flight functions, relatively low development and consumer material costs, and/or rapid time-to-market. In addition, the software may support many different hardware platforms, thereby enabling a software licensing business model.

Figure 4:
FIG. 4 shows an illustrative cradle for supporting an MCD, according to at least one embodiment.
Figure 7:
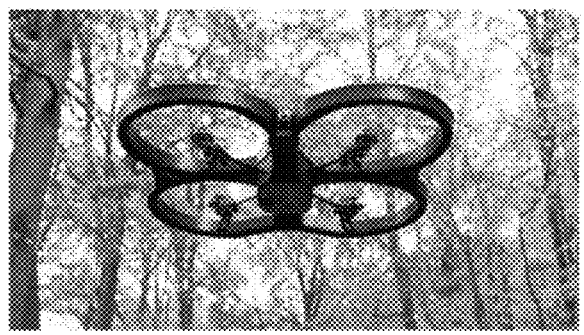
FIG. 7 shows a conventional quadcopter flying drone.

FIG. 4 shows an illustrative system 400 that may include an MCD holding assembly 410 that be used to mount a smartphone 420 (or other MCD) to a quad-copter drone assembly or any other suitable assembly (e.g., as shown in FIG. 7). Holding assembly 410 can include multiple air-cushion balls (not shown) to protect the user's smartphone 420 in the event system 400 drops to the ground unexpectedly. Note, the previously described "Smart Tripod" version of the MCD can be constructed similar to this system, but without the flying platform.

Figure 5:
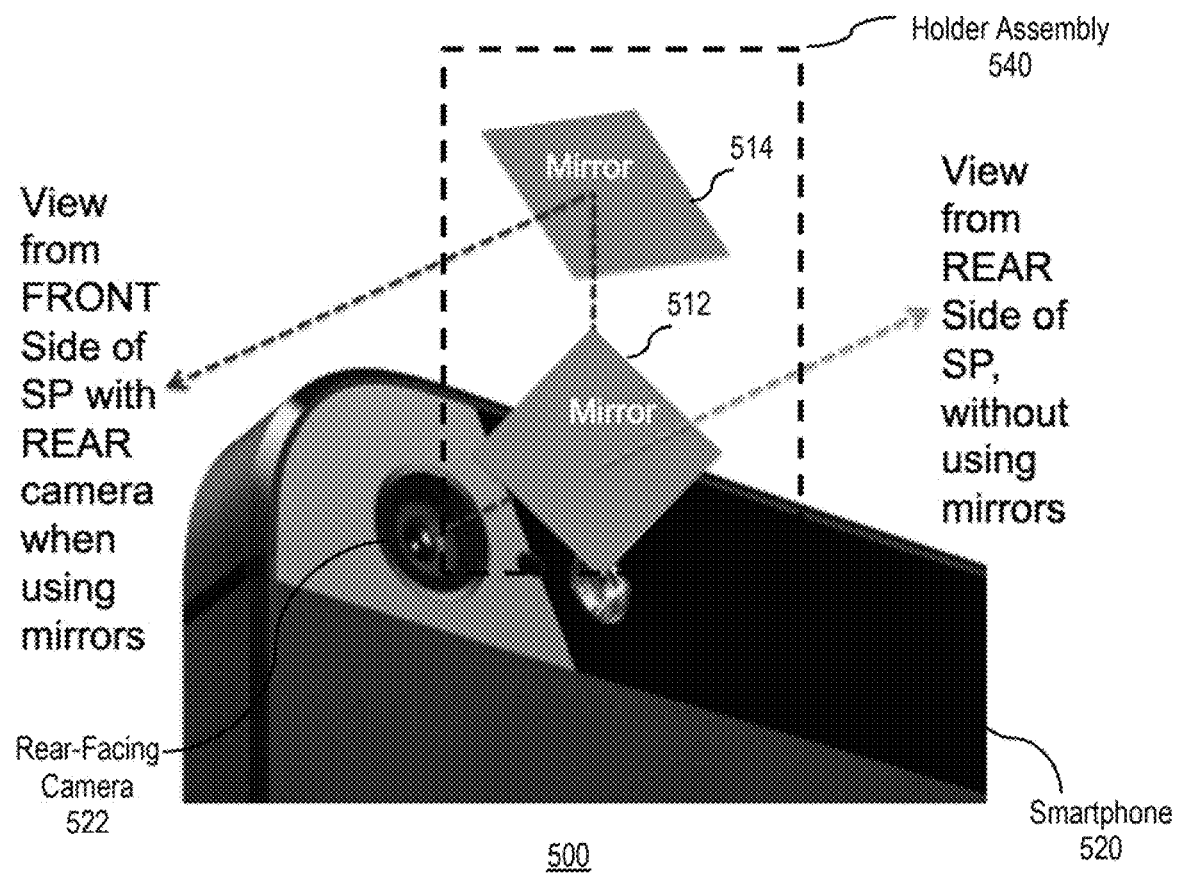
FIG. 5 shows an illustrative mirror arrangement for use with an MCD, according to at least one embodiment.

FIG. 5 shows an illustrative system 500 that may include an attachment assembly 510 that may be removably coupled to a smartphone 520 (e.g., a custom smartphone attachment assembly). Attachment assembly 510 can include optical components, such as mirrors 512 and 514 that can repurpose one or more cameras of smartphone 520, such as a front-facing camera (not shown) and/or a rear-facing camera 522. Typically, rear-facing camera 522 may contain the highest performing image sensors in smartphone 520. With two mirrors, assembly 510 may be operative to convert rear-facing camera 522 into a Selfie-purposed camera that may be operative to take photos of the user and present them on the front-facing smartphone screen (not shown) for viewing. Also, many smartphones may utilize a lower performing (e.g., resolution and dynamic range) sensor for viewing the user for applications like video conferencing and Selfies. In the MCD case, that sensor may be utilized to locate and stabilize position marker LEDs strategically located in the room (e.g., stabilization, as described in more detail herein).

Another embodiment of the MCD may be referred to herein as an "integrated MCD" product. Such an MCD may include one or several devices, including, but not limited to, an optional off-the-shelf smartphone (e.g., a customer's smartphone could be integrated into this platform), a custom MCD with new modules and flight technology, use of off-the-shelf sensors, memory, processors, and/or other silicon components, a custom enclosure for the MCD (e.g., with unique/new optimizations possible (e.g., the device form factor, cosmetics, and/or capture performance can be optimized)), a wall mounted landing pad assembly for autonomous charging of the MCDs (e.g., thereby extending the operational freedom to multiple charging cycles), an optional smart watch to control or provide bio-information of a user wearing that watch to the MCD, application software and algorithm suite in the smartphone, landing pad, and/or cloud, and/or the like.

Yet another embodiment of the MCD may be referred to herein as an "Optimized MCD" product. Such an optimized MCD may include one or several devices, including, but not limited to, everything in the Integrated MCD solution with the addition of custom silicon for lower cost, smaller size, lighter, longer flight cycles, and/or improved image/audio quality, enhanced application software and algorithm suite in each of the smartphone, landing pad, and cloud, a wall mounted landing pad assembly for autonomous charging of the MCD devices (e.g., thereby extending the operational freedom to multiple charging cycles), an optional smart watch to control or provide bio-information to the MCD, and/or the like.

Figure 6A:
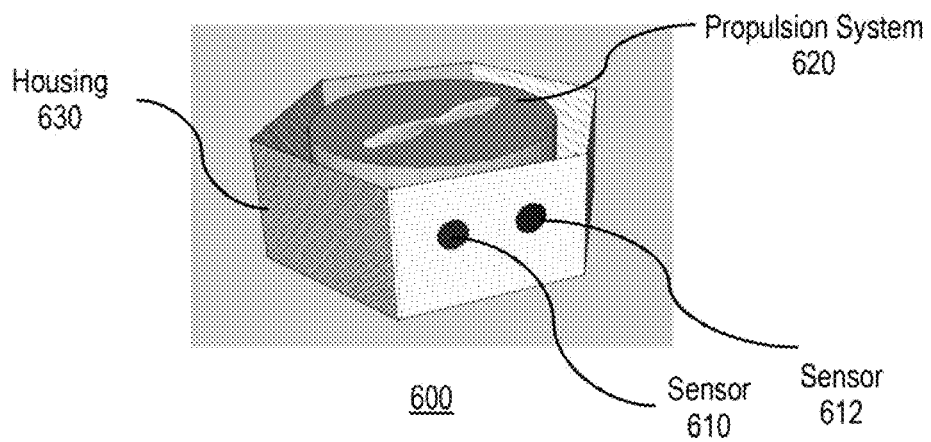
FIG. 6A shows an illustrative autonomous flying MCD, according to at least one embodiment.
Figure 6B:
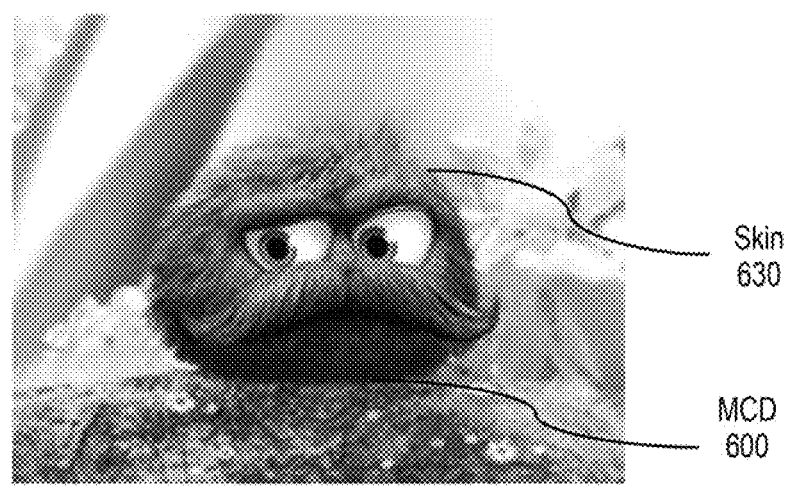
FIG. 6B shows an illustrative skin that can be applied to the autonomous flying MCD of FIG. 6A, according to at least one embodiment.

The MCD physical form may resemble something akin to that shown in FIG. 6A. As shown in FIG. 6A, an MCD 600 can include two image sensors 610 and 612, a propulsion system 620 (e.g., a propeller), and a housing 630. Note different textures for different panels of housing 630 may be provided for helping other neighboring MCDs recognize different MCDs and/or orientations of different MCDs. Various skins may be applied to housing 630 to change its appearance. For example, a skin 630 may be provided over at least a portion of MCD 600, where skin 630 can resemble something familiar, such as a face, as shown in FIG. 6B. Such a skin 630 may provide a personalized appearance of MCD 600.

A landing pad of an MCD may be operative to connect to power (e.g., AC power) via outlets (e.g., to provide automatic battery recharging). The MCD may be operative to move to such a landing pad "before" power of the MCD is dissipated. Automatic battery swap may be another approach that may speed recharge to less than a minute.

Figure 8:
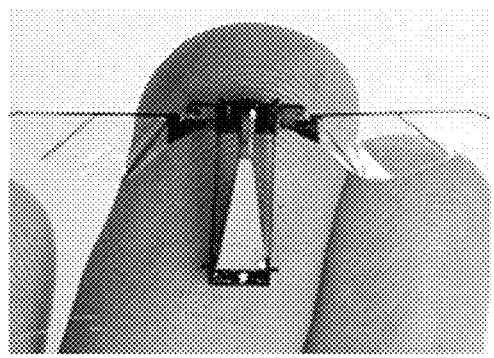
FIG. 8 shows a conventional "bug sized" flying drone.
Figure 9:
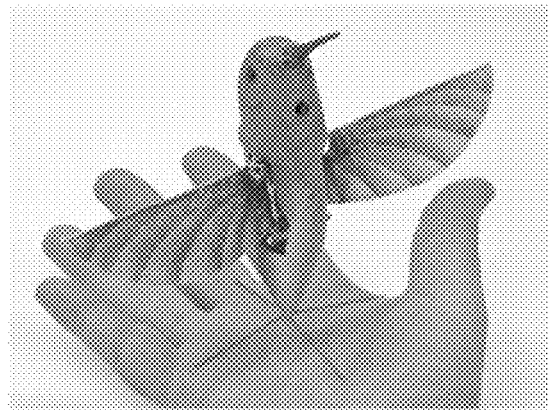
FIG. 9 shows a conventional "bird sized" flying drone.

The flight technology is improving from today's relatively large, noisy, and limited battery life to highly integrated solutions as follows. FIG. 7 shows a conventional Parrot AR quad-copter 700 with a 720p HD camera on-board and iPhone API control. Acoustic noise and image quality limits this platform. As flight technology improves from today's relatively large, noisy, and limited battery life, highly integrated solutions may emerge as follows. For example, FIG. 8 shows a fly-sized prototype 800 from Robert Woods at Harvard. FIG. 9 shows a DARPA-funded project 900 to make a hummingbird with a camera. Each function with remote-controlled flight, yet with limitations. A version of the "Optimized MCD" can utilize such flight solutions.

A useful flight platform for an "indoor" MCD may be a "Quiet Platform", which may be operative to employ a unique solution for flight that may be quiet. Multi-copter drone flight technology has become inexpensive, yet has the annoying disadvantage of substantial acoustic noise in operation, limited flight times, and instability to wind or obstacles, all of which one or more MCDs of this disclosure may solve. For an indoor MCD where users wish to go about their usual lives without added acoustic noise, this Quiet technology may be a requirement. Adopting some of the principles of a Roziére hybrid balloon, where a combination of helium and hot air gas may provide buoyancy to float up into the air, and, as a result, may be more fuel efficient and/or may have longer flight time, the Quiet MCD approach may provide two chambers for lift (e.g., one of helium and one of hot air) that may be coupled with a propeller for limited periodic vertical lift. As a modification of the basic Roziére approach, the Quiet MCD may also employ a slower and therefore quieter gimbaled helicopter motor for horizontal movement and control. Finally, the air chambers may be charged in two ways. Helium may provide an initial ballast to counteract the weight of the MCD assembly, and may be charged by filling the chamber at a local store, much the same way as party balloons are charged (e.g., filled). As well, hot air may be used to counteract atmospheric pressure changes and to move to different levels in the user's home (e.g., within a room or to a different floor). The MCD Landing pad may supply heated air to the Quiet MCD's hot air chamber. The landing pad can include an assembly like a small hair dryer to charge the hot air chamber, with power provided by the home's AC main power receptacle.

Such a hybrid air lift approach (e.g., helium, hot air, and propeller) may be much more fuel efficient (e.g., for a longer battery life) than conventional hot air and/or propeller methods. A cubic foot of air may lift 3 grams at 100 degrees of heat. The Quiet MCD may have less air (e.g., somewhere near 6 inches cubic), but may only need a portion of a gram to move up and down when in use. As well, a gimbaled helicopter motor can start up and move the Quiet MCD when necessary to target the Landing pad. However, when in typical use of moving to a subject and photographing or videoing a scene, the Quiet MCD may remain quiet when using this "air balloon" lift. Finally, because the MCD may be smart, it can calculate how much battery life is remaining and select between Quiet and "louder" modes of flight, then automatically return to the Landing Pad for charging of the battery and heating the air in the chamber.

Another benefit of a Quiet MCD approach may be longer battery life. The device can operate for longer periods without using the multi-copter approach for lift as heavier batteries and multi-copter components might not be used. Overall, the Quiet MCD may utilize extremely light modules and assemblies to be designed into the MCD. This may utilize much customization of components and use of lightweight materials.

"Perceptual Processing Core Functions" may now be described. One or more of the following functions may be embedded within various versions of an MCD. Not all functions are necessary for each solution. Some embodiments may use conventional processors, located either in the MCD or the smartphone. Custom SOCs can be used for high-volume versions of the MCD. Some functions may be performed in either the MCD or the smartphone, versus in the cloud network. However, many processing functions may be located in any of those locations. In addition, a suite of functions and applications can be used in and further developed for the MCD.

The following sections highlight certain aspects of the listed Perceptual Processing functions. "Device Imaging Stabilization Function" may now be described. A stable flying device may be a requirement for an MCD. A quadcopter or other flying device may use a combination of one or more of the following low-cost devices: (1) MEMS-based gyro for stabilization, (2) acoustic sonar for proximity detection (e.g., to the floor or wall), and/or (3) inertial sensors that may compensate for variations in propeller blade motion and ambient wind disturbances. However, to achieve stable and robust flight at a limited cost-of-materials, low-cost devices may rely on a user to effectively stabilize and direct the flight using visual feedback on a screen of where the device is located, and subsequent navigation with hand controls.

An MCD may incorporate active illumination and fast sensing techniques with an ultrafast closed loop to yield an "ultra-stabilized" flight platform. Functionally, this may create an "air" tripod with the stability of a tripod, yet in the air. As a result, the MCD can adopt longer exposures for the capture of photographs, minimizing the use of a flash illumination, which can yield higher quality shots and consume less power. As well with this advanced stabilization, more advanced frame accumulation methods may be supported for accurate position and rotation of the MCD. The device may achieve self-stabilization with active multi-dimensional ranging, coupled with fixed-object edge detection and tracking. Another important aspect of the MCD may include this removal of a user, which may typically have limited flight skills, from navigation as the device may be autonomous.

Similar to skilled photographers looking for a stable platform (e.g., like a wall to lean onto or a tripod) to stabilize their camera, the MCD as well can move to a still object, like a wall or window frame and push up against it to further increase stability in dynamic wind situations.

A tripod mode (e.g., a solid image stabilization mode) may be provided. An active illumination and ultrafast closed loop stabilization may enable an MCD to behave like a "virtual or air" tripod. With this method, a camera may be placed virtually anywhere, yet with the stabilization of a fixed mount mechanical tripod. As a result, non-blurred long exposure photographs may become practical in most if not all situations. A centroid tracking method may be provided to include one or more of the following: (1) placement of at least two IR-LED illuminators around the room and within the field of view (FOV) of n MCD at all times (e.g., occlusion may minimize successful operation, so ceiling mounting may be preferred), (2) a generalized processor (e.g., such as in a smartphone or in a landing pad) may initially be used to "find" the IR-LED's location in the FOV (e.g., a simplest method may be to flash the LED at 30 fps, then difference two sequential images and convolve with a "dot" to show the LED locations), (3) an MCD image sensor and lens may then image the IR-LEDs at high speed and may yield a strong signal-to-noise relative to the background for the tracking gate (e.g., the small area of the sensed image near the LED), where only a small percentage of the image sensor may be read out, thereby resulting in frame rates 1,000 times faster than usual (e.g., 30 microseconds), (4) a histogram area registers in a VLSI, memory or FPGA for several regions that may create circular capture areas around a central point (e.g., the center may be determined and then used by a centroid tracker algorithm). (5) an embedded histogram algorithm hardcoded or in software in a VLSI, memory or FPGA may provide sub-frame rate frame operation (e.g., to essentially count the number of pixels at each digital number in each region), (6) a second set of histogram registers for the previous tracking gate may be used, (7) logic may be provided to analyze the registers to find the x-y shift or error correction needed of the "center" of the image, which may represent the shift value necessary for the MCD to move to center the LED in the track gate, and (8) comparison logic may be used to ensure the error is decreasing as lock may be maintained. Note, a generalized processor may be used as well, yet may limit the closed loop latency of the stabilization somewhat. Ultimate performance may result with the hardware histogram centroid tracker.

A non-tripod mode (e.g., less stable operation) may be provided. The non-tripod mode may be defined as one where the camera may be less stable than the "tripod mode" above, which may somewhat compromise image quality in some situations. In some embodiments, stabilization can be achieved via a smartphone's sensors and processors. However, with typical long latency of data/image collection and processing within a smartphone, that solution may compromise accuracy. Also in this case, two small windows may be tracked to stabilize the MCD. For the smartphone, the front camera may be optically split with mirrors to extend the field of view the 180 degrees (e.g., similar to what may be shown in FIG. 5).

The effect of poorer flight stabilization may be to reduce image capture time to prevent blurring. This may reduce the low light performance of the device. For example, with a highly sensitive, high-resolution image sensor, that may be used with short integration times, some instability in the MCD can be tolerated and resultantly capture a good image. This may be the tradeoff of cost and processing in the MCD vs. use of the higher latency of connection to and processing on the smartphone. For imaging stabilization, various algorithms can detect objects and recognize location markers in the room. The MCD may be provided with and/or leverage algorithms that may use edge or feature detection and tracking of small local areas to minimize processing requirements.

Autonomous Device Pointing/Positioning to the "Interesting" Subject Function and "Proper" Exposure modes may be provided. Several techniques may be employed to recognize and track interesting subjects for subsequent picture-taking decision making. For example, the device may recognize certain pre-enrolled personal objects. These may include, but are not limited to, (a) moving objects (e.g., family members, the dog, the cat, etc.) and (b) fixed objects (e.g., the location of the device in the room, determination of which room the device is in, the illumination level and light direction, etc.). For use indoors (e.g., in one's home or office), QR-codes or similar techniques may be employed at strategic locations in each room, such as at the landing pads. Therefore, the MCD may easily recognize the QR codes (e.g., through use of any suitable capture and processing algorithms) and then may know where it is within the room by comparing to a map that includes the QR code location. With the use of a pre-recorded map (e.g., either a personalized map of one's home, or generally-available maps on the internet of public places) and these QR codes, and geometry processing, an MCD may then know how to determine local and global geometry (e.g., a key ingredient of autonomous perceptual photography). This may eliminate the need for a power-consuming GPS device in an MCD or indoor situations where GPS satellite signals are not available. However, when an MCD is near one's mobile phone, that device's GPS can as well indicate location, especially when used outdoors.

Determining exposure, or the length of time necessary to integrate an image sensor to create an image that may appropriately saturate a scene for full dynamic range and vibrant picture, may be paramount to creating pleasing photographs or capturing other suitable media. For low light situations, a longer exposure may be dictated. For the MCD, several methods may be employed to determine the proper exposure. Most high-end cameras may use photometers to indicate the exposure needed, then offer modes of operation like fully automatic with flash, without flash, aperture priority (e.g., an iris to stop down the light entering the lens), shutter or time exposure priority, or others to control the optics and sensors for proper exposure of the sensor. In most cases, the automatic mode may work well, but many complex illumination cases may prevent fully successful photography. The MCD may use "smart scene illumination detection" and processing to prevent this situation.

"Smart Scene Illumination Detection" may be provided. An example situation and algorithm for "smart" image capture may be discussed in connection with pictures 1000a-1000d of respective FIGS. 10A-10D. For such a picture sequence from picture 1000a to picture 1000b to picture 1000c, to picture 1000d, a variety of conditions can be seen that result in improper visual recording of a scene. In particular, the scene contains mountains, a lake, subjects (persons), and a distinct low angle sun near setting. Uniquely, the MCD may have available information (e.g., from local sensors and/or from remote data sources) about the location (e.g., Lake Tahoe), the time (e.g., nearing sunset), and weather (e.g., sunny), all enabling a smart determination of illumination levels and angles. With this information, the ideal pose and exposure can be automatically determined.

Figure 10A:
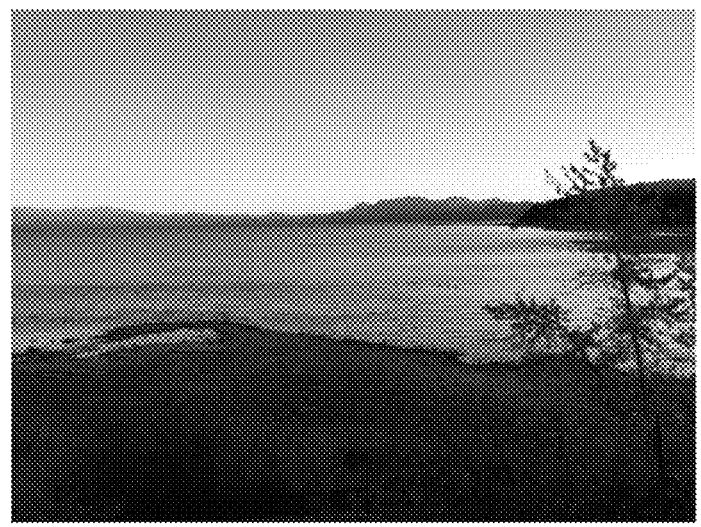
FIGS. 10A-10D show a progression of different photographs taken with an MCD, according to at least one embodiment.

Picture 1000a of FIG. 10A may be relatively poor as it may use an average of many points across the image to determine exposure and it may be pointing across shadows in the image. The advantage of using an average in this camera's auto-exposure may be that we see many objects in the image. The mountains can be seen, but the trees may be washed out. An alternative picture exposure may show detail and color in the trees, but no detail for the mountains or lake.

Figure 10B:
Figure 10C:
Figure 10D:

Picture 1000b of FIG. 10B may be at the same compass angle (e.g., about 45 degrees south of the sun), but at a different exposure time and a wider field-of-view. This shows a better rendition. Picture 1000c of FIG. 10C may be 180 degrees from the setting sun (e.g., pointing away from the sun), showing good exposure and contrast. This may be a preferred location for a photograph of the subject, with mountains, lake, and color in the trees in the background. However, the exposure must still be optimized for a balance of specific objects and features in the image to create high contrast and proper rendition. The MCD may be operative to instruct the user to place the subject (e.g., a human) in this orientation, to result in picture 1000d of FIG. 10D.

For extremely complex scenes with very high dynamic range and variable lighting, it may be necessary to take multiple shots at different exposures and concatenate the imagery from those multiple exposures into one final image. However, the MCD may attempt to optimize the pose and exposure to minimize those cases. Likewise, the use of flash may be minimized to prevent color distortions associated with flash color temperature. In all cases, it may be preferable to move the MCD and subjects to create the ideal photograph and video.

Navigation for Device Collision Avoidance with Objects while in Flight may be provided. Several techniques may be employed to prevent collision and/or to simplify navigation of an autonomous camera. As a device can hover or land, safe indoor navigation can be achieved by essentially stopping the device (e.g., with hover or landing) until the sensing, processing, and analysis of the objects in the room can be achieved. This may provide a lower-cost and lower-power platform than one that must operate in continuous real-time. Here, as in life, when complex processing is more than the device can handle, it simply dwells (or stalls) until a decision is made about where to fly next. The device may be robust enough in construction to handle collisions. Navigation thru the room may include projection of location to the floor, onto a pre-recorded map of the room. Outdoor navigation can be achieved by likewise projection onto the ground and use of a map such as available from popular destinations like parks, such as with Google maps. Depending on the mode of use, the device may follow or lead the user to interesting locations for Selfie/Groupie picture capture.

Object detection and recognition may be key algorithms to enable these functions. The MCD may contain one or more algorithms that may be operative to enable one or more of detecting motion in a scene (e.g., difference or optical flow) and tracking those objects (e.g., typically biological forms, people, animals, etc.), object locking modes, detecting and discriminating between biological forms and terrain-based and/or architectural-based objects, determining auto pose, locating and/or recognizing markers including QR codes, dwell navigation, advanced collision avoidance, and/or projecting to the floor (e.g., for navigation). Detecting motion in a scene (e.g., difference or optical flow) and/or tracking those objects (e.g., typically biological forms, people, animals, etc.) may be enabled by one or more algorithms that may be deployed as a function of an application domain for adaptive power control. Simple scenes may be decomposed into lower-resolution photos of interesting subjects, which may be either processed by either SIFT or SURF algorithms locally, or sent to the cloud for convolution-based deep recognition. Once recognized, an object tracker may be invoked for negating any need to recognize the object again for some time. The object tracker may be a simple centroid difference tracker. An object locking mode may be enabled by one or more algorithms. For example, in the case where a user may define a desired object for subsequent photography, the MCD may center the camera to the object and the tracker may be operative to enable the MCD to "hold" the object until the proper pose may be determined. One or more algorithms may be provided to enable the detecting and/or discriminating between biological forms (e.g., people, animals, etc.) and terrain-based forms and architectural-based objects (e.g., chairs, tables, etc.). For example, local processing may perform local feature matching. However, cloud-based convolution matching may be invoked when necessary if recognition may not be achieved locally. On-line cloud-based "deep" recognition may be readily available from OEMs (e.g., images.google.com). A simpler method of identifying the candidate for the capture may include the use of markers on the object. For example, the intended subject to be photographed could wear a unique identifier, such as a badge, an illuminated Infrared LED pin, a specific color hat or pin or others. These may be easier or faster to identify than facial recognition for some applications. One or more algorithms may be provided that may enable auto pose determination using object identification, face ID, eye-tracking, audio, and/or other algorithms to find one or more subjects to be photographed. The orientation of the object may be tracked to establish a pose for the next photo capture. One or more algorithms may be provided to enable the location and/or recognition of any suitable markers (e.g., QR codes) to eventually determine location. A navigation algorithm may utilize either GPS or QR codes to establish location of the MCD in real-time. The algorithm may then place the MCD on a map with projection, which may assist decision making for subsequent repositioning of the MCD. One or more algorithms may be provided to enable dwell navigation, which may adjust tracking speed and direction, which may update the MCD's location until the next QR code may be recognized. One or more algorithms may be provided to enable an advanced collision avoidance functionality. As objects increase in size and/or as depth queues are indicated with 3D sensing methods (e.g., stereo, time-of-flight sensors or structured light—depending on the model of MCD), then the MCD may slow down or stop forward motion to prevent collision. The minimal MCD may include stereo depth measurement algorithms. The "slow-down or halt" mode may also be invoked when vision processing (e.g., either processed in the MCD, other devices, or all the way to the Internet) does not complete at sufficient speed or latency to continue navigation to a new position. Once the situation or latency has improved, or the demand for fast latency has subsided (e.g., when the object has moved away), then normal operation may continue. Additionally or alternatively, one or more algorithms may be provided for enabling projecting to the floor (e.g., for navigation). The MCD can use stereo and depth disparity to estimate a position on a map. Depending on the version of the MCD, specifically versions that may rely on a smartphone for computation, processing latency may dictate the use of other methods for navigation and stabilization, including use of sonar sensors and range calculation processors.

An Image/Information Capture Quality Improvement Function may be provided. Beyond conventional ISP (image system processing) camera functions, MCDs can use these perceptual technologies and free-flight to improve the quality of image capture by preventing blur. These stabilization and exposure methods may alleviate the common problem of low sensitivity and long exposure times which may create motion blur caused by moving/jitter a camera-phone. Although some rapidly moving objects moving within the field-of-view may not necessarily be de-blurred with one or more of these techniques.

The nature of a camera that can automatically reposition itself may be very helpful in photographing scenes with selective removal of subjects or objects. This can be easily achieved by either moving the camera to a different point of view, around an obstruction, to fill-in the previously obstructed portion of the scene. As well, methods such as created by Scalado, whereby a sequence of scenes may be used to selectively remove moving objects, can be programmed into the MCD. Advancements are now possible to such methods, as an MCD can move about or stutter to collect background scenes rather than stall for longer periods as video is collected and processed to remove the unwanted subjects in the scene. As well, the subjects-to-be-removed can be stationary because the MCD may change pose to see behind those stationary objects. Advanced image stitching algorithms can combine multiple samples for a combined resolution enhancement.

360-degrees Swipe and Depth (e.g., Spin-Snap™) may be provided. An MCD can create/capture high-resolution photographs and video. However, the use of very high-resolution, wide-angle image sensors may be costly and may demand substantial power. So, the adoption of scanning methods with lower cost/power sensors may be a preferred method. The tradeoff of distortion over time due to subject motion may somewhat limit this, but not significantly for many applications. The MCD being in flight and hovering about may create an ideal platform for scan and stitch image capture. This may be similar to satellite photography where linear sensors may be used to capture high quality pictures using the motion of the satellite's orbit to capture pixels in a scan direction. With the MCD, the camera may be easily rotated to create this same benefit. Essentially a long narrow sensor may be used. Then the sensor may scan as the MCD rotates and accumulates the picture into memory (e.g., on the camera). With this, a full 360-degree picture may be possible. As a result, a Selfie would be captured of not only the subject, but also of the other subjects and terrain they are viewing (e.g., the Grand Canyon). Ideally, the spin rate of the MCD and the sensors may be synchronized to minimize blurring. As well, the resolution of the image may be incredibly large and with the substantially larger image computation power available in certain processors, the stitching may be easier and/or improved versus the quality available certain smartphone handheld panoramic stitching.

Time-shifted Still Superposition may be provided. Advanced spatial and temporal stitching and superposition algorithms may be used with an MCD to re-create higher quality and higher resolution images than that of the sensors. Essentially a mosaic of images from multiple times or poses may be selected and processed to create an improved image (e.g., improved dynamic range, sensitivity, and/or resolution). As the MCD can be operative to reposition and take another picture quickly and automatically, the process may be complete and easy versus hand-operated sweep panorama methods that may be prone to user and algorithmic errors with frequent random sweeping styles.

A stitching algorithm may combine multiple images using convolution and matching to find similar features in each of the many overlapped sections in these images, then may employ spatial warping of each image to append the images together so that proper alignment results. The problems with certain stitching algorithms may include geometric bending because the images may be basically wide-angle shots and/or may show artifacts as each image is captured slowly as the user rotates by hand. With the MCD, a rapid and precise scan may minimize many of the artifacts.

Multi-Information (e.g., Spin-Snap™) modes may be provided. As rotation about the vertical axis becomes simple with an MCD, the fundamental image sensing technology may be adapted to capture imaging information that may enable better low-light photography and higher resolution. Leveraging concepts in Super-resolution methods (e.g., Pelican Imaging's 4×4 array sensing followed by super-resolution for resolution enhancement), the sensor may be spun about the vertical axis to capture a full 360-degree field-of-view, but more importantly to capture multiple samples of the same scene at different horizontal positions, that can be combined for subsequent image enhancement. The added captured information can be used to increase signal-to-noise, dynamic range, and/or resolution.

Stutter Depth Measurement may be enabled. Likewise depth information can be calculated from this stereopsis of multiple samples from multiple views. The MCD may then modulate or rapidly stutter between two different points of view. The spin rate and the integration time of the sensor can be individually programmed depending on the scene (e.g., illumination as a function of the sensors' sensitivity and/or resolution). Essentially the resultant vertical resolution may be established directly by the sensor selection, whereas the horizontal resolution may also depend on the horizontal spin rate and number of spins about the vertical axis. Rolling shutter effects (e.g., as may be created by temporal misalignment or chopping of the acquisition of a scene as integration starts and stops sequentially line-by-line) can be minimized by rotating the sensor so readout may occur vertically rather than with the conventional horizontal readout. Therefore, a 20 Megapixel sensor could extend to 50 or 60 Megapixels in resolution, and beyond.

Likewise depth and 3D measurements may be simple to extract and compute with the Spin-Snap™ approach. Essentially, stereopsis and multiple views of visible or infrared images may be obtained by a simple scanning and capture sequence. Then image processing may synthesize the information or images as appropriate.

A Virtual Multi-array of Sensors may be provided and/or leveraged. An MCD's ability to rotate and/or move to any position can be used to create an array of multiple sensors (e.g., like Pelican's multiple arrays), but they may capture over a sequence as the camera may move to the next position. This may be repeated until the outputs of the sensors can be processed, and this may continue. Many types of sensors (e.g., visible light sensors, infrared light sensors, or other sensors) can be used in this manner. As well, cost reduction may be realized as a limited number of sensors can be employed to create exceptional capture performance in resolution, depth of field, 3D, depth measurement, or other effects.

Full 3D capture may be enabled. Embodiments of the MCD can include a full array of image sensors to capture a volume of imagery in real-time rather than utilizing spinning to capture more resolution and viewpoints.

Time-shifted Video, and/or Hyperlapse may be enabled. Hyperlapse, or the creation of smooth-flowing sped-up video clips from sequences of high-speed POV (e.g., Point of View, where the camera may be providing the user a view from a different point of view than that where they are located), video clips (e.g., of www.instragram.com), such as from a cellphone, may be improved with the MCD as well. Stabilization of the video may become vital for these "sub-sampled" video streams. The spin-snap mode can alter the point-of-view automatically to create a scene as if it was hyper lapse processed. The MCD can move to the proper pose as a function of the scene content, like tracking an object or pathway in a scene rather than post processing as with hyper lapse.

Air panning and/or Pre-roll mode may be provided. Just as quad-copters with on-board cameras can emulate large-scale pans typical of professional film or video experiences, the MCD can automatically perform this type of entry and exit from personal experiences. Rather than simply taking a still image Selfie, the MCD may combine video to create a new entry experience, much like a movie lead-in clip.

Image and/or Video Filters may be provided. The MCD may integrate image processing to enhance the appearance of captured images and video. Users may feel better about distributing pictures with filters rather than raw photos to social networks. The algorithms can simply enhance the colors and contrast, change the texture of skin, or even alter the shape of one's face and body to appear more appealing to one's social community. The MCD platform may include these capabilities.

Photography Expert System Functionality may be provided. The MCD photographic experience can employ one or more algorithms to interpret the surroundings and take high quality photographs. A collection of rules may be embedded into an expert system to direct the camera autonomously in all situations. The MCD may contain or otherwise have access to software for the purpose of analyzing the surroundings and/or the key elements within the visible range of the MCD (e.g., features like the location of the horizon, subjects, and their locations). Further, the MCD's software may use these pre-defined rules of photography, knowledge about the user's intent, and/or measurement of these specific visual features, to decide if, when, and/or how to capture the best photograph or video at that time or location. The decision may be made by essentially "scoring" the potential for a good photograph by comparing the surrounding feature data with that pre-defined information embedded in the photographic expert system. The expert system may change and improve over time as it learns what constitutes a better picture for a particular user.

Photographic Rules, Learning, and Teaching may be provided. The MCD may have a learning system. The aspect of an architecture optimized for imaging rules and in application to automatic photography rules may be provided. Many parameters may be vital to capture great pictures. Professional and enthusiast photographers may learn several of these with experience or education. The MCD can include many of these parameters in memory to provide guidance in taking pictures. Examples may include, but are not limited to, how one prefers illumination at 45 degrees and near horizon (e.g., sunrise, 30-degrees from Sunset to Sunset) and secondarily illumination from the rear, how one prefers a downward view for Selfie (e.g., if owner has a double chin), how one prefers rectilinear geometry for pose determination (e.g., edges may be aligned to a vanishing point, and horizontal/vertical lines may be just that, not skewed), how one usually prefers "interesting subjects" of a photograph or video to be located in the center and zoomed in to occupy a reasonable portion of the picture, how, for situations where glass may be behind the subject, the MCD must ensure rotation of pose to occlude the flash reflection with the subject, and/or how, for fireworks displays, variations in exposure time and pose may create widely varying results. An automatic and autonomous camera with communication of local photography and video optimizations may ensure higher quality capture of the experience, with less distraction for the camera owner, which may enable enjoyment of the full experience without interruption from the picture taking process. For social situations, many may prefer photographs with happy subjects. The MCD may be operative to employ one or more algorithms to identify and/or encourage such a condition. Increases in volume may be detected and operative to indicate social happiness or anger, or at least an elevated engagement. Using face detection and/or smile detection algorithms, the platform may be operative to discriminate happiness from anger. A smile may be associated with the shape of the mouth and eyes versus a normal face. However, extreme happiness, or a super happy state, may additionally or alternatively be detected by looking at the tilt of the subject's head (e.g., super happy people often tilt their heads) and may be a condition for triggering the camera to capture a scene. For some social interaction, the MCD may be operative to utilize emotive dynamic gesture recognition and analytics to form a decision about when to capture a photo or other media. The different types of emotion may be identified and monitored for the amount of time that emotion is active in the subjects. This strength of emotion (e.g., which may be recorded as the number of emotive events and the length of time) may be recorded continuously so that at any time, these strengths may provide a measure of emotion gesture presence, which may then be operative to drive capture automation to either take more photos or switch to a video mode to retain a strong emotion event in a more profound way (e.g., video over just still pictures).

One method to represent the intent of the user may include asking the user questions before use of the MCD, such as please rank the priority order in which you like captured media of the following subjects: your dog (e.g., especially when sleeping or looking cute), your kids doing things, but silent, selfies and groupies, sunsets/sunrises, birds, gardens, forests, animals, terrain (e.g., mountains, seaside, lakes, etc.), adventure and wildlife, people that look like the people you know, places you've been to or want to go to, family tree, high quality vs. low quality (e.g., poor focus), locations corrected by actual objects (e.g., pictures of your boat house from the south, interior vs. exterior, etc.), and people in floral situations. Another method to determine and/or represent the intent of a user of the MCD may include direct analysis of the content contained within the user's "favorites" media library (e.g., photographic and video libraries). An example may be a user's "Instagram Likes" or "Apple Photos Favorite" folder. Such favorite content may identify the type of content that the user prefers or finds interesting for some reason. Such favorite content may be analyzed by the MCD subsystem to extract information indicative of and/or common to the favorite content (e.g., preferred subjects (e.g., pictures of the user's daughter) and/or media style preferences (e.g., black and white photographs are preferred over color photographs), etc.). Media content recognition algorithms (e.g., visual content algorithms and/or audio content algorithms) may be used (e.g., locally or at a remote server) to recognize (e.g., automatically) the content of the media, the types of styles of the media, and/or, perhaps ultimately, the categories of emotions that may be determined to be important to and/or preferred by the user. Such information may then be leveraged by the MCD subsystem to help choose what new media to capture and/or share.

The MCD software may be operative to categorize photos/videos into several categories for intelligent photo libraries. This may include tagging each file with these and other categories (e.g., pictures of dogs, girls, boys, cats, cars, etc.). Thus, the MCD can seek for and take photos with those objects in the field-of-view. It may attempt to take photographs of the window with the mountains or seaside in the view, moving to align for the best view. Most advanced, the device may be operative to never miss a shot because it's taking interesting photos autonomously, using these rules, without specific user intervention in many cases.

Automatic Pose/Shot Expert System may be provided. An Auto-camera photo/pose Expert System may be operative to define or be controlled by positioning/photo pose rules, such as to center photo on the user (e.g., using detection of IR LED and/or hand gestures, discovery of location of tags on a person and/or of a landing pad, and/or determination of the position to an owner as he/she speaks, etc.), to zoom in or out (e.g., move until all adjacent members are in FOV) as the MCD may create visual information (e.g., pictures or video) with the proper position and border depending on the scene content, to identify persons in field of view (e.g., move camera up or down as a function of the preference of the user), to seek to include desired objects in captured media (e.g., if it is known that the user likes pictures of mountains or water scenes (e.g., based on learned information), the device may seek to include those in the pictures), to align a pose to geometry of the scene (e.g., which may include the shape of the room, windows, and/or other features), and/or to move to a position in the center of the room to take the picture, rotating toward the desired subject. Additionally or alternatively, such rules may be operative to determine what to take a picture of and how, such as to enable the MCD to automatically snap photos just after launch, to automatically snap photos when all subjects have smiles, to automatically snap photos when all subjects are looking at the camera, to automatically snap photos when the subject stops moving, to automatically snap photos when the subject's emotion changes, to automatically edit or correct photos (e.g., on the MCD or PC) to increase the emotional response of the user (e.g., keep editing or cropping until a smile results), to determines what to take a picture of in the fully autonomous mode, and/or the like.

A Low-Light Auto Flutter mode may be provided. For low-light photography, the MCD can take multiple shots, and/or may align them and/or may combine them to create improved low-light sensitivity, automatically.

An Object-lock mode for Stills when moving mode may be provided. For photography situations where the photographer is in motion but taking photos of stationary objects, such as when in a car or boat as the vehicle moves in many directions as you're taking a picture of something near the moving vehicle, the MCD can be operative to stabilize to point to the object to be photographed as the vehicle moves about. When a user is driving around or riding a bike, holding up its smartphone to capture a photograph, most times the image is blurred due to the motion of the camera by one's hand moving up and down and changing perspective constantly. With the MCD, a subject or object lock mode may always move to maintain the object in the center of view AND prevent much of the blur associated with random motion of the camera.

A "Track and Follow low-light photography" mode may be provided. This mode may use the MCD to create exceptionally clean low-light photographs by stabilizing the camera's image capturing process with a "track and follow" mode. In low light situations, the MCD may track key objects frame to frame (e.g., where no blur is desired). A low resolution, high frame rate sensor may track the object by reading out several times for every time the higher resolution sensor is integrating the scene. As a result, exceptional low light photography may become simple with an off-the-self smartphone (e.g., for the case of the smartphone accessory MCD). The method may use two optical paths and independent control of the exposure times.

A Social Knowledge, Sharing, and Decision Function may be provided. The MCD, using stored social knowledge and perceptual processing (e.g., sometimes via the Internet) may be operative to determine the intent of the user. For example, either by query or analysis of the user's photo library, the types of shots (e.g., people, landscapes, etc.) and/or subjects (e.g., friends, dog, etc.) can be analyzed by the MCD application to resolve a priority scheme for future picture collection. This information can be collected and stored in a control database to assist in collection of high-priority shots, automatically. The information scoring can be available to the user either on a smartphone application or directly by viewing the display on the MCD.

Likewise sharing of the photos can occur automatically as mapped by a social database such as Facebook whereby friends may be categorized by what is shared with them. Segregating friends can be used to influence MCD behavior and sharing. The segregated group of friends may also provide feedback to the MCD in real time to drive and prioritize future information capture and modes, such as a still versus a video sequence.

Social Leaning of Autonomous Photography may be enabled. While the MCD may learn about the environment around the user and the user's intent, perhaps the most important aspect of the MCD may be its social-based human feedback and subsequent learning of what constitutes a "great" image, from a large group of humans. This learning can be shared with other cameras in the network, for a continuous improvement of picture taking abilities. This may be at a global level for all of imaging, which can change as the social views of what's good changes or evolves. In addition, knowledge databases may change with learning within one's circle of friends and/or at a global level for general photography. At a neighborhood level, the MCD camera may share great exposures or poses of certain common events, such as a fireworks display. That way, collectively, cameras can create better experiences over time.

Autonomous behavior, together with social feedback, may create a compelling combination to achieve never-before possible captured experiences. The rate of improvement can accelerate as well since all of these operations may be automatic and closed loop.

Photographic/Videographic Teaching with Autonomous Photography may be enabled. An MCD may learn, but likewise can teach a user to improve his/her photographic skills. By example and by explanation of methods used (e.g., using speech synthesis to recite phases to the user like: "let me know the effect of taking a picture or video that way"), the MCD may become a teacher of the "proper" methods for photography.

A New Immersive-Emotion Selfie may be enabled. A new type of imaging information collection for social expression, which may be defined as an "Immersive-Emotion Selfie (IES)", may create a new form of identity and emotion. Similar to how a photographer or videographer might use a high-end video or professional camera to capture images and bits of video to highlight a visual and audio "performance" by the user, the MCD can automatically perform this function. Uniquely, the MCD may be operative to automatically create an animation sequence, appending interesting frames together like a GIF or vine, by returning fundamentally to the exact proper position of when the subject(s) have returned with different apparel or expression, and/or the like. When concatenated by the MCD application, a new form of expression may result, similar to a GIF sequence, but with variable bits of sequences, information and audio based on a representation of the users emotion (e.g., ranging from anger, happiness, etc.). This new visual form may trigger a more emotional response from the viewers since it may be a more engaging form of expression.

The system also provides continuous measurement of the user's emotion with MCD cameras, microphones and human biometrics (e.g., with sports wrist bands or watches). The remote biometrics may enable the consumers of the visual information (e.g., the IES) to provide real-time feedback to the producer and adaption of the IES stream.

An Intelligent Emotion-based Control Function may be provided. The MCD, working with the smartphone, can determine the intent of the user, beyond the simple controls one would expect for a camera (e.g., adjust mode, take-a-picture, etc.), to an understanding of the user's emotions. Even simple commands, like "take-a-picture", may utilize gesture detection and voice commands. The concept may be to extend the "hands-free" usage of the MCD for control as well. Also, rather than controlling the device solely via a smartphone (e.g., via a smartphone's touch-screen), usage may be enabled when the smartphone is within the user's pocket. At advanced levels, the user may walk through a room and simply point to objects with a "take-a-picture-there" voice command for the MCD to queue-up shots so that the MCD may then position properly and capture shots at those pointed-to locations. At the most advanced, the MCD may park and slow down or speedup and snap quick pictures depending on the emotional state of the user. If the user's emotional state is happiness, more advanced and rapid capture may proceed. If the user's emotional state is sad or introspective, capture may slow.

FlutterCam User Interface and Modes of Operation may be provided and may include various user command methods. While the MCD may be autonomous, the user may control the device with a variety of techniques. The MCD may run either in an autonomous mode, under control of a rule base, or via manual user commands. In the manual mode, the user may command and control the device via audio commands or visual gestures (e.g., which could be either face or hand gestures). For example, the user may points at an object to enact a selfie, or may point at himself/herself to indicate to take a selfie of themselves.

The MCD can operate in one or more of several modes. For example, the MCD may be configured to operate in a "fully-autonomous mode, or hover mode", where the MCD may be zipping around taking pictures, like at a social gathering, taking selfies and groupies autonomously, or hovering in place waiting for the next image capture. Additionally or alternatively, the MCD may be configured to operate in a "yo-yo mode" or "hand-launch mode", where the MCD may be under control of the user to launch the MCD out, take a selfie and return to the owner. Additionally or alternatively, the MCD may be configured to operate in a "leading-the-user-mode", where the MCD may teach the user where to go to see awesome spots to take a selfie or other shot. Additionally or alternatively, the MCD may be configured to operate in a "follow-the-user-mode, or come-along mode", where the device may follow along behind the user or attached to the user snapping selfies, or other shots, where this mode may trigger one or more automatic pose determination algorithms for improved selfies. Additionally or alternatively, the MCD may be configured to operate in an "object tag/lock mode", where the device may be assigned to follow along an object (e.g., person, pet, or other entity). Additionally or alternatively, the MCD may be configured to operate in a "party or wedding mode", where the device may freely move about an event capturing a wide variety of pictures of virtually everyone and every event in the best pose, creating "full" coverage available immediately on the "wedding" social forum for review. Additionally or alternatively, the MCD may be configured to operate in a "find and recognize mode", where the device may locate specific individuals, autonomously, typically utilizing cloud-based data and search to "recognize" the individuals. Additionally or alternatively, the MCD may be configured to operate in a "forget this person mode", where the device may be informed not to take pictures of specific individuals. Additionally or alternatively, the MCD may be configured to operate in a "copy-but-Improved capture Mode", where the camera may follow the owner and take a picture of what the user has just captured (e.g., a copy-cat mode), such that the MCD may automatically select an improved pose, lighting, or exposure mode to create an improved picture in many different ways, where the benefits of the MCD technology can be easily seen as the shots are taken and compared. Additionally or alternatively, the MCD may be configured to operate in an "emotion detection mode", where the device may determine the emotional state of the users, where such states may include happiness or anger. The frequency, type, location and destination of the photos and video may be automatically selected by determination of the user's emotional state. Smiling and happiness (e.g., as may be determined by visual analysis and bio feedback like with a smartwatch) may be operative to trigger Selfie capture and auto-sending to one's friends. Additionally or alternatively, the MCD may be configured to operate in a "person-of-interest mode", where the device may recognize the presence of such interesting person or pet or other entity and then follow it to capture photos of that object. This could be the star of a party, or an intruder in a security application. Additionally or alternatively, the MCD may be configured to operate in a "no-photo-bomb privacy capture mode", where the device may selectively remove subjects from a photo or video. This may employ an algorithm that may be operative to find a subject or subjects, but then erase them (or just leaves an outline of the removed subject) for privacy purposes, except the desired or intended subject (e.g., an intruder). Additionally or alternatively, the MCD may be configured to operate in an "interesting-subject-only capture mode", where the device may remove other subjects from the picture by processing multiple frames for "uncovering" of occluded portions of a scene. In this mode, the parents may be enrolled into a child's MCD when in this mode. Additionally or alternatively, the MCD may be configured to operate in an "Oculus or Google Glass mode", where the device may move in unison with the user and provide visual information of the user's position pose and situation. Additionally or alternatively, the MCD may be configured to operate in a "Filter mode", where the device may employ image processing to improve the pictures. This may include blemish removal and/or color adjustment.

Control of the device may be enabled in any suitable manner, such as by voice commands, hand/face/body gesture commands, or a combination thereof. Using a limited and speaker-dependent vocabulary may simplify the task of recognition. The user can speak in any known language, such as "hold still, stay, sit down . . . " or others. Commands can be programed to be any word, utterance, vernacular, or favorite or popular form of speech for that specific MCD.

In an Auto Shot Copy mode, an MCD may be operative to automatically take shots of what a user just took a picture of with his other camera (e.g., camera-phone, point-n-shoot, or other). The MCD may be operative to watch and/or listen for sounds, actions or commands, and look at a user's pose to interpret what it is taking a picture of, then repeat and improve with the MCD.

An Auto Free Rotation and Object Lock Mode may be provided. The MCD may automatically rotate to image an object in a scene to create a smooth, stable repositioning while capturing, thereby eliminating motion blur and creating a smooth hyper-flow-like video imagery, rather than requiring compute intensive hyper-flow post processing. A moving object may dictate the positioning of the MCD rather than the user, which may create a sequence that looks as if a movie camera operator was involved in creating the sequence, and directly minimizing motion blur as a result of smooth target tracking of the moving object. Algorithms to track the object and map those within a smooth trajectory for the flight path of the MCD may be used. These algorithms may use an automatic feedback loop driven by error from the ideal trajectory to provide a smooth object lock mode.

A Live broadcast Mode may be provided. With direct Internet connection (e.g., directly or via the smartphone), the MCD can operate to stream "Live" broadcast video directly from the camera for sharing of live events.

Figure 11A:
FIGS. 11A and 11B show different photographs taken with an MCD, according to at least one embodiment.
Figure 11B:

A Geometric Position Capture Trigger Mode may be provided. The MCD can automatically create selective-content time-lapse photos, similar to those in pictures 1100a and 1100b of respective FIGS. 11A and 11B. The process may include any suitable steps while holding the MCD camera at one position, such as taking a reference photo (e.g., for use as a background image), then adding a subject (e.g., a person or other object) at one position, then adding another subject (e.g., a person or other object) at another location, and then repeating to acquire as many objects as desired (e.g., using geometric triggers).

For the MCD, a geometric position capture trigger mode may contain one or more algorithms that may be operative to automatically capture an image when a specific position is occupied by the subject which is to be recorded. As a result, pictures like pictures 1100a and 1100b of FIGS. 11A and 11B may be captured automatically by the MCD. Applications may include security and photographs with multiple "views" of the subject. Subject recognition may also be helpful in many applications. With the MCD, more complex selective content photographs may be possible as the MCD can move to different positions to create montage photos at different times and positions, all automatically.

A Hyper-Resolution Scan Mode may be provided. This mode may utilize an MCD's tightly-controlled scan rate to capture and stitch multiple swaths of a scene in parallel (e.g., using image sensors at different vertical positions) to create exceptionally high resolution scenes and video. The device may continuously collect a hyper-resolution database. For a harbor tour application, incredible resolution may be collected as the boat advances along the harbor and the MCD may scan at exceptional resolution. A video clip can later be composed of interesting parts of the scene, taking from this Hyper-resolution database.

Keep-out zones can be established, so the MCD does not take photos of certain zones. Certainly, certain users may feel certain locations are not appropriate for photography. Likewise, the range of the MCD may be limited, such as to 20 feet, for example. This may prevent unwanted intrusion of a flying camera device in some situations.

An Auto-Like mode may use an MCD with a social network not only for delivery of the photos/videos, but also for the automatic collection of Likeability. Coupled with algorithms and application software at the viewer's device or with another MCD at the viewer's location, automatic emotion detection of the viewer and transmission back to the creator can be enabled. Today's on-line implementations of photograph "like" assessment (e.g., Instagram) may require a user to reply with a "Like" response, or more likely they never respond. This method may automate the process.

Various MCD Block Diagrams may be provided for various implementations of an MCD. An MCD system can contain several devices and subassemblies, depending on the configuration of that specific MCD. The device can be self-contained in operation when working in concert with a Smartphone and/or the Internet. While a Smartphone configuration may be preferred, other versions can be built without use of a Smartphone. In that case, more circuitry may be shifted or integrated into the MCD device (e.g., MCDC or landing pad).

Figure 12:
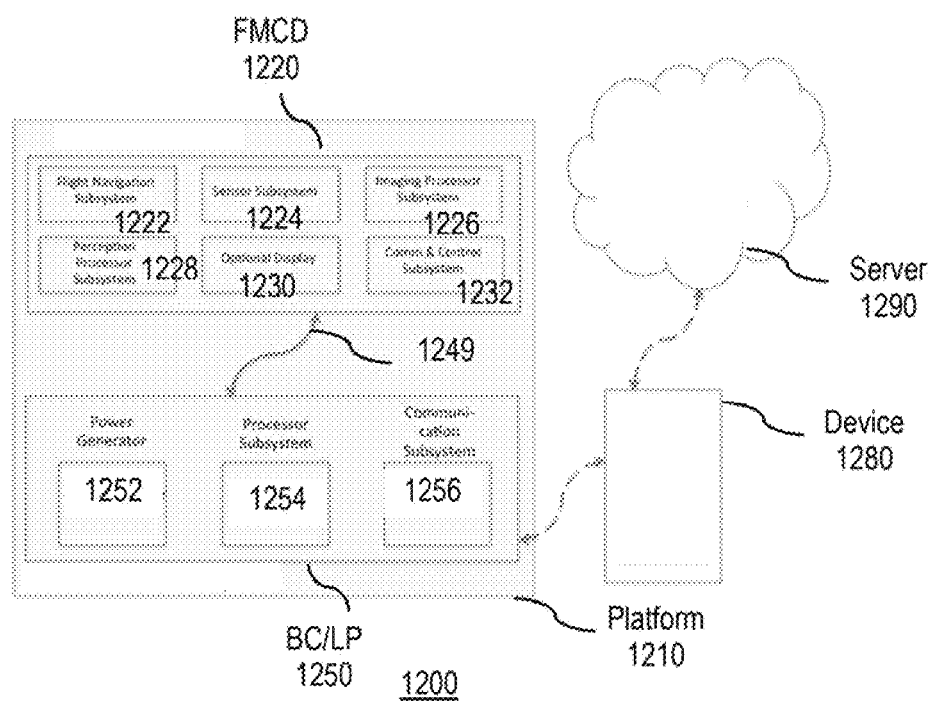
FIG. 12 shows an illustrative block diagram of an MCD, according to at least one embodiment.
Figure 13:
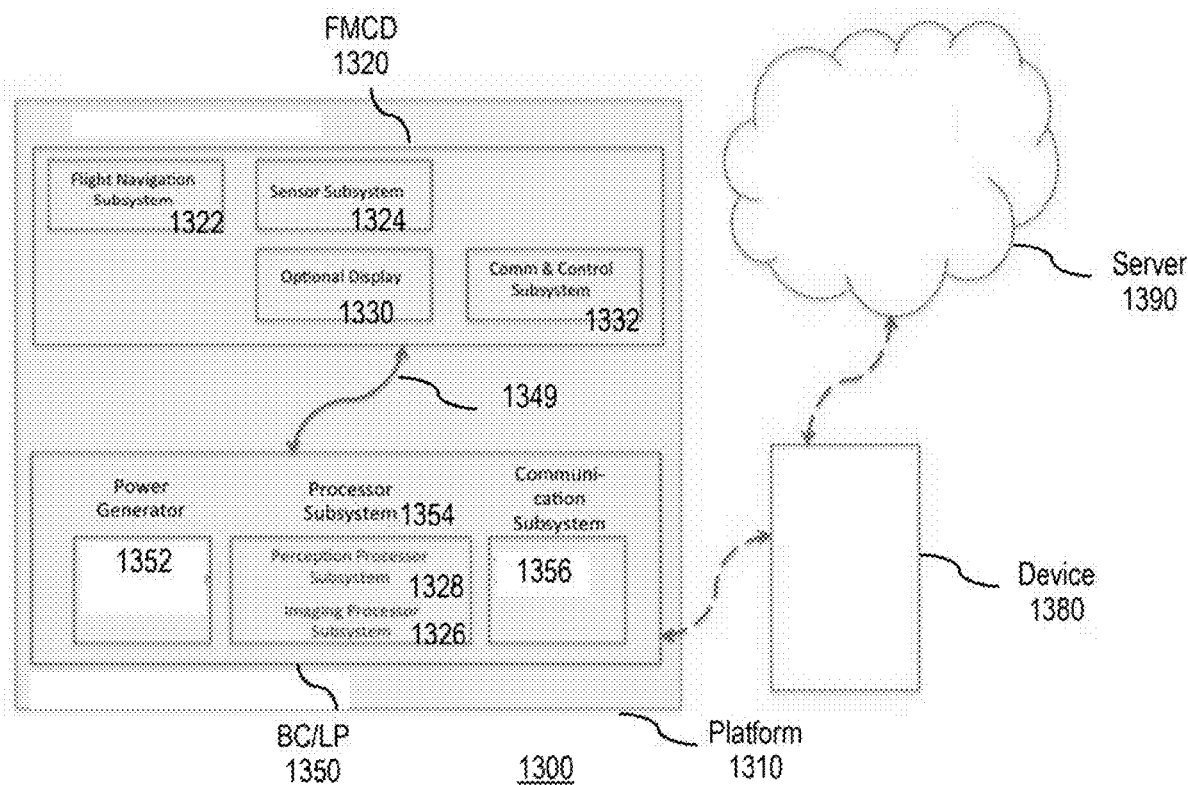
FIG. 13 shows another illustrative block diagram of an MCD, according to at least one embodiment.

In one embodiment, an MCD may include two assemblies and software, such as a base controller (BC), a free flight camera device (FMCD), and software that may be operative to run on the FMCD and Smartphone, for example, as shown in one or more of FIGS. 12 and 13. In some embodiments, the two units may be attached together by a small wire pair, with extended power supplied to the free flight camera device. This wire may limit the distance of the two assemblies. Other versions of the MCD may use navigation methods to "find" charging sources autonomously and park there automatically.

As shown in FIG. 12, for example, a system 1200 may include an MCD platform 1210 that may include a camera or FMCD subsystem 1220 and a base controller (BC) and/or landing pad (LP) subsystem 1250, which may be communicatively coupled wirelessly and/or via a wire 1249. System 1200 may also include a smartphone or user device 1280 that may be communicatively coupled to platform 1210 and/or communicatively coupled to a cloud processor or server subsystem 1290. FMCD subsystem 1220 may include one or more of a flight navigation subsystem 1222, a sensor subsystem 1224, imaging processor subsystem 1226, perception processing subsystem 1228, display subsystem 1230, and/or communication and control subsystem 1232. In some embodiments, flight navigation subsystem 1222 may include any suitable component(s), including, but not limited to, a positioning subsystem (e.g., one or more motors, accelerometers, sonar components, GPS, etc.), an imaging closed loop stabilization module, one or more stabilizing light sources and/or an active pattern generator (e.g., LEDs, IR image sensors, tracker ASIC modules, etc.) and/or the like. In some embodiments, sensor subsystem 1224 may include any suitable subsystems, including, but not limited to, any suitable sensors (e.g., dual high resolution image sensors), any suitable sensor sync subsystem, any suitable optics and/or audio physics detection subsystem, any suitable memory subsystem (e.g., FRAM or Flash 3 image buffers), any suitable communication subsystem, any suitable microphone array or any other suitable subsystem for 3D sound sensing and control, and/or the like. In some embodiments, imaging processor subsystem 1226 may include any suitable subsystems, including, but not limited to, any suitable 3D environment physics and/or geometric registration subsystem, any suitable IR and/or visible light merging algorithm processing subsystem, any suitable target acquisition subsystem, any suitable tracking subsystem, any suitable object depth-based focus subsystem, any suitable Movidius processor subsystem, any suitable memory subsystem, any suitable communication subsystem, and/or the like. In some embodiments, perception processor subsystem 1228 may include any suitable subsystems, including, but not limited to, any suitable perception imaging algorithm processing subsystem, any suitable photography rule base subsystem, any suitable pose synthesis subsystem (e.g., to detect pose(s) and when to capture media), any suitable emotion control subsystem, any suitable reaction control subsystem, and/or the like. In some embodiments, display subsystem 1230 may include any suitable subsystems operative to display data using any suitable output components (e.g., audible, visual, haptic, and/or otherwise). In some embodiments, communication and control subsystem 1232 may include any suitable subsystems, including, but not limited to, any suitable application software and processing subsystem, any suitable autonomous photography subsystem, any suitable panoramic stitching algorithm processing subsystem (e.g., for a super resolution mode), any suitable smart power management subsystem (e.g., for controlling any suitable fly to charger operations), any suitable algorithmic tethering processing subsystem, and/or the like. BC/LP subsystem 1250 may include one or more of a power generator subassembly 1252, processor subsystem 1254, and/or communication subsystem 1256. In some embodiments, power generator subassembly 1252 may include any suitable subsystems, including, but not limited to, any suitable battery subsystem, any suitable power adaptor subsystem, any suitable docking platform subsystem, and/or the like. In some embodiments, processor subsystem 1254 may include any suitable subsystems, including, but not limited to, any image processing subsystem, any suitable image/video/media database subsystem, any suitable digital signal processing subsystem, and/or the like. In some embodiments, communication subsystem 1256 may include any suitable subsystems, including, but not limited to, any suitable Bluetooth subsystem, any suitable Wi-Fi subsystem, and/or the like. In some embodiments, server subsystem 1290 may include any suitable subsystems, including, but not limited to, any suitable deep recognition subsystems, any suitable classification memory subsystems, any suitable software and/or software processing subsystems, and/or the like. In some embodiments, user device 1280 may include any suitable subsystems, including, but not limited to, any suitable computation subsystem, any suitable application(s), any suitable application processors, any suitable communication subsystems, and/or the like. For example, user device 1280 may include a processor component, a memory component, a communications component, a sensor component, an input/output ("I/O") component, a power supply component, and/or a bus that may provide one or more wired or wireless communication links or paths for transferring data and/or power to, from, or between various other components of user device 1280. The I/O component may include at least one input component (e.g., a button, mouse, keyboard, etc.) to receive information from a user of user device 1280 and/or at least one output component (e.g., an audio speaker, video display, haptic component, etc.) to provide information to a user of user device 1280, such as a touch screen that may receive input information through a user's touch on a touch sensitive portion of a display screen and that may also provide visual information to a user via that same display screen. The memory component may include one or more storage mediums, including for example, a hard-drive, flash memory, permanent memory such as read-only memory ("ROM"), semi-permanent memory such as random access memory ("RAM"), any other suitable type of storage component, or any combination thereof. The communications component may be provided to allow user device 1280 to communicate with one or more other portions of system 1200 (e.g., MCD platform 1210 and/or server subsystem 1290 using any suitable communications protocol. The communications component can be operative to create or connect to a communications network and can provide wireless communications using any suitable short-range or long-range communications protocol, such as Wi-Fi (e.g., a 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. The communications component can also be operative to connect to a wired communications network or directly to another data source wirelessly or via one or more wired connections. The sensor component may be any suitable sensor that may be configured to sense any suitable data from an environment of user device 1280 or internal to user device 1280 (e.g., light data via a light sensor, audio data via an audio sensor, location-based data via a GPS sensor, etc.). The power supply component can include any suitable circuitry for receiving and/or generating power, and for providing such power to one or more of the other components of user device 1280. The processor component may be used to run one or more applications that may be accessible from the memory component and/or from any other suitable source (e.g., from server subsystem 1290 and/or platform 1210) via any suitable communication medium. The application may include, but is not limited to, one or more operating system applications, firmware applications, communication applications, internet browsing applications (e.g., for interacting with a website provided by a manager of platform 1210), local applications (e.g., a web application or a native application that may be at least partially produced by a manager of platform 1210), or any other suitable applications.

As another example, as shown in FIG. 13, for example, a system 1300 may include an MCD platform 1310 that may include a camera or FMCD subsystem 1320 and a base controller (BC) and/or landing pad (LP) subsystem 1350, which may be communicatively coupled wirelessly and/or via a wire 1349. System 1300 may also include a smartphone or user device 1380 that may be communicatively coupled to platform 1310 and/or communicatively coupled to a cloud processor or server subsystem 1390. FMCD subsystem 1320 may include one or more of a flight navigation subsystem 1322 that may be similar to flight navigation subsystem 1222, a sensor subsystem 1324 that may be similar to sensor subsystem 1224, a display subsystem 1330 that may be similar to display subsystem 1230, and/or a communication and control subsystem 1332 that may be similar to control subsystem 1232. BC/LP subsystem 1350 may include one or more of a power generator subassembly 1352 that may be similar to power generator subassembly 1252, a communication subsystem 1356 that may be similar to communication subsystem 1256, and/or a processor subsystem 1354 that may be similar to processor subsystem 1254 but that may also include an imaging processor subsystem 1326 that may be similar to imaging processor subsystem 1226 but that may be provided by a BC/LP subsystem rather than by an FMCD subsystem, and/or a perception processor subsystem 1328 that may be similar to perception processor subsystem 1228 but that may be provided by a BC/LP subsystem rather than by an FMCD subsystem. Server subsystem 1390 may be similar to server subsystem 1290. User device 1380 may be similar to user device 1280.

In some embodiment, the two assemblies may be merged into one low power device (e.g., less than one inch in size). This embodiment may require heavy integration of processing and flight controls into silicon components.

The base controller (BC) may provide a charging station for the FMCD.

The FMCD may contain optics, sensors (e.g., image sensors, inertial sensors, temperature sensors, etc.), processors, and/or flight electronics. The FMCD and BC may contain a database of photographic rules. The FMCD may run either in an autonomous mode, under control of a rule base, or via user commands. The user may command the FMCD with audio commands or visual gestures for manual or augmented control of the camera.

Depending on the configuration, either assembly may include wireless communication (e.g., via Bluetooth or WiFi) to a smartphone or WiFi router. In some configurations, the MCD may be coupled to a cloud service via WiFi or wireless services. The fundamental rationale for cloud access may relate to autonomous deployment of services, software, clustering of multiple MCDs, and/or mass storage of information (e.g., pictures, video, 3D data, etc.).

The FMCD device may be configured to operate all day by using aggressive power reduction algorithms, limiting sensors use, and/or parking in interesting zones rather than keeping in the air. Thin-wire versions can be powered continuously. In non-wired versions, the FMCD may use positional information to find power sources. For example, it may fly to rooms and locations in the room that have power sources. The coupling to the BC may be repeated in power charging docks located throughout the house.

A "lite" version of the MCD may provide acceleration of key functions with advanced processing located in the landing pad (e.g., not in the MCD but in the BC/LP (e.g., of system 1300 of FIG. 13)). As a result the MCD Autonomous camera may include fewer tasks and/or may use less energy for longer battery life. Simpler algorithms may be employed in the MCD (e.g., like roof line tracking), rather than more complex and accurate processing.

The MCD may land on a landing pad periodically to recharge. The landing pad can use wireless charging technology such as self-resonant copper coils made available by WiTricity. Alternatively, parking on direct contacts of the landing pad can provide the charging. More advanced "quiet" versions may also re-charge otherwise with different materials at the landing pads (e.g., gas). The Smart Landing Pad can function to replace charge, replace the battery or other "fuel", and/or deploy a fully charged device simultaneously. So, depending on the recharging wait time acceptable by the user, the MCD can in effect operate virtually continuously.

MCD-Lite and the Augmented Processing Landing Pad embodiments may be provided. With additional processing, an MCD Landing Pad can assist image and video processing by using embedded processors and memory. This architecture may eliminate significant power consumption necessary for image and video processing in the battery-powered, flying MCD. Such an MCD may be referred to as an MCD-Lite device. For example, adding a Movidius-2 processor to a landing pad may create two trillion operations per second of image/video processing power, yet may consume half a watt of power. The landing pad may be coupled to household AC power, without significant power constraints. A Movidius processor, for example, can process 12 MIPI lanes simultaneously, handling 6 HD camera streams in real-time. When integrated into the MCD, this may enable real-time 360-degree versions of the MCD. Likewise, such processing power may enable multiple MCDs supported with each MCD Landing Pad. A WiFi or other wireless connection between the MCD and Landing Pad may enable data transport between the devices. As well, processing the image data in the MCD Landing pad rather than in the smartphone may create a solution to support any class of mobile phone. Virtually any cellphone can be used to interface and control the MCD.

The MCD may be operative to find the landing pad by use of 3D maps and/or specific markers that may be located on the landing pads. Additionally or alternatively, the device can upload more data when parked and being charged.

The sensors in the MCD (e.g., sensor subsystem 1224 and/or sensor subsystem 1324) can include any suitable sensors, including, but not limited to, image sensors, proximity sensors (e.g., to determine how close to the floor, the ceiling, the wall, etc. the device may be), accelerometer sensors (MEMS), microphone array for audio and voice recognition and location awareness, speaker array for high quality voice command synthesis (e.g., which could be embedded in the smartphone), and/or the like.

Beyond multiple sensors for multiple spectrums (e.g., like IR and visible), an optimized solution may use 2, 3 or more types of image sensors. In practice, three separate resolutions and optical formats may enable a foveated approach and programmed selection of resolution and sensitivity.

Inverse Sampled Sensors Technology may be utilized. A binary sensing technology may be employed in the MCD. Binary sensing technology may function as the inverse of Digital Light Processing (DLP) technology, whereby multiple sampled binary images that may be combined may create solutions of wider dynamic range and sensitivity.

"Emotion-based Social Sharing" may be enabled. Social sharing applications and websites (e.g., Snapchat, Facebook, etc.) have been extremely popular methods of interacting with one's friends, including the sharing of photographs and video clips. This disclosure describes a new technology that may automatically determine the emotion or mood of the subject with autonomous cameras (e.g., the MCD) and personal bio-measurement devices (e.g., smart watches and/or bands), and that may then use that emotional state to control where, when, how, and/or to whom information (e.g., in the form of captured media, such as photos, videos, audio, etc.) may be communicated/shared. Depending on the person's mood, all aspects of communication, sharing of information, and/or control of the device can be altered for an improved experience. Ultimately, once the emotional state of a person or a group of persons is known, unique and automatic sharing of information can begin with selected partners in one's on-line social community. A new social network may result, with faster, possibly more accurate and more effective communication and sharing.

The reason for sharing information that shows the emotion of the user may be to have deeper and more life-like level of communication with friends. If someone is very happy, sharing that with key friends may be helpful. If someone is sad, as well sharing that state of emotion may perhaps quickly form a deeper bond with others, rather than waiting and manually deciding what, how and when to communicate with friends and which ones, which is done using conventional apps and tools. Without this embodiment, the opportunity to share can easily get lost or die away, as the user gets busy with other things.

The group of friends or category may also help amplify or build emotion with others. As one shares his/her happiness, the other does as well, as a multiplier. This may move the reality and sharing of emotion from the digital or virtual world to that more like the real world, in the case where each are in the same location.

The following describes several categories or types of individuals and groups with which may be enlisted in social connection and communication. First the owner or user of the service, then local friends (e.g., those in the same physical vicinity of the owner), then a hierarchy of friends that are NOT the owner or local (i.e., remote). For example, the categories may change as follows, intimate partners, then close friends, then club friends, then friends, then casual acquaintances, then business partners, then work associates, then those at a particular event (e.g., a concert), then those in the same general geography (e.g., those in a same city, county, state, within 20 miles, etc.).

Such entities may be found in the owner's contact database stored in their smartphone and/or accessed via an API associated with a social network. However, the user may first need to add identification of the desired social categorization for each. With this categorization information also stored on the cloud or on the device, any of the person's devices could be paired with the MCD.

The system may involve engaging a person or persons in one or more of those social categories based on that emotional state or intent of the owner/user or local friend. The "social interaction" may take the form of making statements, or sending Selfies, or sending photos of situations the person is in, for example. Certain categories of friends may be censored from some of the emotions. For example, work related friends may not experience negative emotions, but certain close family members might. These emotional communications may not be anonymous communication, but rather may be sent with clear and explicit identity of the owner of the information (e.g., pictures), but protected by automatic deletion after reading (e.g., to prevent unwanted sharing of emotional state or information with those outside the category). The preferences for how different emotions may be associated with certain subsets of one or more social networks may be defined by a user and/or may be automatically defined based on various information available to the system.

Intelligent sensing can substantially enhance emotion detection, and the MCD can be the ideal tool for accurately measuring emotion and for creating quality content. For example, the MCD system may be configured to utilize any suitable find and track algorithm(s) to locate and "hold" a target in bore-sight as one or more images or other media are captured and processed for recognition and emotion detection, to utilize any suitable recognition process such as with a sensor and/or processor and/or application accessible via the smartphone and/or the cloud to recognize the person (e.g., the owner and/or the subject), to utilize any suitable emotion detection algorithm using cameras and/or bio sensors or any other suitable system components to extract facial features, audio queues, and/or biorhythms with software to categorize them by significance or strength (e.g., the image analysis may include feature detection such as key inflection points on face, movement of facial features/texture, fusing with biorhythms, and finally categorization to infer the emotional state), and/or to utilize an application and cloud service to message the information to the target category of one or more social networks.

Using these methods at an event, such as a ballgame or concert, can create a more interesting thread of emotional activity, perhaps more interesting to one's social community.

Figure 14:
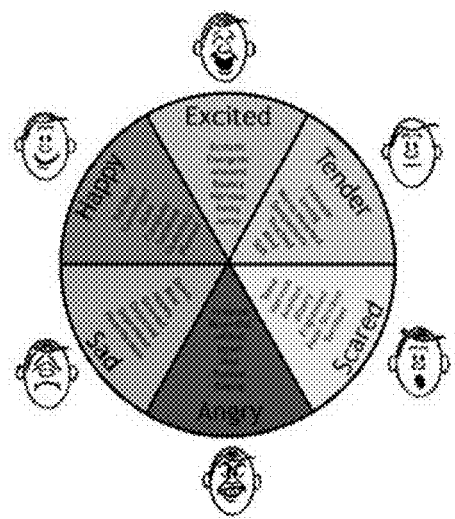
FIG. 14 shows an illustrative emotion characterization chart, according to at least one embodiment.

Emotion Detection may be enabled in various suitable ways. Per Wikipedia, " . . . emotion is a subjective, conscious experience characterized primarily by psychophysiological expressions, biological reactions, and mental states. Emotion is often associated and considered reciprocally influential with mood, temperament, personality, disposition, and motivation." Paul Ekman characterized emotions into various classifications, each of which may be "seen" or otherwise detected by the MCD and then used to automatically trigger an emotional information exchange, where detecting a person's emotion may include measurement of facial and mouth shape (e.g., smile for happiness, frown/eyebrow shape/wrinkles in forehead for sad (e.g., per Ekman's categories)), measurement of vocal changes including volume and pitch (e.g., agitation indicated with fast speech), measurement of gestures (e.g., covering one's eyes or hiding when afraid), measurement of increases in body erectness or stiffness (e.g., with fear or anger), and measurement of rapid eye movement (e.g., to indicate elevated emotion). As shown by diagram 1400 of FIG. 14, various emotions may include excited (e.g., ecstatic, energetic, aroused, bouncy, nervous, perky, antsy, etc.), tender (e.g., intimate, loving, warm-hearted, sympathetic, touched, kind, soft, etc.), scared (e.g., tense, nervous, anxious, jittery, frightened, panic-stricken, terrified, etc.), angry (e.g., irritated, resentful, miffed, upset, mad, furious, raging, etc.), sad (e.g., down, blue, mopey, grieved, dejected, depressed, heartbroken, etc.), and happy (e.g., fulfilled, contented, glad, complete, satisfied, optimistic, pleased, etc.).

Beyond visual cues, an emotional response can be measured by increased heart rate, increased breathing rate, sweating, and/or muscle tension. Smart watches and bands (e.g., an accessory to or the entirety of the user device of an MCD system) can measure these dynamically, and then trigger an indication of fear or danger emotion. Facial, body, and/or vocal changes then can help classify what type of emotion or feeling the user may be expressing. Fear or danger may be indicated if the user stops moving, whereas comfort may cause a relaxed pose of the individual.

The MCD system may be provided with technology on board as well to visually measure minute variations in user "stability". For example, a nervous twitch can be measured uniquely, if desired. As well, before use, the user's personality may be enrolled into the application to "sensitize" the analysis of the emotion detection algorithm. Typically introverts may conceal their emotion and extroverts may be more likely to directly express their emotion. As a side benefit, this application may enable introverts an easy way to move effectively communicate their emotions.

Once the user's social state has been triggered by the application and the MCD, the process of creating information to send may be composed (e.g., automatically). In one mode, the information may be sent to the particular social category without review, but in most cases the user may be polled to discover the user's interest in enabling information sharing with that category. The state of the user may be displayed as a graphical measure of the six emotions, such as partly for validation of the person's emotional state. In the auto mode, the user may simply monitor this. The information shared can include one of the following, with or without audio/voice, a selfie, a groupie, a 360 degree view of the environment, a tread or vine of the situation, and/or any other suitable type of information.

Ultimately, the information may be meant to trigger a social connection with others in those select categories. As a result, the information may be combined with the other person visually as well, opening real chat, messaging services, and picture exchange.

The use of an MCD that may be always-on, with higher stabilized resolution and flying capability may enable continuous mood change determination as the user goes about his/her day. As well, integrating biorhythms may improve the accuracy of emotion determination. Finally, emotion detection to control communication on a social networking platform may enable greater personalization, accuracy, and/or emotional connection than previously achieved.

MCD based emotion detection may be a front-end for existing social networks. The popularity of existing social networks (e.g., Facebook) can be augmented with these tools. An MCD may collect the emotional data and then a server may categorize it (e.g., in a website) to dynamically characterize the personality of the users. This may be preserved and leveraged with whatever may be required by the social network or service.

To prevent non-authorized users from accessing or seeing private social information, the application can be ephemeral (e.g., that is it only last for a short period of time) and/or may require verification of identity. An advantage of the MCD may be its ability to automatically determine the identity of MCD users with multi-spectral data analysis. Finally, the user can select different treatment of the information based on certain conditions (e.g., the user can select ephemeral sharing for most, but non-ephemeral for select groups of friends).

A Tilt-Pan-Zoom Intuitive processing algorithm may be utilized. Sports or other photography may involve use of wide field of view and a zoom control that the photographer may manipulate to get a good interesting shot. If the zoom is done after the fact as in post processing, the image quality may suffer because the image becomes very pixelated. If the zoom (and pan/tilt by moving the camera) is done while photographing, then stabilization may be used and even so, if the photographer is moving (as in running), the process is very error prone, leading to a poor video. MCD embodiments herein can employ special algorithms to move and position the sensor or sensors or optics to affect an automatic closed loop system of image/video analysis and control.

The algorithms may be operative to extract content information with interest point trackers and object recognizers, and detect object motion in the scene. It may be desirable to implement these algorithms in hardware inside the MCD camera so virtually no latency may be experienced. This may have practical content for photography-on-the-run applications and to automatically extract context and information from a scene. These methods may offer even greater use for videography from highly unstable platforms, such as on a boat. The sensor can be designed with different resolutions or the camera can use multiple sensors to blend them together.

Anamorphic optics may be leveraged. The MCD may feature advanced optics (or sensors) to meet the demands of the application of taking ideal Selfies. While versions of the MCD may include multiple surround image sensors, other (e.g., lower-cost) models that may have fewer image sensors may include anamorphic optics to collect wide fields of view. In particular, a central portion of a scene may preserve spatial continuity, yet at the sides of the image capture a resolution may decrease (e.g., linearly) to the edge. A wide FOV fish-eye image may result, with subsequent image processing to correct the geometric distortion.

Location Tags may be utilized. An alternative to full-time object tracking/recognition with image processing methods may include the use of location stickers on all "moving" devices/objects around the MCD. Trends in the Internet-of-Things (e.g., Estimote's small wireless sensors or beacons) with type, ownership, motion, temperature, and location continuously available via smartphone APIs, whereby small stickers may be placed on objects that move about, such as one's dog (e.g., a sticker on the collar), people, smartphones, computers, handbags, etc., and each of those stickers may contain location technology and WiFi capability to report the location continuously may be utilized. The MCD may identify objects that become "co-located" and therefore may become possible candidates for photography. For example, as a pet moves about, the candidate list may update automatically, rather than using the MCD's camera and power-consuming image capture and computational imaging algorithms continuously. However, once an object survives the candidate list prioritization, face, and/or emotion recognition may be used to determine when and from where to take the pictures/video. Later versions of the MCD may leverage such physical tag technology, as the market matures.

Lens-less imaging may be provided. Utilizing computational imaging, the MCD can eliminate the requirement for a lens. This may save cost and size, yet may also open new forms of imaging. With huge computational capability in the smartphone today, this may become possible without added cost. An example of lens-less imaging may include use of pinhole arrays or apertures and computation to reconstruct the image. MEMs can create apertures. LCD panels can as well, with the added benefit of display capability. Other camera developments in the industry that exclude lenses may be optical-fluidic microscopes, where fluids may pass by the surface of a sensor to obscure light dynamically as the specimen flows over the sensor surface. Objects may be seen as occlusions of light, with the forward edge giving an indication of location of the objects edge.

"Inverse Dynamic Sampled Image Capture" concepts may be leveraged. The use of an MCD, which may spin around a point of view, may enable the construction of high-quality, low-cost, lens-less image capture. The MCD may rotate freely, essentially spinning around about an axis, or multiple axes sequentially. As well, the position of the MCD can be changed between spins to capture more samples from different perspectives, which as well can measure depth from stereo view of the scene with dynamic stereo (e.g., photos from two positions, one after the other, etc.).

In cases where the lens may be removed from the MCD, an illumination system of LEDs or lasers that strobe and spin may create a dynamic light environment that may be imaged by long and narrow sensors. The principle employed may be similar to that of surface imaging (e.g., Microsoft and Samsung PixelSense) whereby an IR light may pass to the surface of a table, then reflect back to the pixel-wise sensors if an object touches the surface material. The use of light guiding sheets may keep the pixel-wise structure aligned. This concept may be extended to remove the surface material and then sense when light may be reflected off of objects more distant to the MCD. This may be done by cutting or measuring the reflectance of a vertical portion or swath of the image. The swath may be taken ever so slightly in one direction, and then another swath sample may be taken. At edges perpendicular to the direction of the MCD rotation in the scene, the intensity of a pixel from frame to frame may change value and/or intensity. The process may continue as a stream of image swaths may be accumulated with a spatial offset to integrate a full image. The sampled resolution may then be a function of the number of overlapped frame samples rather than solely the pixel size and lens magnification.

The MCD can enact a Virtual Tether mode to limit the physical volume of autonomous usage of the device. This might be important to the owner to keep a device away from certain areas of his/her home. The technology for the virtual tether may be one of determining the location of the MCD and comparing that to a pre-defined mapping that the owner may allow. For example, the owner could enable certain rooms for the MCD's use, or just the area around the living room seating area. In any case, the MCD may use 3D position recognition (e.g., special image processing and room recognition) for this function. A simpler method can be an electronic range signal to tether the device to the base station. An IR LED or other signal could be detected to determine distance between the MCD and the hand held base station. Many methods could be used to enact this electronic tethering or invisible fence function.

Synthetic pose Images may be leveraged. An added benefit of the in-flight autonomous nature of the MCD is that free flight or positioning of the camera can as well be used to capture various fields of view or at various positions, for later use. With this data in memory, the image computation algorithms later when editing the images can re-synthesize a picture by interpolating those frames from a variety of views and at different focuses. New poses and focuses can be achieved at a later time in software. This may create a very powerful camera. If desired, processing and multiple pictures can be used to remove objects.

Information Services of various types may be leveraged. With the MCD's ability to automatically track interesting objects for determining if it should capture a picture of that object (or not), this may create a platform for tagging and surveillance applications. A business can use that information to monitor traffic flow or other vital business-related information. A new business model can leverage the MCD as a platform to provide that information directly to the business.

The MCD may incorporate an attached display (e.g., a viewfinder) in some versions of the device (e.g., as display subsystem 1230 and/or 1330). Some MCDs may include a reflective mirror surface sub-assembly that may allow the user to essentially see the point-of-view of the MCD device as the device positions itself for picture capture. Other MCDs may include an LCD display type sub-assembly so that the final picture (or any other information) can be viewed by looking at the MCD. In non-display MCDs, the image may be visible on a smartphone or other devices in communication with the MCD. In more advanced products, a projector subassembly could be integrated to essentially project the picture on the wall.

Communication and the Cloud embodiments are provided. Depending on the configuration, either assembly may include wireless communication (e.g., via Bluetooth or WiFi) to a smartphone or WiFi router. In some configurations, the MCD may be connected to a cloud service via WiFi or any other suitable wireless services. The fundamental rationale for cloud access may relate to autonomous deployment of services, software, clustering of multiple MCDs, and mass storage of the information (e.g., pictures, video and 3D).

Various methods for Propulsion and Control of the MCD may be provided. The basic form of the MCD may typically include an ability to extend the camera away from the user to capture a pose of the user, or the Selfie. Several versions may include wired operation from a hand-held controller device. In some embodiments, wire-controlled with quad-copter blades and motor may always keep the camera at a distance and elevation from the owner. The length of the wire (e.g., like a small TASER wire) and the tilt of the camera as measured by sensors can be programmed before launching the flutter camera to properly locate the camera. The camera may capture a picture from two gazes to allow image processing to essentially remove the wire from the picture. Wire-controlled fluttering wings may be operative to always keep the camera at a distance and elevation from the user. The length of the wire (e.g., like a TASER wire) and the tilt of the camera as measured by sensors can be programmed before launching the flutter camera to properly locate the camera. Wire-controlled (e.g., slightly larger and stronger wire) single gimbaled propeller may be operative to always keep the camera at a set distance, with elevation and eventual position determined by a mobile phone steered joystick or other input that may cause tilt and reposition by the owner (e.g., a flying version of a sports cam stick mount). The length of the wire (e.g., like a TASER wire) can be programmed before launching the flutter camera to properly locate the camera. Wireless control with quadcopter, fluttering wings, or gimbaled propeller may be provided. Any suitable intelligent vision algorithms may be leveraged by the camera controller to find and/or track the owner of the mobile phone (e.g., continuously). For example, the Flutter Cam always then may point at the owner, and may be ready to take a picture at any time. Any suitable intelligent algorithms may be leveraged to detect gesture controls from the user to capture the desired Selfies. This may include voice or eye gestures to invoke image capture. Alternatively, personal devices such as watches or rings can provide gesture information for control of the MCD. The algorithms can later understand what type of Selfie a user typically likes to capture, such as whenever someone comes close to the owner, and automatically grab the picture.

Volume Video, such as continuous Surround Video or "Volume Video" with post-capture authoring of video from any pose, may be utilized. By employing a wide-angle, panoramic gaze sensor or multiple image sensors, and time-sampled stitching in the MCD, the effect of stabilized surround video may result. On playback, the pose or perspective of the video playback can move to either stabilize or adjust the pose as needed to visualize the certain objects "on the trail". Replay can create live video from any pose at any time for post-viewing authoring of scenes. For example, when riding a bike or car the array may "see" at least 180 degrees (or could be a full 360 degrees with image sensors on both sides), with a sequential stitching of the scene into memory. The algorithm may be a time-sampled stitching method, similar to that used to create panoramic pictures on a smart phone. This pose may be a function of space and time. Larger amounts of memory may be required to store such a sequence, perhaps 1 to 5 Gigabytes per second. Compressive sampling may reduce the storage amount. Use of intelligent processing, with prior encoding of the user's photographic intention or visual pathway (e.g., via pre-enrollment or historical context), may steer or prioritize the storage hierarchy of this video information. The steerage or prioritization may be done either by limiting the user's gaze (e.g., field of view) or by temporal restriction (e.g., capturing/use/interpolation of data at another time). These methods can be embedded in an SOC or a memory device.

The MCD camera can employ a mode for automatic self-calibration of the imaging function. Essentially the MCD may fly to an imaging test chart (e.g., with specific visual information, like gray-scale and color patterns, resolution charts, circular zone plates, etc.) for self-calibration. The MCD may illuminate the chart as needed with a variety of light sources (e.g., LED and flash). Not only image capture, but positional information from sensors on the MCD may be calibrated by the use of test patterns and charts. The output signals from the MCD sensors may be then augmented with calibration and correction information for use by the smartphone or cloud to auto correct any abnormalities in the output images or video.

In operation, the MCD can self-calibrate based on its surroundings. For example, a method of electronic tethering can be used to keep the MCD co-located with the user, with a virtual tether based on distance from the user. A location map may be constructed with a combination of any mapping application(s) (e.g., MagicPlan), use of public or private maps, and continual updating of positional information by dead reckoning. The MCD may move forward, using input from its sensors to construct a 3D model of the environment or room. It may classify certain objects as stationary obstacles or movable (e.g., over time).

The MCD for outside applications may use GPS information, for example, as may be made available via the smartphone. It may still have an electronic tether, but the distance may be greater. As well, the flight technology may need to respond to environmental conditions like strong wind. The time between charging may need to be extended. Finally, the dynamic range of the sensor may need to increase.

Multi-View Media Mode of the MCD may be provided. An FC device may capture photographs and video, yet in many scenes the information to be captured only makes sense in the broader context of the entire scene or situation. For example, with conventional photography, mostly when the subject is far from the camera, the user may take two photographs, one zoomed out as far as possible to show the scene context (e.g., "we're on the edge of the Grand Canyon wall") and one zoomed in to show detail about perhaps the expression of the subject. A compromise may usually be adopted to take photos of the subject with some of the background framed in the scene as well. However, with the FC, a different type of picture can be automatically composed that shows the entire scene in the framing and an additional view (e.g., a water-drop view overlaid) to show the details of the subjects. This may be similar to the case where one is looking through glass that has a water drop on it, creating a magnification of the image within the water drop. Although, unlike in these implementations, in that case, the water drop may act as a lens and invert the image. The key here may be that the FC can create multi-view photos autonomously considering the situation and if it is necessary to invoke such a method to accurately express the subject matter in the media.

A wide variety of applications may benefit from use of the MCD, including, but not limited to, Selfie and Groupie photography, a life logger application (e.g., similar to the Narrative Clip photographic logger, which may require 8G minimum memory), find-it or tag-it applications that may essentially move about your home autonomously looking for lost objects, like a handbag or keys, social introduction, video conferencing, photo library editing, and/or the like.

The device may become an ideal Selfie capture platform as it may intelligently find the best pose and shot at the right instance, employing photographic rules coupled with the ability to position itself autonomously to improve your appearance. The device may use free autonomous flight to get the proper pose. No longer would a user experience blurry photos at the wrong angle, with the wrong lighting. The device could take those pictures, but the algorithms and rules embedded in the device would naturally prevent those from being taken but could be overridden to provide if wanted. Eventually the device may gain knowledge and improve the experience over time.

The device creates a new photography experience for a wedding or other social events (e.g., graduations, birthday parties, etc.). In particular, a wedding organizer may instruct a photographer to capture the wedding experience from his/her professional perspective (e.g., as subjects, events, viewing angles, lighting, etc.) and as well may add particular emphasis on certain specific desired shots such as photos with certain people included. In most cases, a good photographer accomplishes this task. However, many times certain attendees are missed. With the MCD, the proper pose at the proper time and with the proper subjects may be captured. As the MCD may recognize attendees at a higher level of accuracy than a photographer unfamiliar with the attendees, more key shots may be acquired. The MCD can also be programmed to find attendees and encourage attendees to collect at certain key photographic locations.

The device may create a key platform for a personal assistant at your home. With application software, the device can keep attention to provide useful information interactively as one maneuvers throughout his/her home. Visitors can be identified by first interacting with the MCD, new or unseen obstacles can be alerted to the occupants (e.g., as a warning that someone has left a shoe on the stairs presenting a tripping hazard), a person can be alerted to an emerging sunset or beautiful cloud arrangement in the sky, or a host of other interesting events. Many of these features can greatly assist or help the young or aged population as well.

The device may create a solution for the LIFE RECORDER. Several have attempted this product with issues of power to capture life's events from an ultra small camera. With the use of the base station for the MCD, this problem is removed.

A user-concealment surveillance application may be enabled. An autonomous intelligent camera may enable the "owner-friendly" security camera application. In this case, the device may detect, recognize, and then remove the "registered owners" from the output of the camera (e.g., to highly concealed identity). Beyond simply recognizing objects and their identity, a PSPI can extract the behavior and emotion of the subjects to help discriminate friend or foe. If someone is quickly looking through draws or cabinets, it's a higher certainty that their identity and motives should be questioned and to alert the owner. In security applications, the camera can find subjects and remove the image/audio of the owner of the home from the scenes. The device may be operative either to remove fully this information or likewise encrypt the data so that it can be recreated at a later time if someone (e.g., the owner) has the encryption keys. This cloaking of the owner or approved occupants may greatly enhance surveillance and security system performance, perhaps eliminating all false triggers that are common in today's home or business security systems.

Social introduction may be enabled. Due to the convenience and safety associated with the use of a smart phone, it has become a ubiquitous device in today's society. As well, cameras have been widely adopted in mobile phones and been widely used as the predominant picture taking device. Utilizing position information obtained using the smart phone's GPS and other sensors, and the phone's camera, the location and pose of the phone can be determined in most mobile phones today.

With the addition of an intelligent sensor hub/processor chip and/or advanced application software, utilizing embedded image recognition algorithms, a new user experience can be realized for "social introduction". The new "social introduction" use case may involve an engaging a person pointing his/her smartphone or MCD at another person he/she wishes to meet. Rather than interrupting the desired person by engaging in conversation at that point and location, the user can send a message to ask to meet or converse with the target person. The newly identified person may receive a text message at some point, if they have enabled "social introduction". If not, a message may be returned to the original engaging person indicating the target person is not available for introduction. The social introduction may involve (1) use of a gesture/pointing technology (e.g., an algorithm) that may leverage the engaging mobile phone's camera to detect, track, and align to identify a target to track, (2) a tracking algorithm to hold the target in bore-sight as images are taken and processed for recognition, (3) a recognition process using a sensor hub processor or software in the phone's application processor (or cloud) to recognize the target person, (4) an application and cloud service to provide messages to the target mobile phone if the engaging phone's application properly recognized the target person (e.g., because the cloud service may know if a user and phone are in a particular cell (and can access GPS information for more precise location), only relatively simple recognition may be needed to know which person has been selected, and, if accuracy is poor or too many users are potential targets in a specific region, a round-robin handshake can also be used to validate the proper target, and/or a pulsing pattern can be evoked on either phone (as seen by the cameras) to also validate a "social engagement" session), and/or (5) an application running on the target mobile phone that wakens for a social introduction query. Regarding item (3), the sensor hub processor may be leveraged because recognition accuracy may improve as the computational complexity increases (e.g., as more compute cycles available and in close proximity to the sensors) and optimization of the architecture may match the application (e.g., rather than generic application processors). However, the MCD and cloud based processor may provide an alternative implementation.

Video conferencing has a long history in corporate settings with expensive systems to capture and display high-quality visual and audio information. Recent deployment of Apple's FaceTime on the iPhones/iPads, Tango's video chat, Microsoft's Avatar Kinect and Skype, as well as other applications have created renewed interest in its use. With the MCD, many of the issues surrounding video conferencing may be solved. Fundamentally, the tracking of people and repositioning of the camera to properly see them may be solved with the MCD. As well, the use of 3D techniques including 3D audio may create an effective platform for identifying the proper person's imagery to project to the remote location.

Today consumer photographers may use photo library and editing applications to collect, organize, and enhance their pictures and video. With the use of the MCD's autonomous perceptual imaging methods, a new photo application may be provided that may greatly improve and/or simplify these functions. For example, the algorithm may identify objects of interest (e.g., a circle of friends) in a picture and then automatically crop the picture to center and scale the photo to an improved pose. As well, the cataloging and organization of photos can be automated with the perceptual processing that identifies objects, terrain, location, and other interesting features. Further, using the embedded rules of photography within the FC platform, those that "understand" why one picture is better than another to a particular user, and in some cases also use the camera on a PC or notebook to watch the reaction of the user as he/she views his/her photo library, the tool can automatically create "favorite" picture albums for the user. In the end, use of any camera when coupled with this application can realize many of the benefits from the FC's autonomous perceptual imaging algorithms and methods.

The MCD may have silicon solutions that may create new opportunities for semiconductor chip solutions with new architectures. These may fit into the following categories, such as new camera processor, new flutter image sensor, and/or a new integrated wireless hub memory concept. A new FlutterCam camera processor chip architecture may be provided. The MCD may require specific functionality embedded into the flying camera. This may be the purpose of the camera processor chip. Companies like Movidius have created low voltage, low power solutions. However, this processor may be tuned for the algorithm set anticipated in the MCD. New FlutterCam CMOS image sensor chip architecture may be provided. The MCD may include specific functionality embedded into the flying camera to achieve advanced capture, processing, and information sharing performance. This may be the purpose of the new image sensor. Power savings may represent a large area for optimization vs. standard CMOS imagers. In particular, the binary sensor may integrate for progressively longer exposures such as mapped to binary (MSB) to perform the ADC function over several varying integration exposures until they have been properly integrated together. The process may be interrupted when motion occurs. A MEMS-type, centrifugal motion sensor in the CMOS image sensor may trigger this abort. With this method, exceptionally low power may result. Many image computation algorithms may only require limited spatial resolution or dynamic range from the image sensor than the typical ADC designs that are embedded in CMOS imagers. Therefore, a simpler method and lower power can result with such reduction in performance for those algorithms. Algorithm adaptive methods can as well greatly reduce the overall power consumption of the MCD. A new FlutterCam integrated wireless hub memory tunnel chip architecture may be provided. The MCD may include specific functionality embedded into the flying camera. This may be the purpose of the Integrated Wireless Hub memory chip. The concept may be to design a modification to a commodity memory core that may function to automatically move data wirelessly from a version of the chip in the MCD to another version of the chip (e.g., in the smartphone). The method may be a hardware tunneling of data so that the physical device in the smartphone may be a virtual copy of that in the MCD. As well, a RISC processor may be integrated into the MCD version, with input from a variety of sensors. This may enable the smartphone's processor to automatically access most of the MCD's environmental sensors in real time, as if the smartphone was flying, for more processing in the smartphone processor rather than the MCD's for lower power in flight.

Various embodiments may be provided. A smart camera using machine intelligence algorithms for visual information capture and sharing may be provided. A method for easier-to-use, autonomous photography and/or videography with hands-free operation may be provided. The "Air-Tripod", an ultra-stabilized airborne placement of a camera for image/video acquisition without motion-induced blur for clear long-exposure photography and videography, may be provided. A method for higher performance, autonomous photography with hands-free operation may be provided. An autonomous device may embed a combination of (a) the rules of expert photographers, (b) the freedom of operation for capturing of better pictures, and (c) the ability to learn what behavior the user wants. A method for easier-to-use, autonomous photography with hand gesture or voice-controlled commands to instruct the autonomous camera what and when to take a picture may be provided. A method for "fluttering or stuttering" the autonomous smart camera back-and-forth quickly for improved capture image/video quality by collecting multiple samples of the scene followed by image processing to extract visual capture improvements in the photos/video (e.g., including signal-to-noise, measure depth, sensitive, resolution, etc.) may be provided. An expert system for photographic learning to improve the photographic experience (e.g., resulting with better photographs and videos than without use of the expert system) may be provided. Use of methods and algorithms in flying form may be provided. Use of methods and algorithms in stationary form (e.g., in a non-flying camera), and for any application of imaging, may be provided. Use of manual launching (e.g., throwing into the air) followed by flight or manual retrieval (e.g., pulling a "yo-yo-like" string) to return the camera may be provided. Integration of a smartphone into a flying device for implementation of a smart camera may be provided. Use of specialized mirrors and mechanical assembly to alter the functionality of the rear-facing smartphone camera into a front-looking camera, and mirrors to split the front-facing smartphone camera into two side looking cameras for wide field of view, alignment and tracking may be provided. A smart social camera with automatic connection to social networks for sharing of pictures/video may be provided. Emotion detection and operational control based on emotion may be provided. Speed, latency, and quality of photographic shots and sharing may be varied depending on the emotional state of the user. A smart autonomous camera for automatic photography of one's self (a Selfie), friends (a Groupie), or any subject or scene of interest to the user may be provided. Immersive-emotion Selfie (IES) to trigger emotional response with a more engaging visual expression of objects may be provided. Social interaction with new methods (e.g., "Social Introduction") may be provided. New user modes for an autonomous camera (e.g., "User Modes") may be provided. Applications for Selfies and general consumer photography may be provided. Applications for medical, automotive, surveillance, personal home assistant, and/or any other use case may be provided. New silicon semiconductor solutions may be provided. Identification of objects (e.g., person, dog, girl, etc.) for subsequent selection as candidates for image/video capture may be provided. A personal device, like a smartphone, that becomes more aware of your intent and more aware of the surroundings may be provided. Pre-classification of photos from an MCD may be provided (e.g., a user's photo/video library may access information in the header file that contains key aspects of the photo, like content and awareness of the context/environment). Photographic teaching so that the user's ability to manually capture photos/videos with conventional manual cameras also improves may be provided. Autonomous photographic learning so that the camera improves its ability to capture high quality photos/video as more are captured with feedback from the user or social networks may be provided. A camera with automatic self-calibration of the optical and positional signals by movement to a test chart may be provided. Autonomous recharging of a flying camera that may periodically return to land and park for automatic recharge may be provided. Use of shapes, colors, etc., to recognize the presence of other MCDs in a situation may be provided. Personalized skins for autonomous MCDs to change the appearance of the camera may be provided. Use of a Smart Landing Pad for nearly continuous autonomous camera operation may be provided. Use of an ultra-fast closed loop for flight stabilization using imaging position feedback techniques may be provided. Autonomous Air-Pan or Pre-Roll feature for photographic capture to add context to the photograph and ensure authenticity of the photo may be provided. Automatic Hyperlapse video creation at acquisition may be provided. A learning camera driven by photographic knowledge and autonomous social behavior and sharing on social networks may be provided. The autonomous behavior, connected with social feedback, may create a compelling combination to achieve never-before possible capture experiences. The rate of improvement can accelerate as well since all of these operations may be automatic and closed loop. A social camera may be provided. Automatic embedded image processing to improve the appearance of the subject being photographed or videographed may be provided. A method for a Quiet Flight MCD may be provided. Automatic self-calibration of a camera may be provided. Tilt-Pan-Zoom Intuitive processing algorithms may be provided. A new FlutterCam camera processor chip architecture may be provided. A new FlutterCam CMOS Imaging chip architecture may be provided. A new FlutterCam wireless hub memory chip architecture may be provided. Automatic software updates of an autonomous camera may be provided. Collision avoidance methods for an autonomous camera by dwelling or stalling rather than continuous navigation may be provided. An algorithm for a camera to stutter pose for selective removal of obstructing, unwanted visual objects in photography may be provided. Automatic enrollment into categories of images with context when capturing scenes for intelligent image libraries may be provided. The automatic update and use of photographic rules as social values that change over time may be provided. A method for an autonomous camera to determine a gesture of a user for control of a smartphone or other devices may be provided. A method for a camera to automatically take pictures of what the user points at may be provided. A method to "inverse sample" a visual scene with an image sensor may be provided. A camera to automatically detect emotion in a scene (either of the user or other objects in the scene) with higher accuracy because it's in autonomous flight, and an automatic method for sharing that emotion with a circle of friends and never miss a key photograph, may be provided. Using emotion detection and an autonomous camera (MCD) for introverts to better communicate via social imaging tools and networking may be provided. A personal home assistant tool as an application of the MCD may be provided. For example, the MCD can warn someone that shoes are on the stairs (e.g., to prevent tripping), or can be sent on a task of finding one's keys lost somewhere in the home. Emotion detection may be provided to control communication of a social network platform for improved (1) representation of a person's identity and personality, (2) accuracy of information (if wanted), and/or (3) a virtual "shared" presence with a higher level of emotional connection when communicating via the social network. A method for a "virtual tethering operation" of an autonomous camera (MCD) by restricting access by flight or movement to certain physical pre-determined zones when using mapping and 3D navigation methods may be provided. Other methods of propulsion and control of an autonomous camera may be provided. A method for Volume Video may be provided. Methods for an autonomous camera to locate, track, and lock onto specific objects in a scene, also described as track-and-follow, may be provided. Modifications of these methods to create smooth or damped motion of the autonomous camera, while still tracking an object in the scene, may be provided. Methods for "User-Assisted Navigation", where the MCD camera device informs the user where to place the MCD to take proper photos and videos, may be provided. The user may first sweep the smartphone around a room or scene to then compute the presence and location of objects for photo or video capture, followed by the MCD's automatic computation of the ideal position and pose for subsequent photo and video recording. Methods to "Position" a stationary smart MCD camera (e.g., especially in the case where the MCD has knowledge of where the camera should be placed and the user is then responsible for locating the device to that location), including graphical direction where a smartphone or other device shows a map or movement commands (e.g., like arrows or colored LEDs to show a boresight) to the user interactively as the device tracks the user's movement of the camera until it's in the proper position, or via verbal direction from the MCD (e.g., move up, move left, etc.) may be provided. A "Perceptual-Guidance Trigger" algorithm for a smart camera may be provided that automatically guides or instructs the user to place the camera manually in the "proper" position for an improved photographic experience. The result may be less effort to capture better pictures or video than without the perceptual guidance. The user may be instructed by the camera device to find the proper position of the camera. Visual or audio feedback (e.g., sonar pulses) may guide the user. This can be accomplished with the use of the MCD or conventional cameras and smartphones with these algorithms in embedded software. A method for consumer photography may be provided to create high-quality low-light photographs by stabilizing an autonomous camera with tracking algorithms while exposing another image sensor for long periods of time to create low light photographs without motion blur. A method for automatically sharing the "likeability" of photographs/video back to the creator of the photographs/video may be provided. A method to automatically position a camera (the MCD) by the movement of an object rather than the user, automatically creating sequences that look as if a professional camera operator was involved in the filming, may be provided. A method and algorithm to capture a photo/video when a pre-defined geometric position has been indicated visually in the scene may be provided. The trigger algorithm may automatically capture an image when a specific position is occupied by the subject to be recorded.

In some embodiments, an autonomous media capture device (AMCD) may be provided that may include a media capturing apparatus, a flight apparatus that houses the media capturing apparatus, and at least one controller coupled to the media capturing apparatus and the sustained flight apparatus, wherein the at least one controller may be operative to autonomously position the AMCD in any free space location and instruct the media capturing apparatus to capture media. The at least one controller may be operative to transmit the capture media to a server. Additionally or alternatively, the at least one controller may be operative to receive feedback based on the captured media and adjust at least one rule in a set of rules that control operation of the media capturing apparatus based on the received feedback. Additionally or alternatively, the at least one controller may be operative to maintain a set of rules that control how the media apparatus captures media, wherein such a set of rules may include user preferences, object recognition, emotion detection, and/or environmental data. Additionally or alternatively, the flight apparatus may be an autonomous flying machine. Additionally or alternatively, the autonomous media capture device may further include a skin that at least partially covers the flight apparatus. Additionally or alternatively, the flight apparatus may function as an air-tripod. Additionally or alternatively, the at least one controller may be operative to direct a subject to a location suitable for taking the best picture for an observed set of conditions.

A new camera device that is autonomous and intelligent may be provided. A fundamental advancement of perceptual technology (PT) of this disclosure is machine determination of when and how to capture media, including pictures, video, or other forms of media, for a broad range of camera devices, such as smartphones, sports cameras, and others, rather than human determination. Simply, MCDs of this disclosure may be operative to function autonomously for the purpose of capturing and sharing media with greatly improved quality, social expression, speed, and convenience than traditional approaches. Traditional approaches may fully rely on people, ranging from complete novices to highly skilled photographers, who must determine when and how to capture and share media with cameras based on their experience, skillset, and mood. Naturally, a side benefit of an autonomous camera may be that the active operator is not necessary and a user can freely participate in the event or situation rather than diverting his or her attention to controlling the camera device. While certain embodiments herein may include interaction with a user device (e.g., a smartphone) platform with PT algorithms as a portion of a product, certainly many forms of a product are envisioned. A platform may include a camera or cameras, a processor, any suitable sensors to detect position, motion, audio, and other information, a wireless connection to an interface, a display, and a user interface, which may be achieved by voice or gestures.

A user experience that may encourage emotional expression may be provided. An advancement of PT may be to engage users more fully into the capture process for the purpose of enhanced personal expression with others, for example, by guiding them with machine intelligence in the forms of analysis and instruction rather than relying on their own intelligence and skills to capture media. The result may be to dramatically enhance anyone's ability to match the results of highly skilled professional photographers and models in similar situations. Today a skilled photographer can improve the social expression of media with a combination of asking the subjects/actors to pose a particular way and dealing with all the photographic processes of light, exposure time, and others, all manually. With PT, similar to taking a Selfie with a Smartphone today, immediate response may be provided back to the subject/actors using algorithmic methods to instruct and guide novice subjects and actors how to pose and specifically enhance their emotional expression far beyond the expected smile. This may be achieved by a platform (e.g., any suitable machine, device, etc.) that may be operative to automatically analyze a scene and then, based on the analysis, instruct a user to reposition the camera or recompose the scene (e.g., much like a professional photographer might do) and/or cycle in an capture analysis loop mode until the subjects/models present themselves so that a "proper" capture is possible and achieved, where "proper" may refer to proper lighting, composition, attention and/or expressions of the subjects, and/or the like that may affect the quality of captured media. With PT, a user may relinquish control to the platform, rather than handing the camera to a skilled photographer to instruct the user how to capture the media. Emotion may be a key to capturing expressive media that is desirable to be shared with others. PT may be operative to use machine-guided methods and algorithms to instruct, encourage, and/or enhance emotional behavior of the subjects, either using a gamification process, or specific guidance to the user to position the camera device in one or more particular ways. For example, with any suitable platform software and user interface, a subject may be notified if he/she is very emotional, by augmenting the device's display with a "star" icon overlaying the captured media to indicate high value of emotional expression. Knowing this may encourage users to become more expressive to get more high scoring media captures. The specific guidance may also take the form of instructions as to where to place subjects or instructions about how those subjects pose. For example, the platform may be operative to ask the subjects to embrace or point at a distant object. All of this may enable novices to create professional quality media for sharing with others, without needless storage and sharing of poor quality media that is common today.

The PT of the platform may be operative to continually learn how a user prefers to capture media and what subjects the user prefers to capture, so as to improve the process with more uses (e.g., captures) and more users. The PT may be operative to score various success factors to provide feedback to various algorithms to increase the probability of capturing and sharing better media in the future. For example, in a coaching mode where the machine/device may be operative to instruct the user, the users of the device may learn more about how to behave as good models, and how to be successfully evaluated by the device, such as to express emotion more effectively. The ability to capture and share social behaviors, a key to social media capture, may be dramatically enhanced over today's cameras as users quickly learn how to become socially successful with this tool.

Various algorithmic processes may be provided for use by a PT platform (e.g., on a smartphone's application processor, such as a Qualcomm Snapdragon series, Apple Ax ARM series, or others, but certainly in some cases using a cloud server for some of these processing functions where longer latency can be tolerated (e.g., such as initial recognition of a situation and objects)). In preparation for computational cost reduction so that functions can be completed in ample time on smartphone devices, the resolution and in some cases the dynamic range of the images for computational analysis may be reduced. When 3D depth cameras are used, likewise smoothing and resolution reduction of the depth data may reduce computational latency. A range of 0.5 to 1 megapixel and 8 bits of intensity may be sufficient for such algorithms, although any suitable characteristics may be used. A region-dynamic local area threshold may also be employed to reduce the memory and processing further for substantial compression. In general, a series of conditions may be met before a media is captured (e.g., a shot is taken). These may be generalized to a loop processing in near real-time (e.g., video) to find and track subjects (e.g., actors) for the purpose of ensuring strong emotional expression in interesting situations. While substantial processing may be necessary, techniques may be employed to reduce that complexity, such as by tracking key points of interest in a scene rather than all the detail, yielding simple and efficient algorithms, and cooperation of the subjects/actors, rather than exhaustive computation with long latency. For this to work properly, all computation may be completed in less than a second, as subjects tend to change emotion very quickly.

Situation awareness algorithms may be provided for the PT of a platform. A platform may seek to understand the content of scenes, the time-of-day, the illumination, the orientation, whom the subjects are, and the like, for the purpose of determining if media should be captured at that time, or as input to a Photographic Intelligence (PI) algorithm or module for subsequent direction to the subjects/actors/owners of the platform. Since a smartphone may be in use, the context may usually be determined at least partially directly from the smartphone, such as GPS location, compass orientation, time of day, predicted angle of sunlight, and/or the like, each of which may help the platform with composition. More advanced methods may include locating and measuring the location of illuminating devices. Identification of objects may occur with cloud-based algorithms to quantify the content of a scene. Examples may include Google-Images where deep convolutional networks may be employed to recognize objects. Once an object is recognized, local 2D centroid tracking algorithms may be operative to keep track of the object's location continuously. This algorithm may form a tracking box about an object by computing the centroid of the object (e.g., center point of a thresholded image). Additionally or alternatively, a smartphone may employ 3D cameras to measure and locate these objects in real-time on the smartphone in 3 dimensions.

A prominent measure for scene context, which may be used to gate media capture in dark situations, may be the use of the smartphone's inertia sensors (e.g., gyroscope) to detect stillness. In low light, it may be important for the user to stabilize the camera and to not shake their hand. In operation, the user may be eventually shown visually with a bounding color or flag on the smartphone's screen that stability has been achieved and the process of analysis and capture can begin. Other situation awareness algorithms may include tracking the sunset (e.g., by on-line database) to alert the user of a pending ideal photographic situation. Tapping into on-line webcams of a local area and then performing similar algorithms to extract visual features can augment that information to further indicate a setting with ideal conditions for a rich red sunset, such as broken cloud cover or other information.

Photographic intelligence and learning algorithms may be used. Such algorithms may achieve quantification and analysis of a set of photographic rules and data, with improvement of those rules over time to optimize a user's photographic experience. These parameters may be retained for each user. Photographic rules and algorithms may vary for terrain verse portrait media situations. However, analysis of features and characteristics of the subject and situation may help ensure the final captured media conforms to as many rules of photography as possible, or those that the owner prefers based on a predetermined style preference. For terrain shots and in the portrait/Selfie shots, this analysis may help the automated capture decision loop decide when to capture the media. In an optional Photographic Coaching mode, the results of such computational analysis may be used to guide the subjects and actors to coordinate and orchestrate the media event. For example, at a dinner party, the platform may be operative to ask for everyone to pose in a particular way or perhaps ask someone to move slightly or change an expression to improve the resultant media capture. The following algorithms may be examples of rules that may be applied in a media capture process, however, many others can be added depending on the target application and performance expectations. It may be noted that most photographers typically use between 10 and 20 rules of photography.

A rule of thirds may be employed. A PT platform may be operative to compute scene content parameters for various regions of a captured image, such as nine regions. Content parameters may include histograms of color, and the intensity and density of shapes like lines or circles may be measured. For line structure analysis, a captured image may be converted to a line-based image using one of several popular line detection algorithms (e.g., gradient magnitude and direction with Sobel or Roberts operators, Difference of Gaussian, gradient of Gaussian Canny edge detectors or interest points). Then a Hough transform may be computed and analyzed to evaluate the type and density of lines in each region. By employing a Rule-of-Thirds, feature consistency (e.g., type of scene content) of the scene in each region may be maintained. In some embodiments, the platform may be operative to align the camera so a horizon line may be near a third of the vertical height. Comparing those statistical measures for each region may indicate success or failure of a rule of thirds.

Leading lines in a scene may be calculated. Major line gradients may be computed with a Hough transform that may show the angle of a line and distance from the center. The rule may seek to draw the observer's eyes along a line in the visual media. A scene with a row of objects, like objects of the same size but in perspective with each object smaller than the other, may add depth with leading lines. High occurrence of perspective lines may be operative to trigger media capture by the platform.

Depth in scene may be utilized. Object and feature size within vertical regions may be computed to assess depth. For cameras with focus control, a sequence of images may be measured to verify depth. For example, a lens may be moved to keep far objects in focus and then the total blur of the horizontal bands of the image may be checked with a Fourier transform, then that transform may be compared to the next focus position, and so on. Smartphones may include depth cameras to directly measure the depth of a scene. Capturing scenes with complex depth objects in the foreground and background (e.g., many of similar objects at different distances) may be operative to give the scene a strong feeling of depth and can draw the eye in to the scene. Certainly overlapping objects (e.g., one person in front of the other) may also create depth, which can be verified by image analysis of size and occlusion detection algorithms.

An autonomous capture process loop mode, which may utilize one or more machine guidance algorithms, may be provided. As a core loop to decide what and how to capture, an autonomous capture process loop may rely on a user to position the camera, but may intelligently and automatically decide what to capture at the right time. However, for some devices, the device may either reposition to the proper position at the proper time such as with a flying drone platform or a repositioner, or may instruct the user to reposition it, then orchestrate the proper emotional behavior of the subjects or perception of emotion in a scene with either voice or instructions drawn on the screen (e.g., "move left" or "smile more"). A capture analysis loop may monitor events and measure the strength of emotional expression in the scene and subjects. With pending media capture, one or more various algorithms may be operative to analyze images for a capture criterion present in the scene, then capture and analysis may be repeated until an optimal or satisfactory image may be captured and saved. One or more of the following algorithms may be leveraged for measuring a positive indication: subject and face tracking algorithm(s), subject eye position algorithm(s), photo glamour shot with exoskeleton analysis algorithm(s), key point expression matching algorithm(s), audio and motion queue algorithm(s), camera physics optimization algorithm(s), final crop and enhance algorithm(s), and/or the like.

Figure 15:
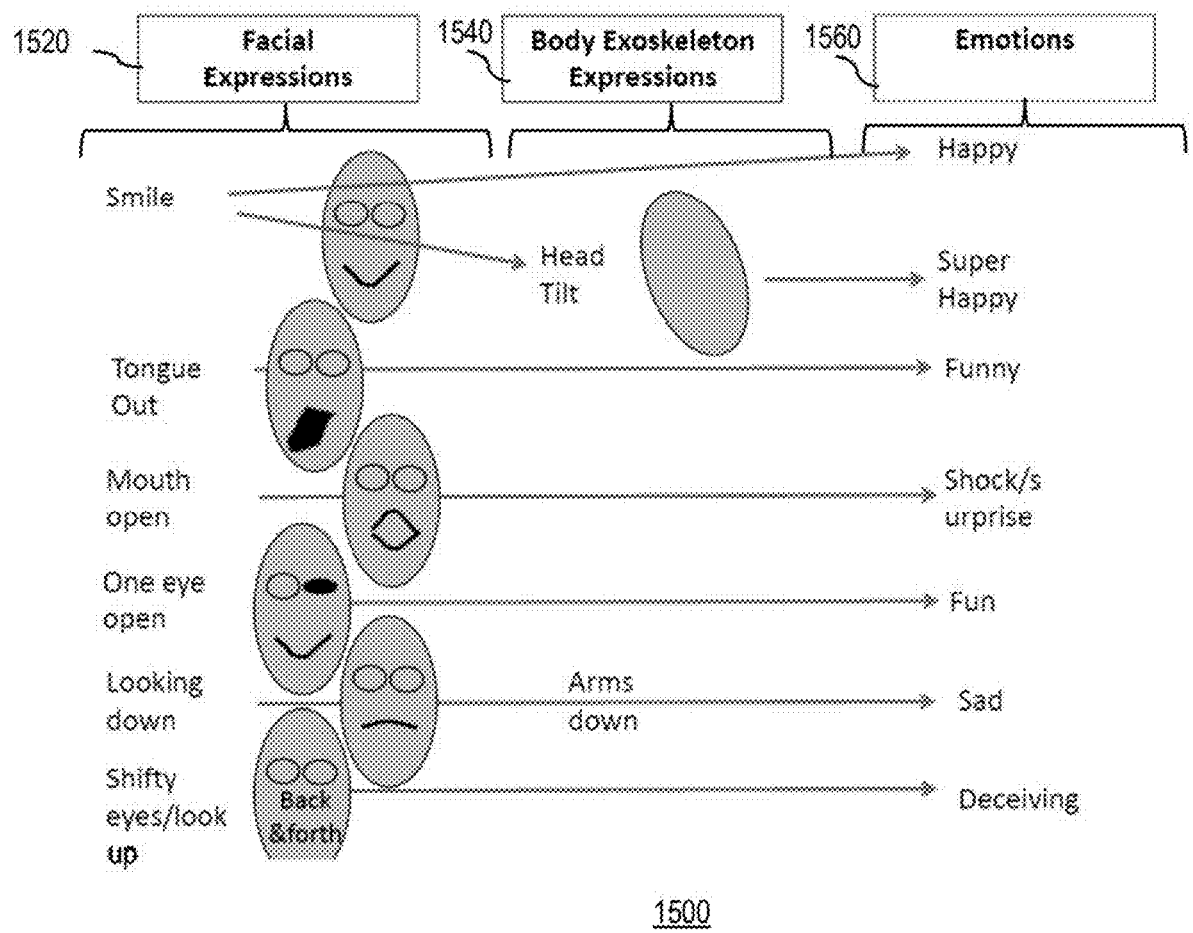
FIG. 15 shows a diagram illustrating various results of expression analysis, according to at least one embodiment.

One or more subject and face tracking algorithms may be used. An advanced facial expression tracker algorithm using multiple forms of analysis to extract features and position of those features over time may be utilized. Such tracking may be fast, which may drive the use of lower resolution rather than the native images from the camera. At least one, some, or each subject's face may be parameterized with facial features (e.g., the position of the eyes) and analyzed for changes to a normal, non-expressive face. FIG. 15 may show a diagram 1500 that may illustrate various results of expression analysis (e.g., facial expression analysis of various detected facial expressions 1520 and/or body exoskeleton expression analysis of various detected body exoskeleton expressions 1540) and a resulting mapping to emotions (e.g., various emotions 1560). Image capture triggers may be established that may correspond to detection of certain emotion and expression of the subject(s) in the scene. Audio queues may also be detected to further enhance emotion scores. For example, correlating data of a particular scene subject to a particular emotion may be augmented with audio analysis for correlation and scoring (e.g., detected laughter or crying or loud or soft noise may affect the correlation to a particular emotion).

One or more subject eye position algorithms may be used. To establish a trigger for capture, object and feature size, change rate (e.g., blink vs. closed), and/or gaze of one or more subject's eyes may be computed, for example, to extract if the subject has attention and is purposeful. In guided group scenes, such algorithm(s) may be operative to flag when a subject's eyes are looking at the camera. A key condition of capture of group portraits may be attentive and purposeful groups of subjects. A PT platform camera may achieve this automatically through leveraging such eye algorithm(s).

Figure 16:
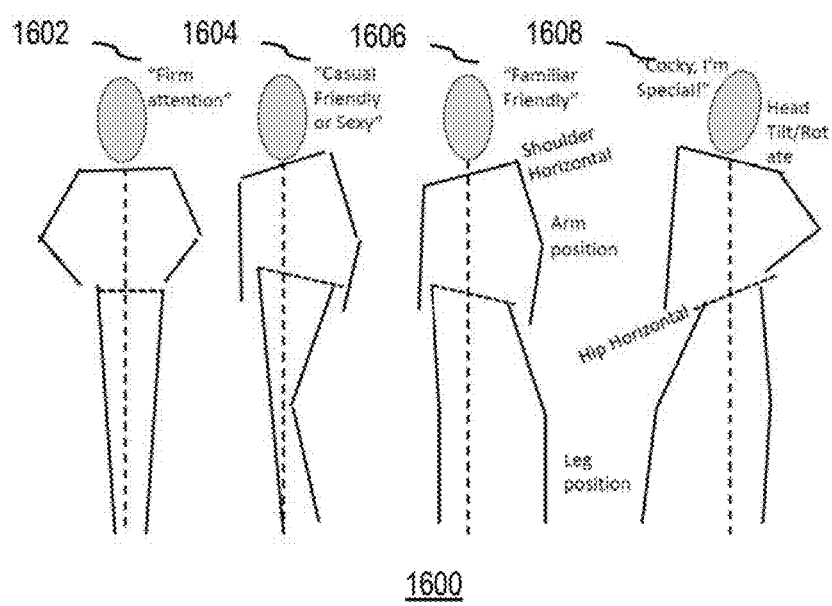
FIG. 16 shows a diagram illustrating various target poses, according to at least one embodiment.

One or more photo glamour shot with exoskeleton analysis algorithms may be used. When one sees a photo by a professional photographer, one often say there's something about that photo that makes it great. As an example, a glamour expression can include a subject in a particular type of pose, such as one of the poses indicated by the collection of exoskeleton body poses 1602, 1604, 1606, and 1608 shown by diagram 1600 of FIG. 16. To orchestrate this behavior of the actors/users, the PT platform may be operative to instruct a subject by presenting diagrams and/or using voice commands to pose a specific way. Then, the one or more appropriate algorithms may analyze captured images to compute object and feature size within appropriate regions or zones (e.g., head tilt and/or rotation, shoulder angle, arm position, hip angle, leg position, etc.). For example, rather than simply a face tracker and feature extractor that may analyze facial features, such exoskeleton algorithm(s) may be operative to analyze at least a portion or the entirety of an exoskeleton of the subject's structure for similarity to the preferred target expression (e.g., a target pose of diagram 1600).

Figure 17:
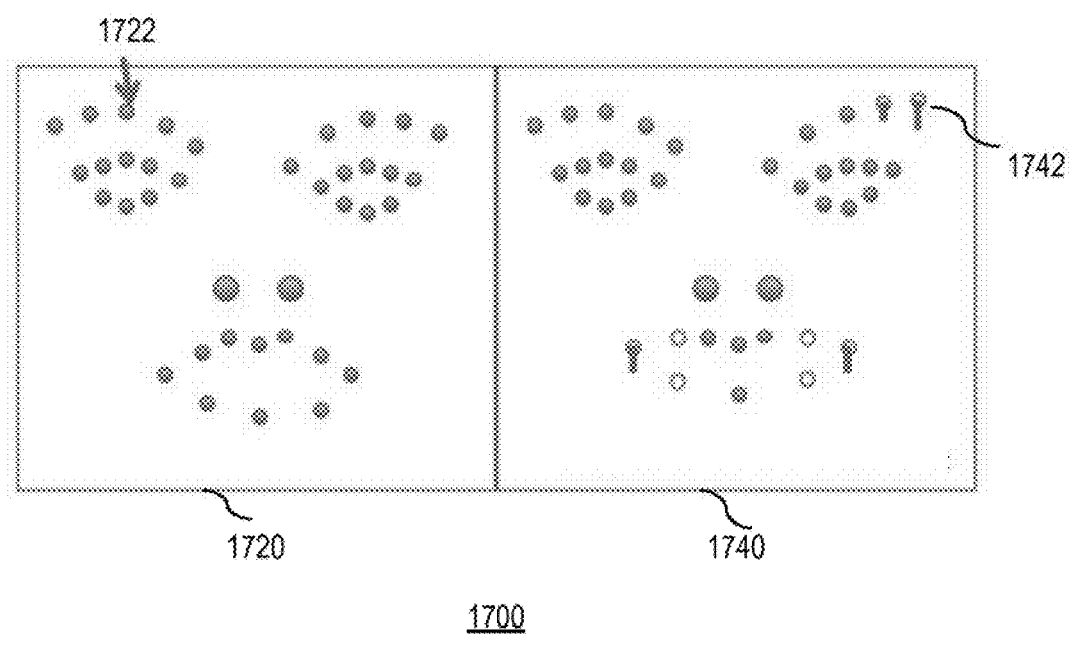
FIG. 17 shows a diagram illustrating various facial data points, according to at least one embodiment.

One or more key point expression matching algorithms may be used. Once any suitable expression data has been captured for a subject, an expression matching algorithm may be utilized to compare the expression values for each subject to a base library of expressions. The data may be first normalized in scale to the stored data such that only the differences from the "normal data" may be measured or otherwise analyzed (e.g., distance vectors from mouth key points or other feature key points may be measured and retained as a reference). If an eyebrow moves up, that may be a significant metric to measure. The matching algorithm can be as simple as a sequence of if-then-else instructions that may assess the movement of one or more "key points", such as those points shown in a comparison diagram 1700 of FIG. 17. For example, as shown by diagram 1700, a first expression 1720 (e.g., of a library) may include one or more key points 1722, which may be illustrative of a face with two eyebrows, two eyes, two nostrils and a mouth, while a second expression 1740 may include one or more key points 1742, at least some of which may be positioned similarly to those of first expression 1720 but others of which may be positioned differently than those of first expression 1720 such that second expression 1740 may be considered "happier with some smile and eyebrow lift" as compared to first expression 1720. If the key points of one's face, such as the mouth and eye brows, move up, then a new expression may be detected. Scoring the changes can be a weighted sum of all changes in the feature (e.g., mouth, eye, or other). Training may be employed to improve performance. A training process may include mapping parametric data for known trial expressions directly into a user's Photographic Intelligence database. One-by-one, a user may enroll various expressions for a personalization of the algorithm to improve performance. Another method to match key points may employ neural network structures to match patterns and learn the correlations between key point positions and expressions. Finally, the resultant expression and emotion analysis results may be stored (e.g., in a captured media's headers) or otherwise associated with the captured media for later use (e.g., by search engines, social network sharing, and/or other applications).

One or more computationally complex methods may be operative enhance performance of expression and emotion recognition, such as the real-time extraction of 3D depth image data. In that case, the structure of a face and exoskeleton may be extracted from 3D surface data. More intricate motion and flow can be quickly extracted to identify even more subtle gestures and expressions. Several 3D camera methods may be available in smartphones (e.g., Intel's RealSense) that may include the direct capture of RGB-D images and/or other methods that may include Dacuda's algorithm to compute 3D structure using existing 2D cameras and a waving and scanning motion to extract RGB-D images. Either may be operative to enhance the performance of the PT platform.

Audio and/or motion queue algorithms may be utilized. When audio sensors are employed in the smartphone or platform camera subsystem, the speed of speech and loudness over the ambient noise may be key measures for subject emotion and expression detection. Full speaker-independent speech recognition may be helpful, but certain embodiments may simply monitor loudness vs. the ambient sound level. As the subjects in the scene may not be the person(s) speaking closest to the audio sensor(s) of the smartphone or camera subsystems of the platform, an algorithm may be used to match the speech in the camera's field-of-view with the motion of lips of the subjects. Lip motion may then be tracked. If no motion is detected, the loud sounds may be determined not to be originating from the subjects and may not be used to assist emotion detection. However, a simplified method, especially in a Selfie mode, may assume the loudness is that of the subject's because most speakers will be near the smartphone and in the field-of-view, thereby being used to enhance the emotion detection. Audio and/or motion queues may be monitored (e.g., in a visual sleep mode), whereas each may be monitored in sequence in an autonomous capture loop mode.

One or more camera physics optimization algorithms may be used. Before, during, and/or after a situation and/or subject(s) may be properly positioned and emotional state(s) may be determined, the PT platform may be operative to leverage one or more physical optimizations so improved media may be captured, such as optimizations with respect to one or more of seeking vibrant colors, proper lighting, focus, and/or the like. While a smartphone's sensors and APIs may be operative to optimize some characteristics automatically, the platform of this disclosure may be operative to ensure the best capture experience. This can be attained by using alternatives to standard camera functions, but it may somewhat depend on the flexibility of the smartphone camera's capabilities and API. So, at this point in a process, these capabilities and characteristics may be measured and then a user may be informed if changes might be necessary in lighting or other characteristics to somewhat compensate for the limitations of the smartphone camera device. For example, illumination level, orientation, color histograms, contrast ratios, and/or other characteristics may be measured to ensure a quality capture, before sharing begins.

One or more crop and/or enhance algorithms may be utilized. Once a platform camera captures media, the composition may be analyzed for size and location of objects and subjects. Then the composition may be automatically cropped to remove uninteresting content in the scene. If the background is integral to the captured emotional expression, it may be maintained (e.g., a terrain shot). However, especially with Selfies, the platform may be configured to crop most captured media. For example, if two people are in a scene, the crop may be operative to effectively zoom in on those two people, compensating for any zoom or positioning errors as the user held the smartphone. A rule-of-thumb of an algorithm may be to crop all imagery larger than a 20% border around all subjects' facial images.

One or more coaching mode algorithms may be utilized. The platform may be operative to use one, two, or any other suitable methods to coach users, subjects, or actors in order to improve a media capture experience. As one example, a user may be instructed by the platform that emotion is vital to successful operation and that he/she will be scored based on that, as a coach would do. Additionally or alternatively, when in an autonomous capture loop, as described, the platform may be operative to determine whether or not to start coaching the actors when a decision loop has timed out (see, e.g., process 1800 of FIG. 18). In such instances, one or more specific instructions to the actors (e.g., visually or verbally) may be presented to encourage more emotional expression. For example, various expressions of FIGS. 14-16 may be utilized to train and/or teach a user, for promoting a higher emotion score, which may trigger autonomous capture on a next cycle (e.g., next iteration of steps of process 1800).

One or more autonomous sharing algorithms may be utilized. The platform may be operative to share media with social network contacts of an owner/user/subject and may be operative to present feedback of such shared media automatically back to the owner/user/subject.

One or more autonomous camera mode select algorithms may be utilized. At least a portion of the platform may be operative to be in one of several global modes of operation, including, but not limited to, off, idle/listen, on/autonomous, owner-controlled, other user-controlled, uber, and/or any other suitable mode. In some cases, a platform camera may remain on and one or more platform algorithms may be operative to hunt for one or more events that may trigger media capture. A user may place a platform device in an on/autonomous mode so that it can freely process and control the experience. In another case, a platform application may be operative to run in an idle/listen (e.g., visual sleep) mode to determine when a media capture event might exist. Such a pending event may be determined by monitoring a user's calendar and/or by listening for audio queues, followed by an indication to a user that an event is pending. When in full operation, the platform may be operated by an owner or any other person. When a new person may be using/operating a platform device, his/her Photographic Intelligence may be downloaded (e.g., from a cloud-based library) or created in real time to assist the process. In an uber mode, a user may capture location and/or event descriptors to be shared with others so they can actually use their platform camera to capture the media at some point in the future. Each of these may be processes and/or algorithms that may be optimized for real-time (e.g., with local processing within a smartphone-class processor and/or utilizing existing sensors embedded into smartphone devices, such as image, motion, and/or audio sensors). However, optimized solutions may be operative to create new devices with varieties of performance and feature capabilities.

Autonomous camera usage of the various platform embodiments of this disclosure may have many ranging benefits. For example, such platform algorithms may be operative to enable any camera device to be used for the purpose of elevated personal satisfaction in social interaction by capturing and sharing inspiring media via personal operation rather than requiring professional photographers, so that anyone can easily function as an expert photographer. In practice, a user may simply hold up a camera or place a camera on a controllable re-positioner and the camera may be operative to capture media in natural situations, favoring emotional expressive media to share with friends or associates. An effect of machine-based algorithm(s) of the platform may be to inspire or otherwise pull out emotion in any situation by creating a device that may be operative to convince users to express their emotion in a safe and private situation rather than requiring the user to employ a professional photographer, gather years of experience, and/or manually incite such emotion. An autonomous rating of user emotion by the platform may be operative to gamify the process and encourage more usage in a fun way. Users may become more focused and intent on creating great emotional media. Removing an expensive human photographer from the process may result in users that are less worried about what that photographer may be thinking and may act more natural. In the end, a user may have the control rather than a photographer and with the machine being configured to analyze the captured media and/or subjects/situation for the media to be captured, the platform may generate optimal results. Through automatic sharing of certain captured media with certain social networks and through presentation of responses to such shared media, a user may get more instantaneous feedback and/or recognition and/or a more emotional response for increasing personal satisfaction. If a user is successful in generating a unique or emotional expression (e.g., tilting its head and widely opening its eyes), the platform may be operative to reward that user. The platform may be operative to capture media, evaluate the media, and reward the subject/user when the media is determined to be effective, thereby encouraging usage and/or facilitating the capture of improved media that may be more likely to garnish social feedback.

Figure 18:
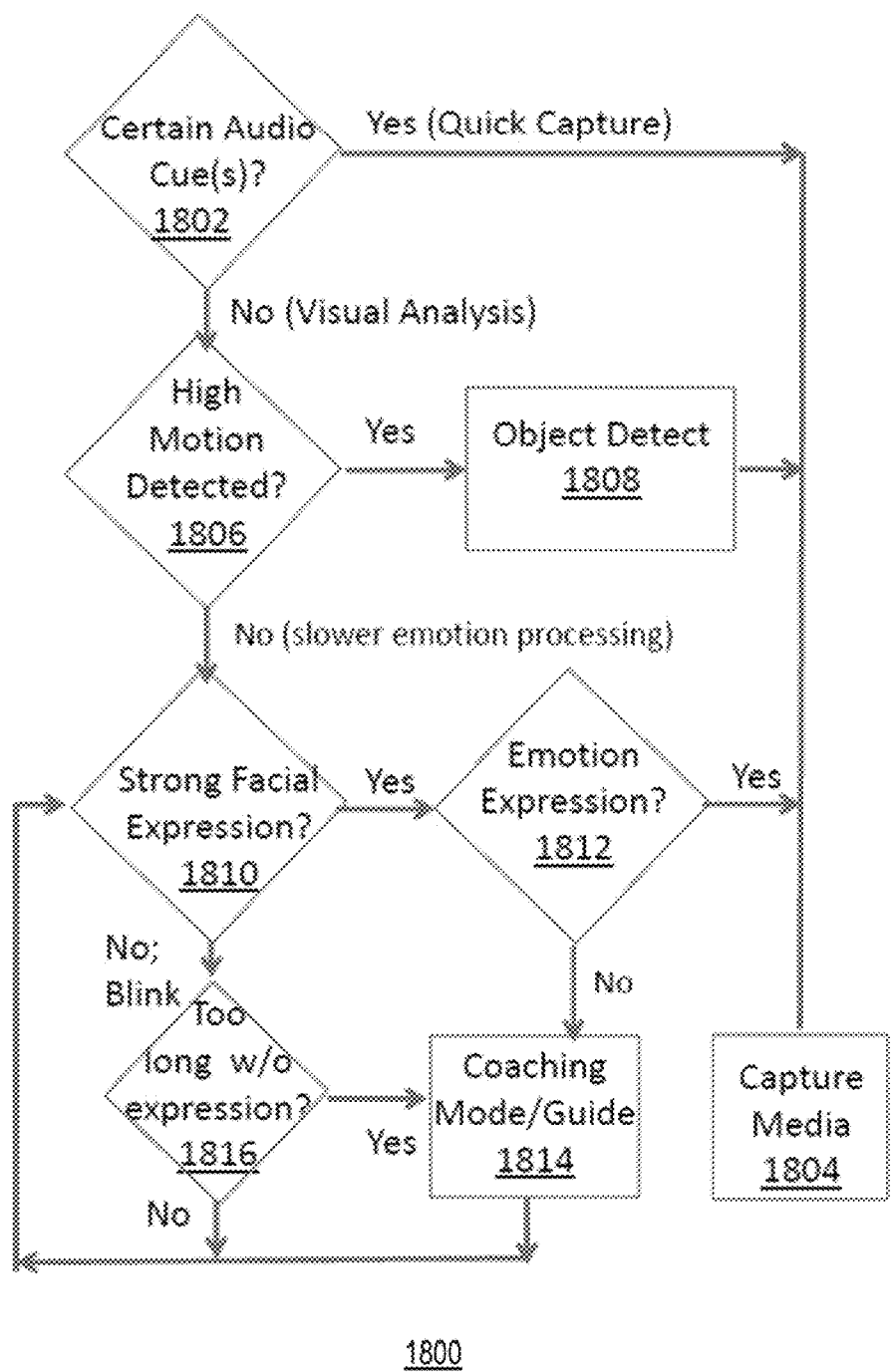
FIGS. 18 and 19 are flowcharts of various illustrative processes for capturing media using an MCD platform of the disclosure, according to various embodiments.

FIG. 18 is a flowchart of an illustrative process 1800 for automatically capturing media with an MCD platform. Process 1800 may be implemented by any suitable subsystem or combination of subsystems of the disclosure. At step 1802, process 1800 may be operative to determine whether any audio cues may be detected in the environment of the platform. For example, if any certain audio cues are detected at step 1802, such as an audio instruction to take a picture (e.g., an audible user instruction) and/or any audio that may be analyzed to indicate a unique moment worthy of media capture, then process 1800 may process from step 1802 to step 1804, where media may be automatically captured. After step 1804, process 1800 may end or repeat (e.g., proceed to step 1802) in a continuous loop such that any number of instances of media may be captured during a session. However, if such one or more audio cues are not detected at step 1802, process 1800 may advance to step 1806, where it may be determined (e.g., through visual analysis) whether or not a high motion situation is underway. For example, the platform may be operative to determine whether a motion of the platform (e.g., a camera and/or a smartphone of the platform) and/or a motion of an object within a field of view of the platform camera may be above a particular threshold speed. If such high motion is detected at step 1806, then process 1800 may proceed to step 1808, where one or more particular objects may be detected (e.g., tracked and/or focused on) and then process 1800 may proceed to step 1804 for capturing media that may include such object(s). However, if such high motion is not detected at step 1806, process 1800 may proceed to step 1810, where any suitable subject expression data may be captured and/or analyzed to determine whether or not a strong expression may be detected. Any suitable algorithms may be utilized at step 1810 (e.g., as described with respect to FIGS. 14-17) for detecting any suitable expressions, such as by extracting position data of facial feature geometry and determining any changes thereof (e.g., from subject to subject or compared to stored facial database, etc.), by accessing and utilizing any suitable parameters (e.g., positions and orientations and motion of various features, such as eyes, nose, mouth, hips, arms, legs, etc.), and/or by measuring a change of any such data from a normal data set of the same, such that any suitable characteristics of the subject(s) may be determined, such as stillness, pose (e.g., tilt, rotation, etc. of skeletal features), and the like to determine the strength of an expression of each subject. If a strong expression is detected at step 1810, then process 1800 may proceed to step 1812, where any other suitable detection and analysis may be utilized to determine the emotion of one or more subjects (e.g., using audio cues or the like to determine whether a subject or situation may be considered happy or sad or indifferent). If an appropriate emotion may be determined, process 1800 may proceed from step 1812 to step 1804, where media may be captured. However, if an appropriate emotion is not detected, process 1800 may proceed from step 1812 to step 1814, where a coaching mode or guide may be utilized by the platform to instruct one or more users to change the emotion of one or more subjects, after which process 1800 may return to step 1810. However, if no strong expression is detected at step 1810, then process 1800 may proceed to step 1816, where a clock may be analyzed to determine whether process 1800 has continued for a particular length of time without detecting a strong expression. If process 1800 has continued for such a particular length of time, then process 1800 may proceed from step 1816 to step 1814, where a coaching mode or guide may be utilized by the platform to instruct one or more users to change the expression of one or more subjects, after which process 1800 may return to step 1810. However, if process 1800 has not yet continued for such a particular length of time, then process 1800 may return from step 1816 to step 1810.

It is understood that the steps shown in process 1800 of FIG. 1800 are merely illustrative and that existing steps may be modified or omitted, additional steps may be added, and the order of certain steps may be altered.

Figure 19:
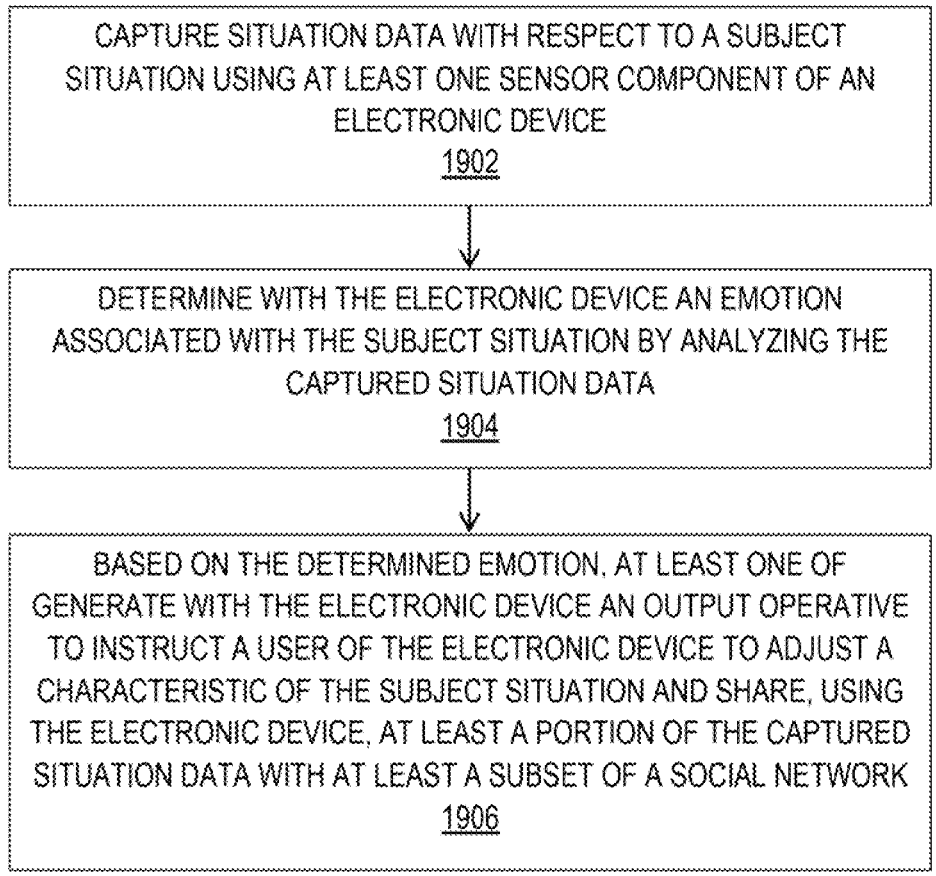

FIG. 19 is a flowchart of an illustrative process 1900 for capturing media (e.g., using a subsystem or electronic device of the disclosure). At step 1902 of process 1900, situation data may be captured with respect to a subject situation using at least one sensor component of an electronic device (e.g., using any suitable MCD of the disclosure). Then, at step 1904 of process 1900, an emotion associated with the subject situation may be determined with the electronic device by analyzing the captured situation data (e.g., using any suitable algorithms or machine-learning of the disclosure). Then, at step 1906 of process 1900, based on the emotion determined at step 1904, an output operative to instruct a user of the electronic device to adjust a characteristic of the subject situation may be generated with the electronic device (e.g., to facilitate capturing improved media (e.g., improved situation data)) and/or at least a portion of the captured situation data may be shared, using the electronic device with at least a subset of a social network (e.g., to facilitate receiving social network feedback with respect to the captured situation data).

It is understood that the steps shown in process 1900 of FIG. 19 are merely illustrative and that existing steps may be modified or omitted, additional steps may be added, and the order of certain steps may be altered.

Therefore, various autonomous media capturing systems and methods for operating and using the same are provided. In some embodiments, an emotion-based media capturing subsystem and method may be provided. The automatic capture of media may be enabled using cameras or other suitable recording devices or subsystems that may be operative to carryout (1) real-time situation analysis, (2) real-time human emotion recognition, and (3) real-time decision-making with respect to when and how to capture media and how to share such captured media based on comparing and/or otherwise leveraging the analysis of (1) and the recognition of (2), such that a retained machine visual/audio intelligence may be provided for the purpose of successful capture and distant sharing of "live" emotional or social situations with others. The media capture subsystem may provide real-time algorithmic processing of images and audio in the form of software or a media processor (e.g., depending on the solution) that may supplement or be leveraged by standard camera components of image/audio sensors, memories, optical components (e.g., lenses), and wireless network connections.

In some embodiments, successful media capture may be achieved, especially when using real-time emotion scoring. A successful capture of media may be more often and more simply achieved when real-time analysis of emotional expression may be carried out explicitly and in real-time at media capture and at sharing (e.g., locally at a media capture subsystem), especially in comparison to media which would have been captured and shared without the use of emotion/situation analysis (e.g., as may be the case for conventional cameras), or those that perhaps use such analysis but with long latency of computation such as by moving the candidate media to the internet for analysis and then with capture following processing (e.g., perhaps minutes later, many times missing the target emotion capture). A method to measure the emotional content of the captured media is provided. Machine-based results may be achieved faster and/or more-efficiently using such emotion measurement as compared to conventional manual methods of capture, store, review, manual edit, and then sharing. Viewers of media captured according to this disclosure will know it is authentic when it originates using this approach since the manual image edit step may not be used.

A new level of reward during usage of a media capture subsystem may be provided. This disclosure provides devices, systems, and methods that may enable humans to experience new levels of reward and satisfaction with media capture, such as photography, by: (1) simplifying the process (e.g., the disclosure enables fast and automatic media capture so as not to miss key shots), (2) personalizing it (e.g., the disclosure enables media capture that the owner will want to keep or use as a retained machine visual intelligence may be personalized to the user's preferences), (3) improving the results (e.g., the disclosure enables the retention of knowledge of what makes good media and may improve that over time), (4) education (e.g., the disclosure enables the teaching of new modeling and photographic skills for improved emotional or social situations), and (5) satisfaction (e.g., the disclosure enables social feedback of one's success or failure at expressing emotion).

Emotion may be used according to various unique modes of operation. Depending on the intended use or application of the media capture device or subsystem, emotion may be measured at different times, and in different ways. For example, the presence of a user's emotion may be measured to trigger the MCD to wake up and find interesting media to capture. Special methods of measuring a user's emotion continuously, so as not to drain a power supply, are provided. Measuring elevation of a user's acoustic sound may be utilized to trigger such a mode (e.g., to wake up an MCD for appropriate media capture). Additionally or alternatively, the strength of a subject's emotion in a situation may be detected and measured to at least partially determine when and how to capture media associated with the current situation. Measured emotions may range from happy to super happy, from sad to very sad, and others. The subsystem may be used and may attempt to always capture the best media possible. Additionally or alternatively, the strength of a scene may be measured without human or animal subjects having an expected emotional expression of content. For example, media captured of a sky with tornados may be analyzed to determine one or more emotions that the media may evoke in a viewer. Also important in evaluating the content of a scene, such as with a terrain scene, the MCD may additionally or alternatively be operative to detect the emotion of a user, even if that user is not in the media being captured (e.g., the audible gasp of a user may be detected to determine the emotion of that user despite that user not being included as a subject in a photographic media content being captured (e.g., a user not in the field of view of a camera capturing a photograph of a tornado)). For example, certain geometries and/or expressions may be inherent in a picture that a viewer looks at or otherwise experiences or in the response of that viewer/experiencer (e.g., the user of the MCD and/or an experiencer that is in the social network of the MCD user that shared the captured media). Social network feedback can be used for photographs or other captured media with or without human facial emotions, whereby each user's personal algorithms of determining emotion for media may be unique to that user and its social network. Feedback and analysis may leverage local media comparison technology to detect similar media and/or feedback to determine an appropriate emotion for the media and/or for the feedback. Additionally or alternatively, the strength of emotion of eventual client viewers of the media (e.g., experiencers) may be automatically measured at the time of that client actually viewing the media (e.g., using the experiencer's own client device that may be operative to detect certain characteristics (e.g., audio, video, haptics, etc.) and share such data with the MCD and/or determine the emotion prior to sharing that determined emotion with the MCD. Such data may be automatically sent back to the MCD or subsystem of the originator (user) for "live" feedback.

Machine-guided sharing of captured media is provided. A machine-guided determination (e.g., decision) of where and to whom to share captured media based on the specific emotional content of captured media. For example, automatic distribution of captured media containing strong emotion content may be sent to at least a subset of a user's social network (e.g., close friends). Automatic emotion scoring of captured media by those that have seen the shared data and the instantaneous delivery back to the MCD subsystem of that scoring may be used to (1) improve the subsystem's emotion scoring algorithms, and/or (2) speed up the sharing of human emotion as the sender does not wait for a human to prepare and send a response, leading to enhanced user gratification (e.g., when a device of an experiencer of the shared media may (e.g., automatically) capture and share with the MCD subsystem any suitable data indicative of the experiencer's emotion while experiencing the shared media), as this may shorten latency of the experiencer providing useful feedback. Such feedback may be cataloged and/or statistically analyzed to update one or more algorithms or scoring techniques of the MCD subsystem. Alternatively, the captured media and/or feedback may be analyzed by a human entity (e.g., a professional photographer may be leveraged as a professional algorithm engineer).

Methods to automate a photographer's role in media capture, such as for enabling photographic coaching, may be provided. Systems and methods are disclosed that enable an MCD subsystem to interact with subjects in a situation to be captured so that the user of the MCD does not need a skilled photographer. Methods to achieve machine photography may include: (1) the continuous scoring and feedback of human emotion or expression of a situation and/or (2) the machine-guided direction by a camera device (machine) to help the user find and learn the proper pose or location to pose, rather than using a human photographer to guide the subjects. For example, an MCD subsystem may be operative to automatically determine how and when to capture media, in cooperation with the subject, for improving the resultant emotion expression in the captured media. Additionally or alternatively, an MCD subsystem may be operative to determine emotion scores by continuously recognizing the strength of human emotion as compared to retained machine visual intelligence. Additionally or alternatively, an MCD subsystem may be operative to provide feedback to the subjects in the scene to be captured in the form of icons or emoticons or other suitable visual manners and/or in the form of any suitable audible and/or haptic manners (e.g., of varying strength) via one or more output components of the MCD subsystem. Additionally or alternatively, an MCD subsystem may be operative to use and enable interaction with an automatic camera that may motivate the subject in the scene to change his/her behavior to achieve a high emotional score, so his/her friends may become impressed with the resulting media while sharing the media. Additionally or alternatively, an MCD subsystem may be operative to provide fast feedback that may inspire the subject to further interact with the MCD to increase the emotional score of an expressive situation. Additionally or alternatively, an MCD subsystem may be operative to provide retained machine visual intelligence that may monitor a situation for low scores and then make suggestions in order to encourage and eventually achieve capture of more expressive media, but without a skilled photographer being present (e.g., more success may be enabled with photography when engaged in the process with machine intelligence than with a person (a conventional photographer)). Additionally or alternatively, an MCD subsystem may be operative to guide and/or reposition a field of view or capture. Interactive use of displayed icons, audio sonar-like signals, and/or flashing LEDs to guide a holder of an MCD to a proper position by iterative use of MCD-based algorithms to analyze the lighting direction and strength, the position and scale of the subjects, and/or other suitable information, such as GPS location, time of day, weather, and compass direction (e.g., using sensors typically found in smartphones) may be provided. Additionally or alternatively, an MCD subsystem may be operative to guide with photography rules. Encoding of photographic rules, like the rule of thirds or depth of field to blur a scene's background for focus of attention on the subject, may be provided in an autonomous camera or MCD to drive the above-described camera and user-guiding methods to a proper position at a proper time.

Attributes and/or rules of desired social media may be provided. A set of dominant baseline attributes to characterize good social media (e.g., media in the form of selfies or any other suitable type) may be provided and an MCD subsystem may be operative to analyze such attributes in light of captured media and may then either attempt to capture media with a better score and/or may command a user or the capture device to automatically relocate the capture device to a better location to capture better media. Such attributes may include a preference for (1) good lighting (e.g., by measuring illumination and noise in captured media, which may be based on physics) and/or expressive lighting (e.g., as an automated device may be operative to move to get best light and/or to control the gaze and/or position of the camera to portray attention and/or emotion and/or to detect certain lighting characteristics of captured media (e.g., lighting tricks or situations that may conventionally be used by photographers to evoke emotion, such as crepuscular rays or sunbeams, light filtered through a building or other object, etc., for creating a unique or awe inspiring effect), which may be enabled through use of a huff transform or other suitable processing technique), (2) sunrise/sunset lighting, (3) the rule of thirds, (4) depth by composition and/or blurring, (5) human shapes in reflected nature, (6) emotion-based facial expressions, (7) emotion-based body exoskeleton expressions, (8) audio events of emotion expression, (9) a frame around an image so a human subject/model's face may be between 33 and 50% of the scene's content, (10) if multiple subjects are detected, those similar in scale and position may be grouped to then scale or crop the image to less than 80% of the scene's content, (11) if blemishes, asymmetric features, or unusual features are detected on human subjects, repositioning may be automatically driven to change the pose to better conceal the features (e.g., a double chin), (12) the head of subjects (human or animal) being slightly tilted, (13) the camera being still when the final image is captured, as measured by blur in low light situations and direct measurement of the camera's motion with inertia sensors, (14) the subject's head being rotated a few degrees to expose the one side of the face, (15) if the subject has long hair, the scale of the scene exposing the subject's hair length, and/or (16) for portraits, the content around the subject being of different scale, color or illumination. One or more of the following general rules may be implemented and/or at least partially leveraged during processing by an MCD subsystem: (a) camera should be at eye level; (b) focus on eyes; (c) eyes should be one-third of the way down from top of image; (d) face-fills-frame is also a good shot; (e) don't leave too much headroom; (f) crop off a small section at the top of their head; (g) trendy: tilt camera and position subject in a top corner; (h) angled shoulders will make for a more interesting portrait than square-on shoulders; (i) slimmer look—arms should not touch body—leave a little gap between arms and body; and/or (j) shoot long (far range of zoom) for more flattering portraits. Key algorithms that may be quite simple and easy to achieve local to an MCD subsystem without heavy lifting being done in the cloud or otherwise remotely may enable a user to a more intimate and efficient relationship with the artificial intelligence of the MCD subsystem which may enable the AI to more quickly evolve to the user's behavior (e.g., a user may animate and/or change its subject's characteristics and/or content (e.g., emotions, facial gestures, lighting, etc.) to get a better score). The MCD subsystem may, therefore, gamify the process of capturing media and automating a photographer (e.g., increased user engagement in a process with AI to make captured content more expressive).

Tools and skilled photographers may be leveraged to manage any suitable attributes and/or rules of the MCD subsystem. Skilled photographers may be utilized to review and revise the attributes and rules of good social media (e.g., rules as described above). For example, skilled photographers may be enabled to use algorithms like internet-based convolution networks to analyze the features in a photographer's "preferred" or highly-scored photographs or other captured media (e.g., movies by directors, audio by sound engineers, etc.) for subsequent development and distribution of new algorithms that may then be operative to find those features in future versions of the social media capturing subsystem's algorithms.

Automatic media typing may be provided. Different media types of an autonomous social media capturing device can range from still pictures, bursts, sequences of still, video, audio, any other types of media, or any suitable combination thereof. Machine-based algorithms may be provided that may automatically determine the best media capture type (e.g., still photography or video or audible recording) for a particular detected situation, and may vary that capture type (e.g., immediately) based on scene content for best and/or most-efficient expression of the content. New types of dynamic switching between these (e.g., high speed, slow motion, and still) may enable fast, effective, and/or efficient expression of the emotion in a situation. Context, motion, and/or sequence of events in one or more detected situations may be analyzed and leveraged to adaptively capture and/or generate new types of media content (e.g., a GIF from multiple captured photographical media elements based on a detection of a sequence of events in those media elements (e.g., a whale breaching)).

Various applications are provided. New applications of a social media camera may include (1) automatic mirror apps for validating acceptable appearance before social situations, (2) interactive learning apps that may use similar methods to teach cooking, changing a tire, or any other task as the camera watches, analyzes, and guides one's tasks (e.g., beyond photography), and/or (3) true sweep app where a smartphone may guide a user to paint and fill-in missing portions of a scene to achieve a complete 360-degree spherical database with a typical narrow field of view camera and hand sweeping.

A free flight autonomous social camera platform is provided. A unique media capture or camera device may be provided including an autonomous social camera device, which may be augmented with a free flight platform that may be (1) small, (2) acoustically noise free, (3) self powered, and/or (4) operative to provide for automatic recharge. A balloon device with a local, room-based charging station may be achieved when the device may be automatically steered and landed on the charging station. A stationary charging station with an automatic launching device may be provided. A dual gas balloon with heat generation for silent, acoustic noise-free operation may be provided for the camera platform, which may be under control of the autonomous social camera to provide autonomous self-guided repositioning to the proper position for media capture. When operated as a flying camera, the use of position marking LED illuminators or other elements that may be strategically located in a room or other suitable environment can be leveraged by a camera's sensors to assist in stabilizing the device. When using a free-flight camera, fluttering or stuttering the device back and forth may enable improved capture performance by providing multiple samples for deeper image analysis such as depth disparity measurement with a single camera.

Any suitable modules or controls or hardware or software or firmware or the like may be provided by any of the various entities of a system of this disclosure. For example, device 1280 and/or platform 1210 may include one or more of AVFoundation/CoreImage (e.g., for Video and/or Face Meta Information, etc.), CMDeviceMotion (e.g., for Attitude Quaternion, etc.), CMDeviceMotion (e.g., for Relative Height, etc.), a motion platform library, core Bluetooth and/or HTTP/TCP and/or any other suitable communications capabilities, and/or an app (e.g., an operating system application) that may be operative to provide scene analysis, framing rules, motion commands, a social engine, and/or the like. An MCD platform may include any suitable communications capabilities (e.g., BTLE, Wi-Fi, etc.), any suitable motion command APIs, any suitable motion platforms, and the like. Motion positioning of an MCD subsystem may include, but is not limited to, stereo depth with x- or y-motion, pan/tilt to find faces, scene analysis (e.g., for smiles, etc.), scene framing, auto panorama, and/or the like. A first motion component may be operative to enable motion of a media capture device about a first axis of rotation (e.g., yaw), a second motion component may be operative to enable motion of a media capture device about a second axis of rotation (e.g., pitch) that may be perpendicular to the first axis, and/or a third motion component may be operative to enable motion of a media capture device about a third axis of rotation (e.g., roll) that may be perpendicular to the first axis and/or to the second axis, thereby enabling any particular fine positioning and/or aiming of the motion capture device at any moment (e.g., in response to any suitable instructions from a local and/or remote instruction source). Alternatively or additionally, any suitable coarse positioning may be enabled using scene analysis, path planning, and/or the like. Any suitable social network may utilize specific social network APIs to interact with other subsystems of an MCD system.

One, some, or all of the processes described with respect to FIGS. 1-19 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device of any platform of the disclosure (e.g., at a user device, at a camera device, and/or at a remote server). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from a remote server (e.g., the cloud) to a user device or camera subsystem (MCD), from a user device to a remote serve or to an MCD, or vice versa using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of the disclosure may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of the disclosure are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

It is believed that the disclosure set forth herein encompasses multiple distinct concepts with independent utility. While each of these concepts has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present disclosure may no doubt become apparent to a person of ordinary skill in the art after having read the foregoing description, it is to be understood that the particular embodiments shown and described by way of illustration are in no

What is claimed is:

1. An autonomous media capture device (AMCD), comprising:
a media capturing apparatus;
a flight apparatus that houses the media capturing apparatus; and
at least one controller coupled to the media capturing apparatus and the flight apparatus, the at least one controller operative to:
identify, via the media capture apparatus, a subject or group of subjects for media capture, the subject or group of subjects located in a permitted space;
determine environmental conditions within the permitted space that affect composition quality of a media capture event of the subject;
autonomously position the AMCD in an optimal free space location within the permitted space such that the composition quality of a media capture event of the subject or group of subjects satisfies a minimum quality metric based on an orientation of the subject or the group of subjects within the permitted space and the determined environmental conditions; and
instruct the media capturing apparatus to execute the media capture event when social media composition criteria are satisfied and the AMCD has been positioned in the optimal free space location, wherein the social media composition criteria comprises:
social media feedback on previously posted media that has been provided to a learning algorithm that is used by the at least one controller for executing media capture events; and
scoring metrics characterizing a scene comprising the subject or group of subjects and the determined environmental conditions, wherein the scoring metrics are continuously evaluated to determine when a scene score meets or exceeds an optimal socially-appealing score threshold that triggers execution of the media capture event.

2. The autonomous media capture device of claim 1, wherein the at least one controller is further operative to transmit the captured media event to a server.

3. The autonomous media capture device of claim 1, wherein the at least one controller is further operative to:
receive feedback based on the captured media event; and
adjust at least one rule in a set of rules that controls operation of the media capturing apparatus based on the received feedback.

4. The autonomous media capture device of claim 1, wherein the at least one controller is further operative to maintain a set of rules that control how the media apparatus captures media.

5. The autonomous media capture device of claim 4, wherein the set of rules comprises:
user preference data;
object recognition data;
emotion detection data; and
environmental data.

6. The autonomous media capture device of claim 1, wherein the flight apparatus is an autonomous flying machine.

7. The autonomous media capture device of claim 1, further comprising a skin that at least partially covers the flight apparatus.

8. The autonomous media capture device of claim 1, wherein the flight apparatus functions as an air-tripod.

9. The autonomous media capture device of claim 1, wherein the at least one controller is further operative to direct a subject to a location suitable for taking the best picture for an observed set of conditions.

10. A media capture device (MCD) comprising:
a flight platform capable of sustained flight within a designated airspace;
a camera; and
a processor operative to:
autonomously control flight of the flight platform within the designated airspace with respect to a human subject;
evaluate a composition potential of the human subject for a media capture event by monitoring predefined criteria comprising environmental data surrounding the human subject;
adjust a position of the flight platform with respect to the human subject such that composition potential of a media capture event of the human subject satisfies a minimum quality metric based on orientation of the human subject and the environmental data; and
use the camera to take pictures or videos of the human subject when social media composition criteria are satisfied for the media capture event while the flight platform has been positioned such that composition quality of the media capture event satisfies the minimum quality metric based on orientation of the human subject and the environmental data, wherein the social media composition criteria comprises:
social media feedback on previously posted media that has been provided to a learning algorithm that is used by the processor for executing media capture events; and
scoring metrics characterizing a scene comprising the subject or group of subjects and the determined environmental conditions, wherein the scoring metrics are continuously evaluated to determine when a scene score meets or exceeds an optimal socially-appealing score threshold that triggers execution of the media capture event, and wherein evaluation of the composition potential, position adjustments of the flight platform, and execution of the media capture event are all performed autonomously.

11. The MCD of claim 10, wherein the processor is operative to automatically compose the picture or video.

12. The MCD of claim 10, wherein the processor is operative to:
construct a 3D model of a scene within the designated airspace;
use the 3D model as a map for positioning the flight platform at specific locations within the designated airspace; and
execute media capture events at one or more of the specific locations.

13. The MCD of claim 12, wherein the processor is operative to:
capture a time lapse photography at one or more of the specific locations.

14. The MCD of claim 10, wherein the processor is operative to:
detect when the MCD is tossed into the designated airspace by a user of the MCD;
engage flight control of the flight platform in response to a detected toss event; and perform a selfie photograph of the user after the detected toss event.

15. The MCD of claim 10, wherein the processor is operative to:
   launch the flight platform from a user;
   control the flight platform to follow the user; and
   execute media capture events with the camera as the MCD follows the user.

16. The MCD of claim 10, further comprising:
   at least two image sensors;
   a propulsion system; and
   a housing.

17. The MCD of claim 10, wherein the processor is operative to:
   execute anti-collision algorithms to avoid interference with objects within the designated space.

* * * * *